US011569607B2

(12) United States Patent
Mei et al.

(10) Patent No.: US 11,569,607 B2
(45) Date of Patent: Jan. 31, 2023

(54) POWER COUPLER, ULTRASONIC OSCILLATOR DEVICE, ULTRASONIC OSCILLATOR, MOUNTING ASSEMBLY, COVER BODY ASSEMBLY, COOKING UTENSIL AND HEATING APPARATUS

(71) Applicant: FOSHAN SHUNDE MIDEA ELECTRICAL HEATING APPLIANCES MANUFACTURING CO., LTD., Foshan (CN)

(72) Inventors: Ruoyu Mei, Foshan (CN); Pofeng Ho, Foshan (CN); Weijie Chen, Foshan (CN); Yi Sun, Foshan (CN); Nannan An, Foshan (CN); Lutian Zeng, Foshan (CN); Jun Lei, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 0 days.

(21) Appl. No.: 17/280,889

(22) PCT Filed: Jul. 5, 2019

(86) PCT No.: PCT/CN2019/094914
§ 371 (c)(1),
(2) Date: Mar. 27, 2021

(87) PCT Pub. No.: WO2020/063015
PCT Pub. Date: Apr. 2, 2020

(65) Prior Publication Data
US 2022/0013948 A1    Jan. 13, 2022

(30) Foreign Application Priority Data

Sep. 28, 2018 (CN) .......................... 201811138741.0
Sep. 28, 2018 (CN) .......................... 201811138742.5
(Continued)

(51) Int. Cl.
*H01R 13/428* (2006.01)
*H01R 13/453* (2006.01)
(Continued)

(52) U.S. Cl.
CPC ........ *H01R 13/4538* (2013.01); *A47J 27/004* (2013.01); *A47J 43/0705* (2013.01);
(Continued)

(58) Field of Classification Search
CPC .............. H01R 13/4538; H01R 13/428; H01R 13/5213; H01R 13/5219; A47J 27/004; A47J 43/0705
See application file for complete search history.

(56) References Cited

U.S. PATENT DOCUMENTS 3,610,884 A * 10/1971 Evans ................... A47J 27/004
219/448.11
5,466,164 A * 11/1995 Miyazaki ........... H01R 13/5213
439/140
(Continued)

FOREIGN PATENT DOCUMENTS

CN     101276971 A    10/2008
CN     202398511 U     8/2012
(Continued)

OTHER PUBLICATIONS

The State Intellectual Property Office of PRC (SIPO) The Second Office Action For CN Application No. 201811138741.0 dated Mar. 3, 2021 18 Pages (Translation Included ).
(Continued)

*Primary Examiner* — Tho D Ta
(74) *Attorney, Agent, or Firm* — Anova Law Group, PLLC

(57) ABSTRACT

A power coupler includes an input end assembly and an output end assembly separably coupled to the input end assembly. The input end assembly includes an input end base including a slot, a sealing cover arranged at the input end base, an input conductive member arranged at the input end base and connected to an external power supply, and a
(Continued)

self-locking structure. The sealing cover is movable between a closing position to cover a slot port of the slot and an opening position to at least partially open the slot port. The self-locking structure is switchable between a locked state to limit the sealing cover from moving towards the opening position and an unlocked state to not limit the sealing cover. The output end assembly includes an output conductive member configured to extend into the slot and be connected to the input conductive member.

20 Claims, 60 Drawing Sheets

(30) Foreign Application Priority Data

| | | | |
|---|---|---|---|
| Sep. 28, 2018 | (CN) | ......................... | 201811138746.3 |
| Sep. 28, 2018 | (CN) | ......................... | 201811138757.1 |
| Sep. 28, 2018 | (CN) | ......................... | 201821598950.9 |
| Sep. 28, 2018 | (CN) | ......................... | 201821599061.4 |
| Sep. 28, 2018 | (CN) | ......................... | 201821599065.2 |
| Sep. 28, 2018 | (CN) | ......................... | 201821599181.4 |

(51) Int. Cl.
    *A47J 27/00*          (2006.01)
    *A47J 43/07*          (2006.01)
    *H01R 13/52*         (2006.01)
    *A47J 43/044*        (2006.01)

(52) U.S. Cl.
    CPC ....... *H01R 13/428* (2013.01); *H01R 13/5213* (2013.01); *H01R 13/5219* (2013.01); *A47J 2043/04454* (2013.01)

(56) References Cited

U.S. PATENT DOCUMENTS

| | | | | |
|---|---|---|---|---|
| 7,140,891 | B1* | 11/2006 | Huang | H01R 13/5213 439/140 |
| 7,223,108 | B2* | 5/2007 | Chiang | H01R 13/4538 439/137 |
| 8,770,860 | B2* | 7/2014 | Affre De Saint Rome | H01R 13/5213 439/138 |
| 9,484,664 | B1* | 11/2016 | Lindstrom | H01R 13/5213 |
| 9,748,688 | B2* | 8/2017 | Hagmann | H01R 13/111 |
| 9,887,492 | B2* | 2/2018 | Umehara | H01R 13/4538 |
| 2007/0212918 | A1* | 9/2007 | Gruebel | H01R 12/716 439/271 |
| 2010/0130039 | A1 | 5/2010 | Chen et al. | |
| 2010/0233895 | A1* | 9/2010 | Sadick | H01R 13/4538 439/271 |
| 2011/0171849 | A1 | 7/2011 | Houir | |
| 2013/0295781 | A1 | 11/2013 | Gualino et al. | |
| 2013/0323941 | A1 | 12/2013 | Zeliff et al. | |
| 2022/0013948 | A1 | 1/2022 | Mei et al. | |

FOREIGN PATENT DOCUMENTS

| | | |
|---|---|---|
| CN | 102769236 A | 11/2012 |
| CN | 202997132 U | 6/2013 |
| CN | 103474826 A | 12/2013 |
| CN | 103972714 A | 8/2014 |
| CN | 104188558 A | 12/2014 |
| CN | 204016058 U | 12/2014 |
| CN | 204091677 U | 1/2015 |
| CN | 104414517 A | 3/2015 |
| CN | 104682093 A | 6/2015 |
| CN | 104852217 A | 8/2015 |
| CN | 105322376 A | 2/2016 |
| CN | 105499048 A | 4/2016 |
| CN | 106077718 A | 11/2016 |
| CN | 106733571 A | 5/2017 |
| CN | 106936020 A | 7/2017 |
| CN | 107411536 A | 12/2017 |
| CN | 206789778 U | 12/2017 |
| CN | 206964514 U | 2/2018 |
| CN | 107799945 A | 3/2018 |
| CN | 207126776 U | 3/2018 |
| CN | 207265295 U | 4/2018 |
| CN | 207282817 U | 4/2018 |
| CN | 108065807 A | 5/2018 |
| CN | 108183355 A | 6/2018 |
| CN | 207430653 U | 6/2018 |
| CN | 207822999 U | 9/2018 |
| CN | 207886096 U | 9/2018 |
| CN | 208912472 U | 5/2019 |
| CN | 209153078 U | 7/2019 |
| CN | 209153079 U | 7/2019 |
| DE | 2710915 A1 | 9/1978 | |
| DE | 19809801 A1 * | 9/1999 | ......... H01R 13/4538 |
| DE | 102016116091 A1 | 3/2018 | |
| EP | 1732174 A1 | 12/2006 | |
| EP | 3841927 A1 | 6/2021 | |
| FR | 1198588 A | 12/1959 | |
| FR | 2918216 A1 | 1/2009 | |
| JP | H1041019 A * | 2/1998 | |
| JP | 2003032795 A | 1/2003 | |
| JP | 2017170361 A | 9/2017 | |
| TW | 200732174 A | 9/2007 | |
| WO | WO-2018041660 A1 * | 3/2018 | |
| WO | 2020063015 A1 | 4/2020 | |

OTHER PUBLICATIONS

World Intellectual Property Organization (WIPO) International Search Report and Written Opinion for PCT/CN2019/094914 with translation dated Oct. 8, 2019 29 Pages.
The State Intellectual Property Office of PRC (SIPO) The First Office Action For CN Application No. 201811138741.0 dated Aug. 3, 2020 23 Pages (Translation Included ).
The State Intellectual Property Office of PRC (SIPO) The First Office Action For CN Application No. 201811138742.5 dated Dec. 28, 2020 33 Pages (Translation Included ).
The State Intellectual Property Office of PRC (SIPO) The First Office Action For CN Application No. 201811138757.1 dated Nov. 4, 2020 22 Pages (Translation Included ).
The State Intellectual Property Office of PRC (SIPO) The First Office Action For CN Application No. 201811138746.3 dated Jan. 5, 2021 8 Pages (Translation Included ).
The European Patent Office (EPO) Extended Search Report for EP Application No. 19865610.0 dated Sep. 28, 2021 15 Pages.
Japan Patent Office (JPO) The Office Action For JP Application No. 2020-572796 dated Nov. 30, 2021 10 Pages (Translation Included).
Canadian Intellectual Property Office The Office Action For CA Application No. 3,114,127 dated Jul. 25, 2022 4 Pages.

* cited by examiner

POWER COUPLER, ULTRASONIC OSCILLATOR DEVICE, ULTRASONIC OSCILLATOR, MOUNTING ASSEMBLY, COVER BODY ASSEMBLY, COOKING UTENSIL AND HEATING APPARATUS

CROSS-REFERENCE TO RELATED APPLICATIONS

This application is a National Stage Entry under 35 U.S.C. § 371 of International Application No. PCT/CN2019/094914, filed on Jul. 5, 2019, which claims priority to Chinese Patent Application Nos. 201821599065.2, 201811138757.1, 201811138741.0, 201821599181.4, 201811138742.5, 201821598950.9, 201811138746.3, and 201821599061.4, filed on Sep. 28, 2018 by Foshan Shunde Midea Electrical Heating Appliances Manufacturing Co., Ltd., the entire contents of all of which are incorporated herein by reference.

TECHNICAL FIELD

The present disclosure relates to the technical field of cooking utensils, in particular to a power coupler, an ultrasonic oscillator device, an ultrasonic oscillator, a mounting assembly, a cover body assembly, a cooking utensil, and a heating apparatus.

BACKGROUND

In the related art, a cooking utensil realizes a function of power transmission with power coupling through the power coupler, an input end of the power coupler may be separated from an output end of the power coupler and has the charging property, such that after the input end is separated from the output end, a user is easy to touch the input end, resulting in the risk of electric shock.

SUMMARY

The present disclosure aims to at least solve one of the technical problems in the existing technology. For this purpose, the present disclosure provides a power coupler, the power coupler has a self-locking function to effectively lower the risk of electric shock for the user.

The present disclosure further provides an ultrasonic oscillator device with the power coupler.

The present disclosure further provides an ultrasonic oscillator.

The present disclosure further provides a mounting assembly for an ultrasonic device with the ultrasonic oscillator device.

The present disclosure further provides a mounting assembly for the ultrasonic device.

The present disclosure further provides a cover body assembly with the ultrasonic oscillator device or the mounting assembly.

The present disclosure further provides a cooking utensil with the ultrasonic oscillator or the cover body assembly.

The present disclosure further provides a heating apparatus with the mounting assembly.

A power coupler according to an embodiment of a first aspect of the present disclosure includes an input end assembly; the input end assembly including an input end base, the input end base being internally provided with a slot therein; a sealing cover, the sealing cover being arranged at the input end base and being movable between a closing position to cover a slot port of the slot and an opening position to open the slot port of the slot; an input conductive member, the input conductive member being arranged at the input end base and connected to an external power supply; and a self-locking structure, the self-locking structure being switchable between a locked state under which the sealing cover is limited from moving towards the opening position and an unlocked state under which the sealing cover is released from limitation. The power coupler further includes an output end assembly, the output end assembly being separably connected to the input end assembly in a coupling manner, and the output end assembly having an output conductive member, where when the input end assembly is connected to the output end assembly, the self-locking structure is in the unlocked state, the sealing cover moves to the opening position, and the output conductive member extends into the slot and is connected to the input conductive member; and when the input end assembly is separated from the output end assembly, the output conductive member moves out of the slot, the sealing cover is located at the closing position, and the self-locking structure is switched to the locked state.

According to an embodiment of a first aspect of the present disclosure, self locking of the input end assembly can be realized when the input end assembly is separated from the output end assembly, such that the risk of electric shock of the user is effectively lowered, and the user is safer.

Furthermore, the power coupler according to the embodiments of the present disclosure may further have the following additional technical features:

for the power coupler according to the embodiments of the present disclosure, the self-locking structure is switched automatically to the locking state when the output end assembly is separated from the input end assembly and is switched to the unlocking state when pushed by the output end assembly in the process that the output end assembly is connected to the input end assembly.

In some embodiments, the self-locking structure includes stoppers, each stopper being connected to the input end base or the sealing cover and movable between a first position where the sealing cover is stopped from moving towards the opening position and a second position where the sealing cover is released from stopping, and each stopper being at the first position normally; and drivers, each driver being connected to the input end base or being arranged at the output end assembly, and each driver drives the corresponding stopper to move to the second position when the output end assembly is inserted into the input end assembly.

In some embodiments, each stopper is rotatably or movably connected to the input end base. The self-locking structure further includes stopping reset members, each stopping reset member being connected to the input end base and being adapted to apply to the corresponding stopper an action force for movement towards the first position.

In some embodiments, each stopper includes connection members, each connection member being rotatably connected to the input end base; stopping members, each stopping member being connected to the corresponding connection member and being used for stopping the sealing cover; and a drive matching member, used for being matched with the corresponding driver, the drive matching member being connected to the connection member.

In some embodiments, the stopping reset member is a torsional spring, the input end base is provided with a rotation shaft, the connection member is provided with a first limiting slot and a rotary drum which is arranged at the corresponding rotation shaft in a sleeved manner, a coil of the torsional spring is arranged at the corresponding rotary drum in the sleeved manner, one end of the torsional spring is connected to the input end base, and the other end of the torsional spring is arranged in the corresponding first limiting slot.

In some embodiments, the first limiting slot is formed at the corresponding stopping member.

In some embodiments, a limiting mesa is arranged at the outer peripheral face of the sealing cover, the stoppers are interfered with the limiting mesa to stop the sealing cover from moving towards the opening position when being at the first position and move outwards to avoid the limiting mesa when being at the second position.

In some embodiments, each stopper is further provided with a limiting convex rib, the limiting convex ribs abut against the input end base to limit angles, rotating inwards, of the stoppers when the sealing cover is not mounted at the input end base.

In some embodiments, the drivers are rotatably connected to the input end base. The self-locking structure further includes drive reset members used for enabling the corresponding drivers to be restored to an initial position, the drive reset members are connected to the input end base, and the output end assembly overcomes a reset force of the drive reset members to enable the corresponding drivers to rotate.

In some embodiments, the input end base is provided with a limiting member. Each driver includes a drive connection member, the drive connection member being rotatably connected to the input end base; a drive member, the drive member being connected to the corresponding drive connection member and being used for driving the corresponding stopper to rotate; and a limiting matching member, the limiting matching member being connected to the corresponding drive member, and the limiting matching member abuts against the corresponding limiting member to limit the corresponding driver under the reset force of the corresponding drive reset member when the output end assembly is separated from the input end assembly.

In some embodiments, each drive reset member is a torsional spring, the input end base is provided with shaft slots, each limiting matching member is provided with a second limiting slot, each drive connection member is provided with a shaft rod which is rotatably arranged in the corresponding shaft slot, a coil of each torsional spring is arranged at the corresponding shaft rod in the sleeved manner, one end of each torsional spring is connected to the input end base, and the other end of each torsional spring is arranged in the corresponding second limiting slot.

In some embodiments, mounting holes are formed at the bottom wall of the input end base, the drivers are arranged at the mounting holes respectively, a mounting seat is arranged at the edge of each mounting hole, each shaft slot is formed at the corresponding mounting seat, and each limiting member is a buckle which is connected to the corresponding mounting seat and extends inwards.

In some embodiments, each shaft rod is provided with a retaining rib used for limiting the corresponding torsional spring in an axial direction of the corresponding shaft rod.

In some embodiments, each drive member is connected to the middle part of the corresponding shaft rod, check ribs used for abutting against the bottom wall face of the input end base to limit the corresponding drivers are further arranged at the middle parts of the corresponding shaft rods, and the check ribs and the drive members are distributed in circumferential directions of the corresponding shaft rods.

In some embodiments, the output end assembly includes an output end base, the output end base includes a base main body and a convex member which is arranged at one side of the base main body in a protruding manner, the output conductive member is exposed from the outer peripheral face of the convex member, the convex member is adapted to extend into the slot, the output conductive member is connected to the output end base, and the convex member is used for driving the self-locking structure to move.

In some embodiments, convex ribs extending in an axial direction of the convex member are arranged at the outer peripheral face of the convex member and the self-locking structure is driven to move through the convex ribs.

In some embodiments, each convex rib exceeds the end surface of one end of the convex member that is away from the base main body, and an exceeding distance H satisfies: $1\ mm<H\leq 6\ mm$; and a protruding height L of each convex rib protruding from the outer peripheral face of the convex member satisfies: $0\ mm<L\leq 3\ mm$.

In some embodiments, each stopper is a magnetic member, each driver is a magnetic driver, each magnetic driver is arranged at the output end assembly and is adapted to be magnetically matched with the corresponding stopper to enable the corresponding stopper to move between the first position and the second position.

In some embodiments, the stoppers are arranged at the sealing cover in a manner capable of translating in a radial direction of the sealing cover; the stopping slots are arranged at the inner circumferential surfaces of the slots; and the stoppers extend into the corresponding stopping slots when being at the first position and move out of the corresponding stopping slots when being at the second position.

In some embodiments, the sealing cover includes a sealing plate; and a side wall, the side wall being connected to the outer peripheral edge of the sealing plate and being at one side of the sealing plate to be matched with the sealing plate to form sealing cover slots, through holes are formed at the side wall, the stoppers are arranged at the corresponding sealing cover slots, the outer ends of the stoppers are adapted to penetrate through the corresponding through holes to extend into the corresponding stopping slots, and the stopping reset members are arranged at the corresponding sealing cover slots.

In some embodiments, the sealing plate is provided with sealing plate bulges located in the corresponding sealing cover slots, the stopping reset members are helical springs arranged at the corresponding stoppers in the sleeved manner, outer budges are arranged at the outer peripheral faces of the corresponding stoppers, and the two ends of the helical springs abut against the corresponding sealing plate bulges and the corresponding outer bulges.

In some embodiments, each sealing plate bulge is internally provided with a limiting slot extending in the radial direction of the sealing cover, and the inner ends of the stoppers penetrate through the corresponding limiting slot in the manner capable of translating.

In some embodiments, the two ends of each limiting slot in the radial direction of the sealing cover are both opened, the sealing plate is further provided with stopping convex ribs located in the corresponding sealing cover slots, and the inner ends of stoppers abut against the corresponding stopping convex ribs when the stoppers are at the second position.

In some embodiments, the stoppers, the stopping slots and the stopping reset members each are multiple in one-to-one correspondence, the multiple stopping slots are arranged spaced from each other in a circumferential direction of the slot, the multiple stoppers are adapted to move towards the second position under the magnetic attractive forces of the corresponding magnetic drivers when the output end assembly is close to the input end assembly.

In some embodiments, an elastic member used for enabling the sealing cover to be restored to the closing position is arranged between the sealing cover and the bottom wall face of the slot.

In some embodiments, positioning grooves are formed at the bottom wall face of the slot, the sealing cover is provided with a positioning boss, and the two ends of the elastic member abut in the corresponding positioning grooves and on the positioning boss.

In some embodiments, an edge plate extending inwards is arranged at the slot port of the slot, guide convex ribs extending to the edge plate in an axial direction of the slot are arranged at the inner peripheral wall face of the slot, positioning convex members which protrude outwards and are provided with positioning slots are arranged at the outer peripheral face of the sealing cover, the positioning slots are movably matched with the guide convex ribs, and the positioning convex members abut against the edge plate when the sealing cover is located at the closing position.

In some embodiments, mounting clamping grooves are formed at the inner peripheral wall face of the input end base, and power supply line holes communicating with the mounting clamping grooves are formed at the top wall of the input end base. The input conductive member includes terminal members, the terminal members being clamped into the mounting clamping grooves, and the terminal members and/or the external power supply penetrate through the corresponding power supply line holes to realize electric connection; and electrode members, the electrode members being connected to the lower ends of the terminal members respectively, extend out of the corresponding mounting clamping grooves and extend into the slot, and the electrode members are electrically connected to the output conductive member.

In some embodiments, the output end assembly includes an output end base, the output end base includes a base main body and a convex member which is arranged at one side of the base main body in a protruding manner; and the convex member is adapted to extend into the slot, the output conductive member is connected to the output end base and is exposed from the outer peripheral face of the convex member, the convex member is adapted to drive the sealing cover to move, and the magnetic drivers are mounted at the convex member.

In some embodiments, the magnetic drivers are magnets built in the convex member.

An ultrasonic oscillator device according to an embodiment of the second aspect of the present disclosure includes an ultrasonic oscillator and the power coupler according to the embodiment of the first aspect of the present disclosure, where one end of the output end assembly is in coupling connection to the input end assembly, and the other end of the output end assembly is electrically connected to the ultrasonic oscillator.

An ultrasonic oscillator according to an embodiment of the third aspect of the present disclosure includes a piezoelectric assembly, the piezoelectric assembly including piezoelectric sheets and electrode sheets connected to the piezoelectric sheets, and the output end of the output conductive member is electrically connected to the electrode sheets; a first end block and a second end block, the first end block and the second end block being arranged at the two axial ends of the piezoelectric assembly respectively; an oscillation rod which is arranged at one end, away from the piezoelectric assembly, of the second end block; a first insulation ring, the first insulation ring being arranged between the piezoelectric assembly and the second end block; and a fastener, the fastener penetrating into the first end block, the piezoelectric assembly, the first insulation ring, the second end block and the oscillation rod to connect the first end block, the piezoelectric assembly, the first insulation ring, the second end block and the oscillation rod together.

In some embodiments, the first insulation ring is an alumina ceramic ring or a zirconia ceramic ring.

In some embodiments, the fastener and the piezoelectric assembly are arranged in an insulating manner, and a contact portion of the fastener and the piezoelectric assembly is a plastic piece.

In some embodiments, a thickness H1 of the first insulation ring satisfies: $4 \text{ mm} \leq H1 \leq 7 \text{ mm}$.

In some embodiments, a thickness H1 of the first insulation ring and a thickness H2 of the piezoelectric sheets satisfy: $3 \text{ mm} \leq H2 \leq 6 \text{ mm}$, $10 \text{ mm} \leq H1+H2 \leq 13 \text{ mm}$.

In some embodiments, the ultrasonic oscillator further includes an insulation sleeve, the insulation sleeve being arranged between the fastener and the piezoelectric assembly to enable the fastener and the piezoelectric assembly to be arranged in the insulating manner.

In some embodiments, a first annular slot is formed at the inner peripheral face of one end, facing the first insulation ring, of the second end block and is internally provided with a first sealant layer.

In some embodiments, the ultrasonic oscillator further includes: one end of the insulation sleeve extends into the first annular slot, and the first sealant layer is at least arranged between the outer peripheral face of the insulation sleeve and the inner peripheral face of the first annular slot.

In some embodiments, the ultrasonic oscillator further includes: a second insulation ring, the second insulation ring being penetrated by the fastener and being arranged between the piezoelectric assembly and the first end block.

In some embodiments, a second annular slot is formed at the inner peripheral face of the first end block, the other end of the insulation sleeve extends into the second annular slot, the second annular slot is further internally provided with a second sealant layer, the second sealant layer is at least arranged between the inner peripheral face of the second sealant layer and the outer peripheral face of the insulation sleeve.

In some embodiments, the ultrasonic oscillator further includes: a first insulation glue layer, the outer peripheral face of the first insulation ring exceeds the outer peripheral face of the piezoelectric assembly outwards, and the first insulation glue layer is arranged at the outer peripheral face of the first insulation ring.

In some embodiments, the ultrasonic oscillator further includes: a second insulation glue layer, the outer peripheral face of the second insulation ring exceeds the outer peripheral face of the piezoelectric assembly outwards, and the second insulation glue layer is arranged at the outer peripheral face of the second insulation ring.

In some embodiments, three electrode sheets are provided and are a positive electrode sheet, a first negative electrode sheet and a second negative electrode sheet, two stacking piezoelectric sheets are provided, the positive electrode sheet is sandwiched between the two piezoelectric sheets, the first negative electrode sheet is sandwiched between the first end block and the piezoelectric sheets, and the second negative electrode sheet is sandwiched between the piezoelectric sheets and the first insulation ring.

In some embodiments, the ultrasonic oscillator further includes: a ground line, the ground line is electrically connected to the oscillation rod to realize grounding of the oscillation rod, the oscillation rod and the second end block are integrally formed, a mounting member protruding outwards is arranged at the outer peripheral face of the upper part of the oscillation rod, protruding fixation columns are arranged at one surface, facing the first end block, of the mounting member, a wiring ring is arranged at one end of the ground line, and the wiring ring and the fixation columns are connected through connection fasteners.

A mounting assembly of the ultrasonic device according to an embodiment of the fourth aspect of the present disclosure includes a base, and the base is provided with a mounting hole; and the ultrasonic oscillator device according to the embodiment of the second aspect of the present disclosure, the mounting member is arranged at the outer peripheral face of the ultrasonic oscillator device, the upper end of the ultrasonic oscillator device extends into the mounting hole upwards, and the mounting member is arranged at the lower side of the periphery of the mounting hole and is connected to the periphery of the mounting hole.

A mounting assembly of the ultrasonic device according to an embodiment of the fifth aspect of the present disclosure includes a base, and the base is provided with a mounting hole; and the ultrasonic oscillator device, the mounting member is arranged at the outer peripheral face of the ultrasonic oscillator device, the upper end of the ultrasonic oscillator device extends into the mounting hole upwards, and the mounting member is arranged at the lower side of the periphery of the mounting hole and is connected to the periphery of the mounting hole.

In some embodiments, a first fixation hole is formed at the base, second fixation holes are formed at the mounting member, and each second fixation hole is internally provided with the fastener connected to the base to enable the ultrasonic oscillator device to be connected to the base.

In some embodiments, the second fixation hole is a blind hole with an opened upper end, and the fastener sequentially penetrates into the first fixation hole and the second fixation hole from top to bottom.

In some embodiments, the mounting member is an annular flange arranged at the ultrasonic oscillator device, and multiple second fixation holes are provided, are uniformly distributed along the circumference of the annular flange and are formed at the outer periphery of the mounting hole.

In some embodiments, the mounting assembly further includes a sealing gasket, the sealing gasket being arranged between the mounting member and the base and being provided with sealing through holes, through which the corresponding fasteners penetrate.

In some embodiments, a sealing slot is formed at the upper part of the mounting member, the bottom wall face of the sealing slot is provided with the fixation columns protruding upwards, the sealing gasket is arranged in the sealing slot and abuts against the lower surface of the base, the fixation columns are inserted into the sealing through holes respectively, and the second fixation holes are formed at the fixation columns respectively.

In some embodiments, sealing ridges, extending in a circumferential direction of the sealing gasket, are formed at at least one of the upper surface or the lower surface of the sealing gasket, at least two sealing ridges are spaced from each other in arbitrary radial direction of the sealing gasket, at least one of the upper peripheral edge or the lower peripheral edge of each sealing through hole is provided with multiple sealing convex rings which are concentrically arranged, and the sealing convex ring at the outermost side is connected to the sealing ridges.

In some embodiments, positioning chipped edges are arranged at the outer peripheral wall of the mounting member.

In some embodiments, the base is provided with a cavity communicating with the mounting hole, and the ultrasonic oscillator device includes the ultrasonic oscillator and the power coupler electrically connected to the ultrasonic oscillator. The ultrasonic oscillator includes: the oscillation rod, the mounting member being arranged at the outer peripheral face of the upper part of the oscillation rod; and an ultrasonic transducer, the ultrasonic transducer being connected to the oscillation rod and located at the upper end of the oscillation rod, where a portion of the ultrasonic transducer and the power coupler are located in the cavity, the output end assembly includes a lower housing and an upper housing which are connected to each other, third fixation holes are formed at the bottom wall of the lower housing, and the fasteners further penetrate through the corresponding third fixation holes to fix the output end assembly to the base.

A cover body assembly according to an embodiment of a sixth aspect of the present disclosure includes: a cover body; and the ultrasonic oscillator device according to the embodiment of the second aspect of the present disclosure, or the mounting assembly of the ultrasonic device according to the embodiment of the fifth aspect of the present disclosure, the base is integrally formed at the cover body or is connected to the cover body to form a whole body.

In some embodiments, the cover body includes an upper cover and a cover plate detachably connected to the upper cover, the input end assembly is arranged at the upper cover, and the output end assembly and the ultrasonic oscillator are connected to the cover plate; when the cover plate is removed, the output end assembly is separated from the input end assembly; and when the cover plate is assembled on the upper cover, the output end assembly is in coupling connection to the input end assembly.

A cooking utensil according to an embodiment of a seventh aspect of the present disclosure includes the ultrasonic oscillator according to the embodiment of the third aspect of the present disclosure or the cover body assembly according to the embodiment of the sixth aspect of the present disclosure.

A heating apparatus according to an embodiment of an eighth aspect of the present disclosure includes the mounting assembly of the ultrasonic device according to the embodiment of the fifth aspect of the present disclosure.

Additional aspects and advantages of the present disclosure will be given in part in the following descriptions, become apparent in part from the following descriptions, or be learned from the practice of the present disclosure.

BRIEF DESCRIPTION OF THE DRAWINGS

The above and/or additional aspects and advantages of the present disclosure will be apparent and easily understood from description of the embodiments in combination with the drawings, where.

Figure 1:
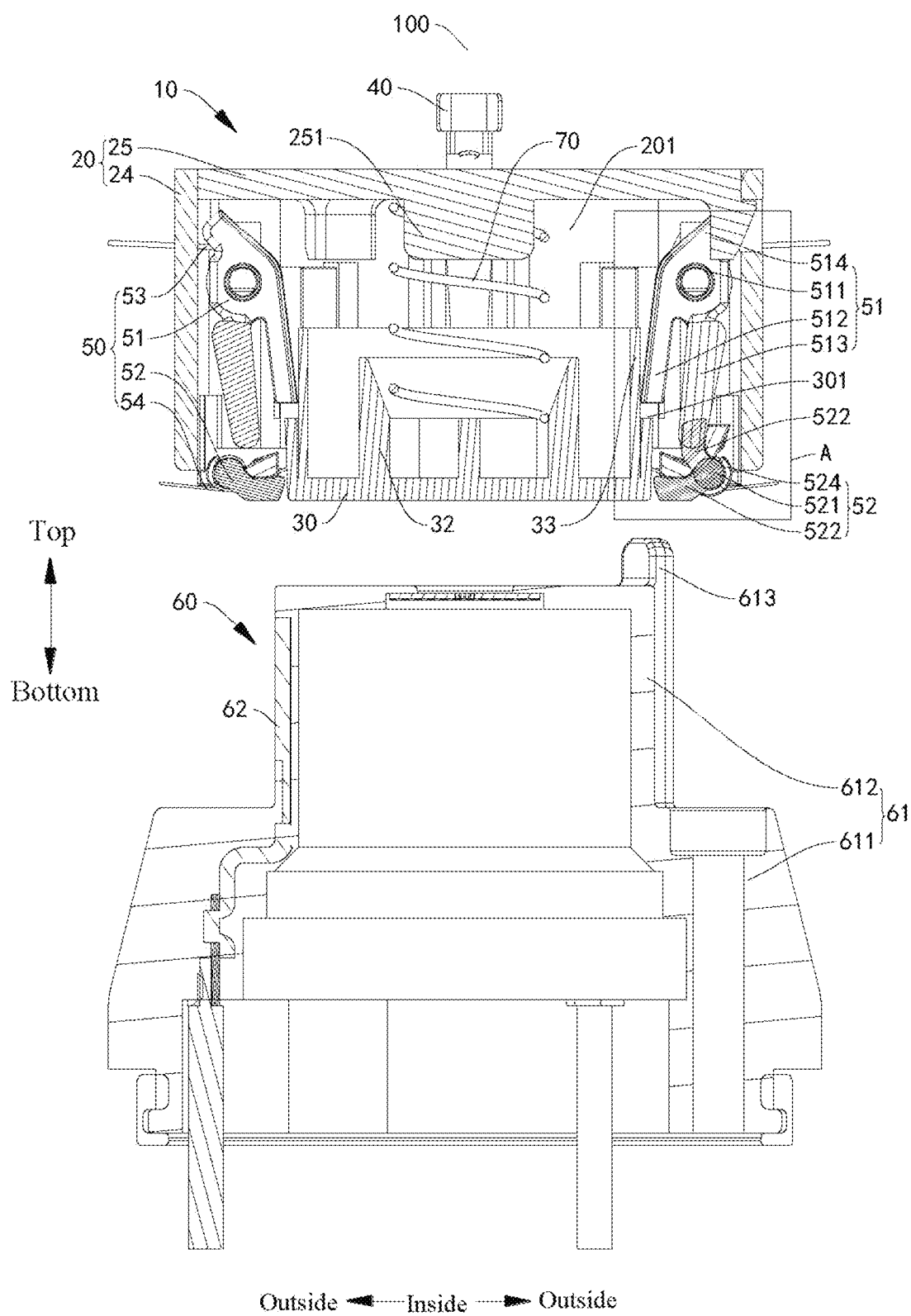
FIG. 1 is a schematic structural diagram of a power coupler according to a first embodiment of the present disclosure in one state.

REFERENCE NUMERALS power coupler 100;
cover body assembly 200; cover body 210; cavity 2101; mounting hole 2102; first fixation hole 2103; base 211; upper cover 212; cover plate 213;
cooking utensil 300; boiler body 310; ultrasonic control panel 320; control panel 330; power panel 340; cooking cavity 350; coil disk assembly 360;
ultrasonic oscillator device 400; ultrasonic oscillator 410;
ultrasonic transducer 420; piezoelectric assembly 4201; first end block 4202; second annular slot 4212; piezoelectric sheet 4206; electrode sheet 4207; positive electrode sheet 4217; first negative electrode sheet 4227; second negative electrode sheet 4237; second end block 4208; first annular slot 4218;
oscillation rod 430; amplitude tuning rod body 4301; emission disk 4302; mounting member 440; second fixation hole 4401; sealing slot 4402; fixation column 4403; positioning chipped edge 4404; fastener 450; pre-tightening member 451;
sealing gasket 460; sealing through hole 4601; sealing ridge 4602; sealing convex ring 4603; ground line 470; wiring ring 4701; positive electrode line 471; negative electrode line 472;
first insulation ring 480; first insulation glue layer 4801; second insulation ring 481; second insulation glue layer 4811; first sealant layer 490; second sealant layer 491; insulation sleeve 500;
input end assembly 10;
input end base 20; slot 201; mounting hole 202; mounting clamping groove 203; clamping port 204; stopping slot 205; positioning groove 206; rotation shaft 21; mounting seat 22; shaft slot 221; guide convex rib 23; housing 24; top cover 25; positioning column 251; limiting member 26; edge plate 27;
sealing cover 30; limiting mesa 301; sealing cover slot 302; positioning convex member 31; positioning slot 311; inner cylinder 32; outer cylinder 33; sealing plate 34; sealing plate bulge 341; limiting slot 342; stopping convex rib 343; positioning boss 344; side wall 35; through hole 351;
input conductive member 40; clamping plate 401; terminal member 41; electrode member 42;
self-locking structure 50;
stopper 51; connection member 511; first limiting slot 5111; rotary drum 5112; stopping member 512; drive matching member 513; limiting convex rib 514; outer bulge 515;
driver 52; drive connection member 521; shaft rod 5211; retaining rib 5212; drive member 522; limiting matching member 523; second limiting slot 5231; check rib 524;
stopping reset member 53; drive reset member 54;
output end assembly 60; output end base 61; base main body 611; convex member 612; convex rib 613; lower housing 614; third fixation hole 615; upper housing 616; first sealing ring 617; output conductive member 62; waterproof air-permeable membrane 63; magnetic driver 64;
elastic member 70.

DETAILED DESCRIPTION

Embodiments of the present disclosure are described in details below and examples of said embodiments are shown in the drawings. The following embodiments described with reference to the drawings are illustrative and used to explain the present disclosure, but may not be interpreted as the restrictions of the present disclosure. Those skilled in the art may make various changes, modifications, substitutions and variations in these embodiments without departing from the principles and purposes of the present disclosure, the scope of which is defined in the claims and their equivalents.

In the description herein, it should be noted that an orientation or position relationship referred to by one of terms "center," "length," "width," "thickness," "upper," "lower," "front," "back," "left," "right," "inner," "outer," "axial direction," "radial direction," "circumference" and the like is an orientation or position relationship based on what is shown in the drawings, and is merely used to facilitate the description of the present disclosure and to simplify the description, but does not indicate or suggest that the device or element referred to must have the specific orientation, is constructed and operated with the specific orientation, and thus should not be considered as limitations to the present disclosure. Furthermore, a feature described using "first" or "second" may include one or more such feature, either explicitly or implicitly. In the description of the present disclosure, unless otherwise noted, "multiple" means two or more.

The power coupler 100, the cover body assembly 200, the ultrasonic oscillator device 400, the ultrasonic oscillator 410, the mounting assembly of the ultrasonic device, the cooking utensil 300 and the heating apparatus according to the embodiments of the present disclosure are described with reference to the drawings below.

Referring to FIGS. 1-24, the power coupler 100 according to the embodiment of the first aspect of the present disclosure may include: an input end assembly 10 and an output end assembly 60, where the input end assembly 10 may include: an input end base 20, a sealing cover 30, an input conductive member 40 and a self-locking structure 50.

Particularly, the input end assembly 10 is separably connected to the output end assembly 60 in a coupling manner, such that the power coupler 100 may realize detachability between different components of an apparatus with the power coupler 100 by separating the input end assembly 10 from the output end assembly 60 in the use process, and use is more convenience.

For example, in some embodiments, the cooking utensil 300 realizes power transmission through the power coupler 100, where the input end assembly 10 is mounted at an upper cover 212 of the cover body assembly 200 of the cooking utensil 300, and the output end assembly 60 is mounted at a cover plate 213 of the cover body assembly 200. When the cover plate 213 needs to be cleaned, the input end assembly 10 is separated from the output end assembly 60 to enable the cover plate 213 to be detachable, such that the cover plate 213 is more convenient to clean, and the risk of a short circuit or an electric shock caused by water ingress of the input end assembly 10 is also avoided. In some other embodiments, the input end assembly 10 is mounted at a pedestal of a boiler body 310 of the cooking utensil 300, and the output end assembly 60 is mounted at an inner boiler of the boiler body 310. The input end assembly 10 is separated from the output end assembly 60 to enable the inner boiler to be taken out from the pedestal, such that food taking and placing and cleaning of the inner boiler are more convenient.

Figure 2:
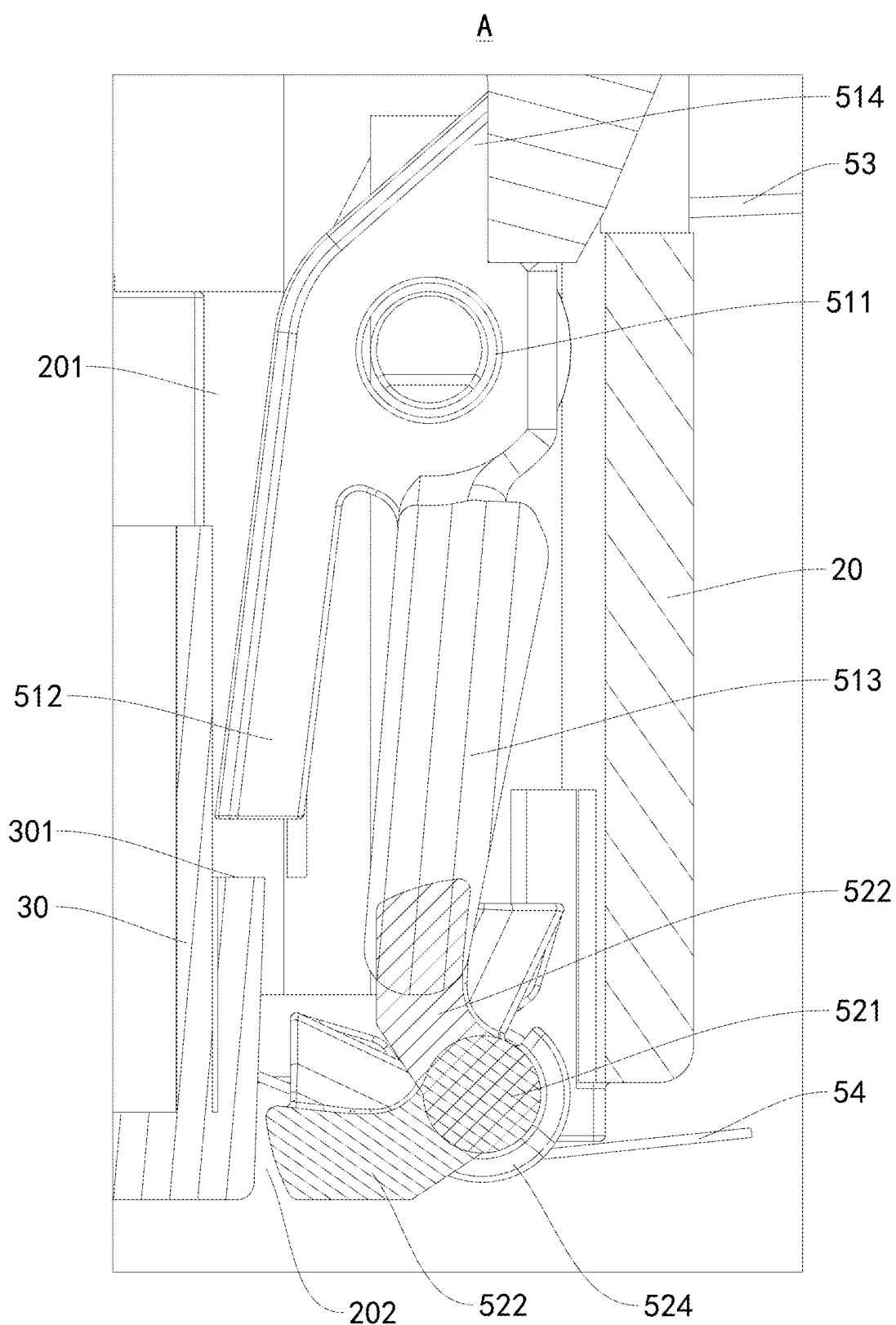
FIG. 2 is a schematic enlarged structural diagram of part A shown in FIG. 1.
Figure 3:
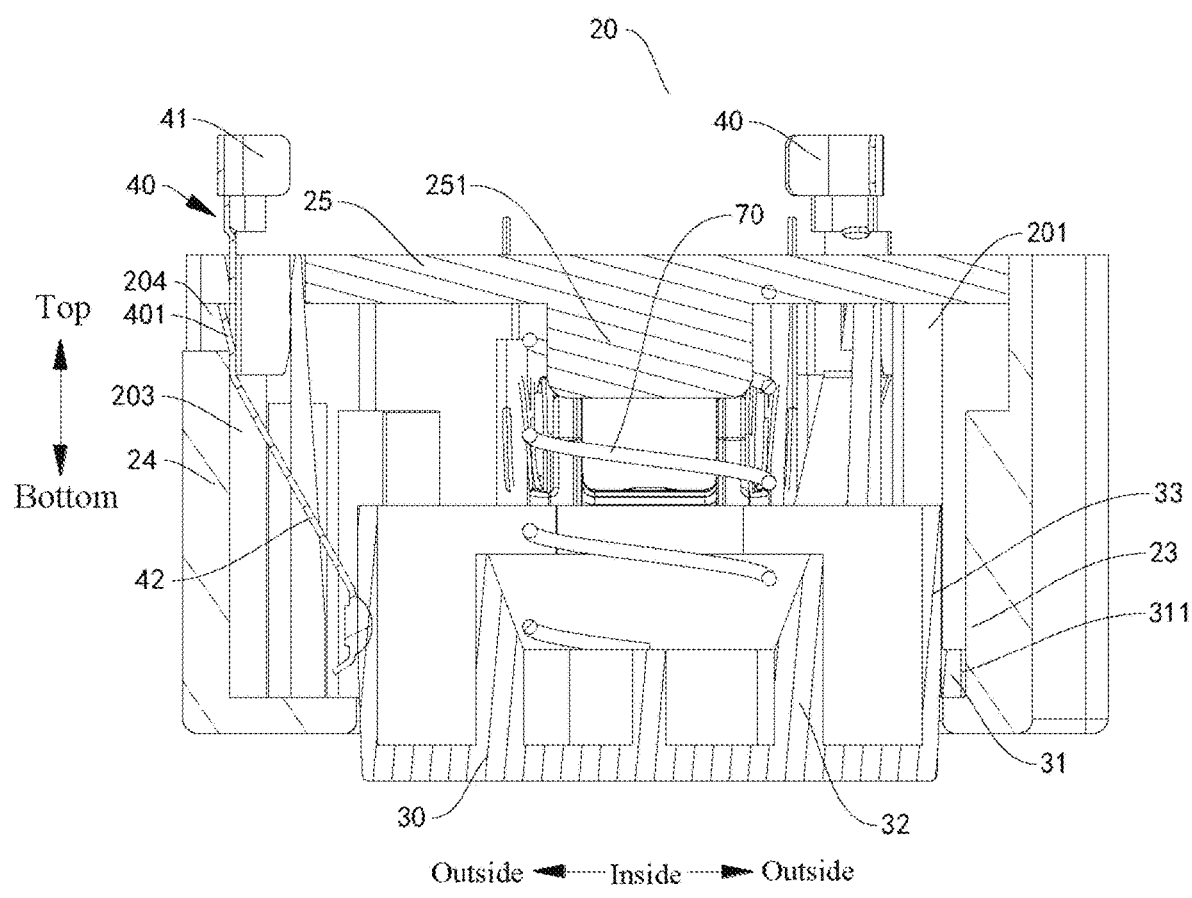
FIG. 3 is a schematic structural diagram of an input end assembly of the power coupler according to the first embodiment of the present disclosure in one state.
Figure 4:
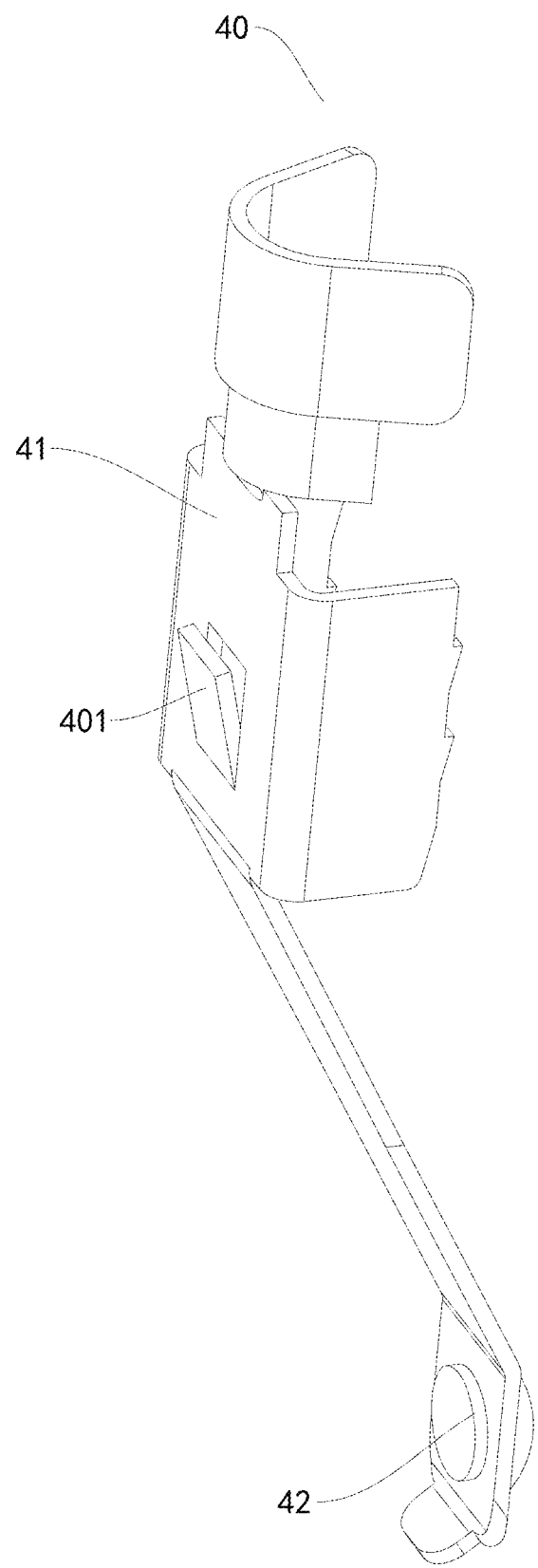
FIG. 4 is a schematic structural diagram of an input conductive member of the power coupler according to the first embodiment of the present disclosure.
Figure 5:
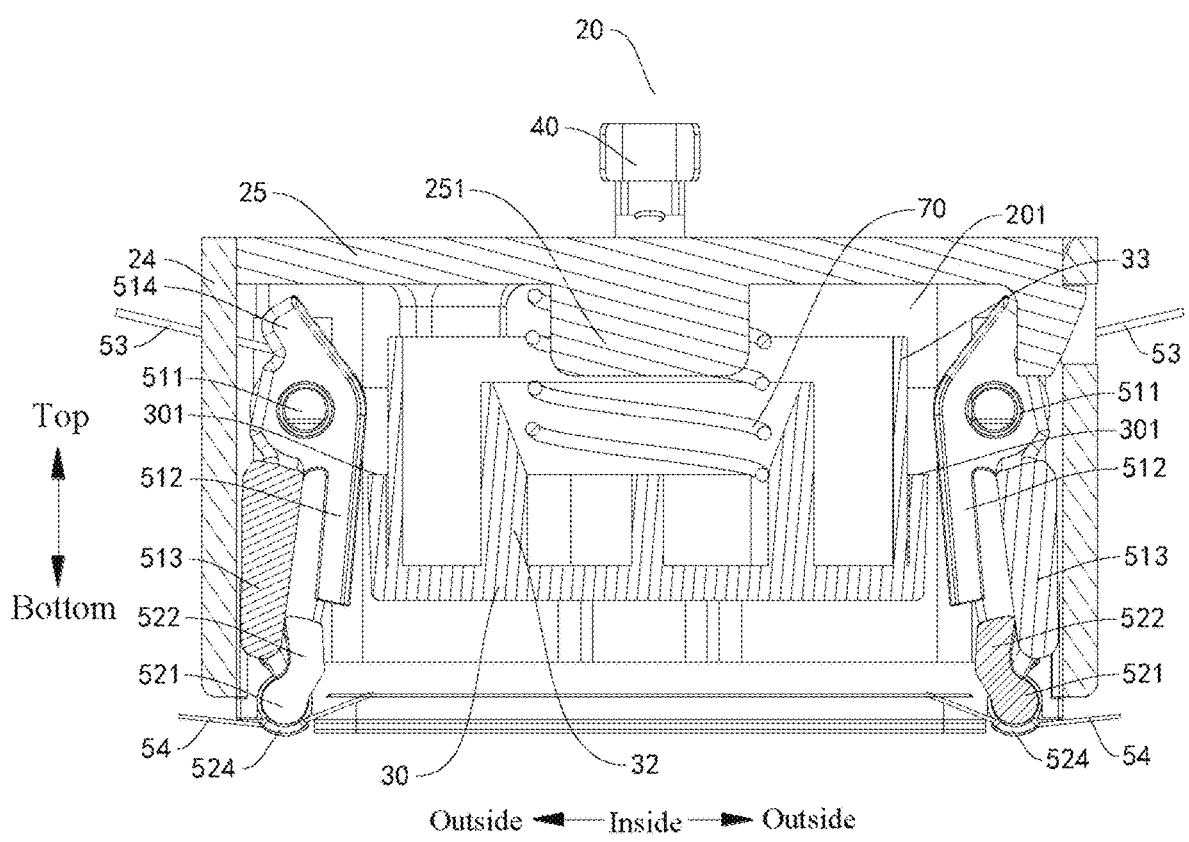
FIG. 5 is a schematic structural diagram of the input end assembly of the power coupler according to the first embodiment of the present disclosure in another state from a certain viewing angle.
Figure 9:
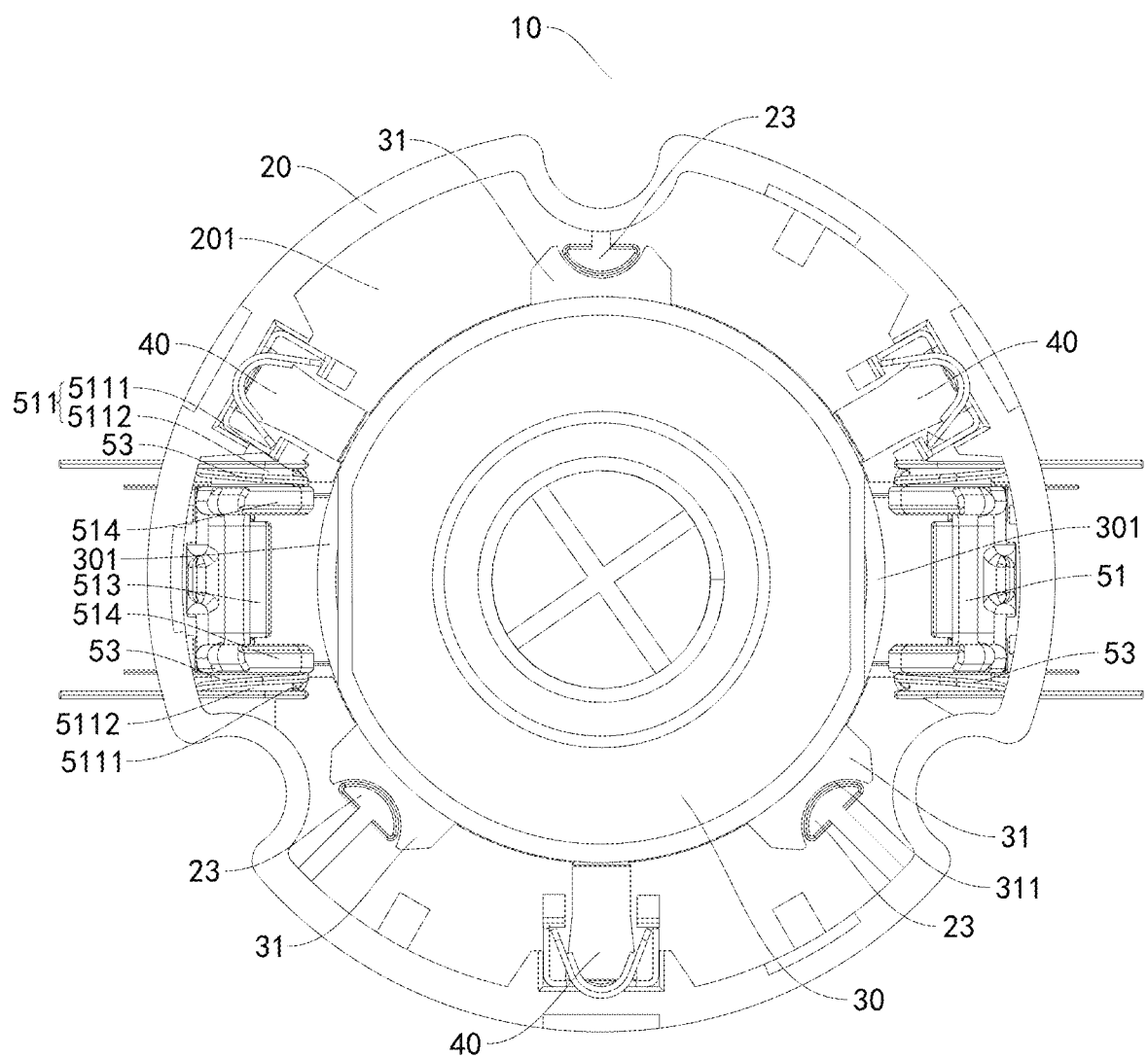
FIG. 9 is a top view of the input end assembly of the power coupler according to the first embodiment of the present disclosure, where a top cover is not included.
Figure 64:
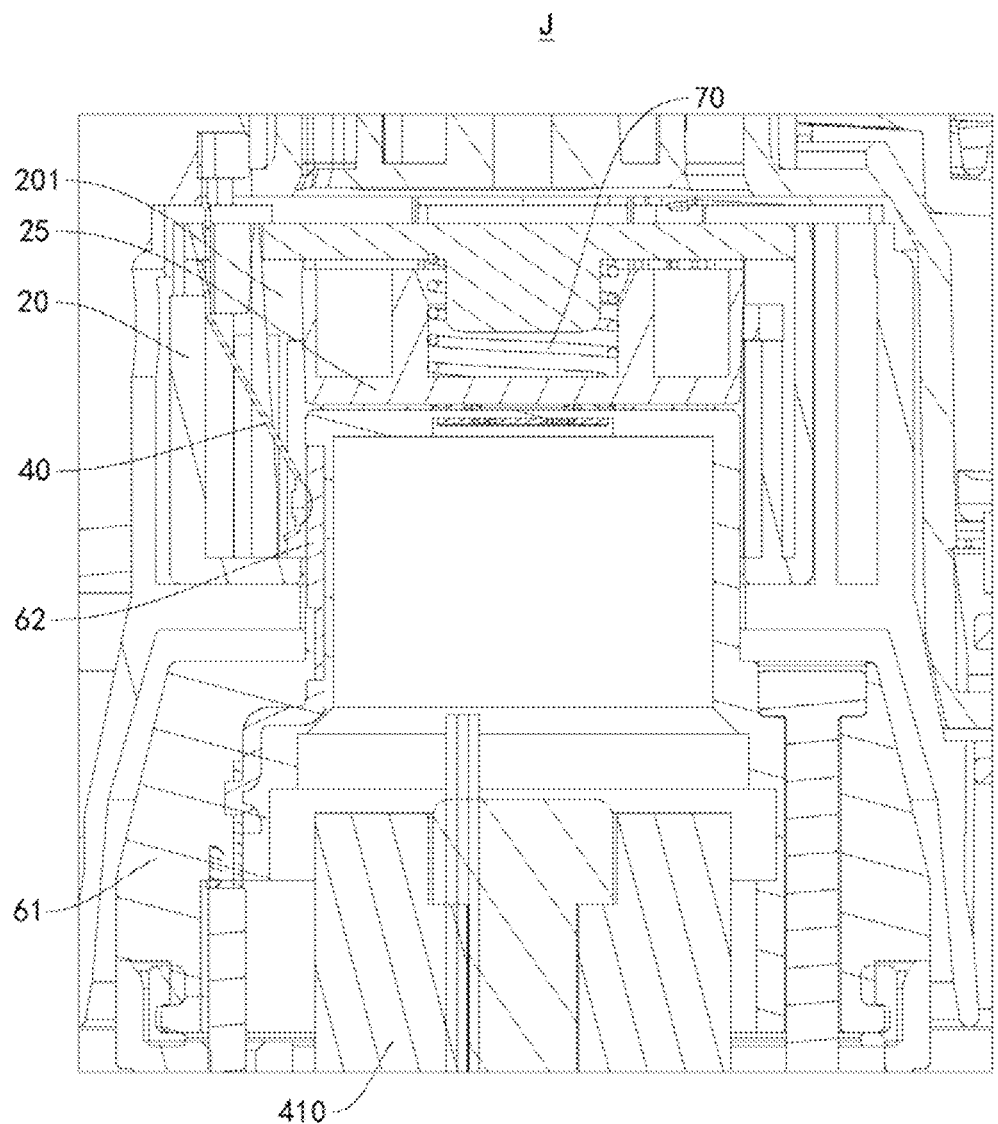
FIG. 64 is a schematic enlarged structural diagram of part J shown in FIG. 63.

As shown in FIGS. 1-5 and FIGS. 25-29, the input end base 20 is internally provided with a slot 201 so as to be formed into a cup seat; and as shown in FIG. 9, the input conductive member 40 is arranged at the input end base 20 to be connected with an external power supply, and the output end assembly 60 is provided with an output conductive member 62. As shown in FIG. 5-64, when the input end assembly 10 is connected to the output end assembly 60, the output conductive member 62 may extend into the slot 201 to be connected with the input conductive member 40, and thus power transmission from the input end assembly 10 to the output end assembly 60 is realized. As shown in FIG. 1 and FIG. 3, when the input end assembly 10 is separated from the output end assembly 60, the output conductive member 62 moves out of the slot 201. The input conductive member 40 is located in the slot 201, a user is difficult to be in contact to the input conductive member 40, and thus reduction in risk of the electrical shock is facilitated.

Furthermore, in the present disclosure, the power coupler 100 further includes a sealing cover 30 and a self-locking structure 50, where the sealing cover 30 may be arranged at the input end base 20 and may move between a closing position and an opening position. As shown in FIG. 1-3, FIGS. 25-28 and FIG. 31, a slot port of the slot 201 may be covered and sealed when the sealing cover 30 is located at the closing position to prevent the user from extending into the slot 210 to be in contact to the input conductive member 40 when the input end assembly 10 is separated from the output end assembly 60, and thus the risk of the electrical shock is further lowered. As shown in FIG. 5 and FIG. 29, the slot port of the slot 201 may be opened when the sealing cover 30 is located at the opening position, such that the output conductive member 62 may extend into the slot 201 to be electrically connected to the input conductive member 40, and the power coupler 100 may be normally used.

Furthermore, continue to refer to FIG. 1, FIG. 2, FIG. 5 and FIGS. 25-29, the self-locking structure 50 may be switched between a locked state and an unlocked state. As shown in FIGS. 1-2 and FIG. 25-16, movement of the sealing cover 30 towards the opening position may be limited when the self-locking structure 50 is in the locked state; and as shown in FIG. 5 and FIG. 29, limitation on the sealing cover 30 is released when the self-locking structure 50 is in the unlocked state.

Thus, when the input end assembly 10 is separated from the output end assembly 60, the output conductive member 62 moves out of the slot 201, the sealing cover 30 is located at the closing position, and the self-locking structure 50 is switched to the locked state, such that the electrical shock accident as the user pushes the sealing cover 30 to extend into the slot 201 is prevented. When the input end assembly 10 is connected to the output end assembly 60, the self-locking structure 50 is in the unlocked state, the sealing cover 30 may move to the opening position, the output conductive member 62 may extend into the slot 201 to be connected to the input conductive member 40, a connection member of the input conductive member 40 and the output conductive member 62 is located in the slot 201, and the user may also be prevented from getting an electric shock by contacting the connection member.

It should be noted that in the present disclosure, the number of the self-locking structure 50 may be adjusted according to the actual needs. In specific embodiments as shown in FIG. 1-5, the power coupler 100 includes two self-locking structure 50 for illustrative purposes only. However, ordinary skill in the art may apparently understand that the solution is applied to a technical solution with one, three or more self-locking structures 50 after reading the technical solution of the present disclosure, which may also fall within the protection scope of the present disclosure.

The power coupler 100 according to the embodiments of the present disclosure has a self-locking function by matching of the sealing cover 30 with the self-locking structure 50, and self locking of the input end assembly 10 can be realized when the input end assembly 10 is separated from the output end assembly 60, such that the input conductive member 40 cannot be exposed outsides, the risk of electric shock of the user is effectively lowered, and the user is safer.

It should be noted that in the disassembling process of the output end assembly 60 and the input end assembly 10, the self-locking structure 50 may realize state switching automatically and also manually by the user to meet different application demands. In some embodiments, when the output end assembly 60 is separated from the input end assembly 10, the self-locking structure 50 may be automatically switched to the locked state; and in the process that the output end assembly 60 is connected to the input end assembly 10, the self-locking structure 50 may be switched to the unlocked state under the pushing of the output end assembly 60. Thus, state switching of the self-locking structure 50 may be realized without additional operation by the user, such that the situation that the user forgets operation to enable the input end assembly 10 not to be self-locked is prevented, the operation steps during mounting of the output end assembly 60 and the input end assembly 10 are also reduced, and mounting is more convenient.

Figure 10:
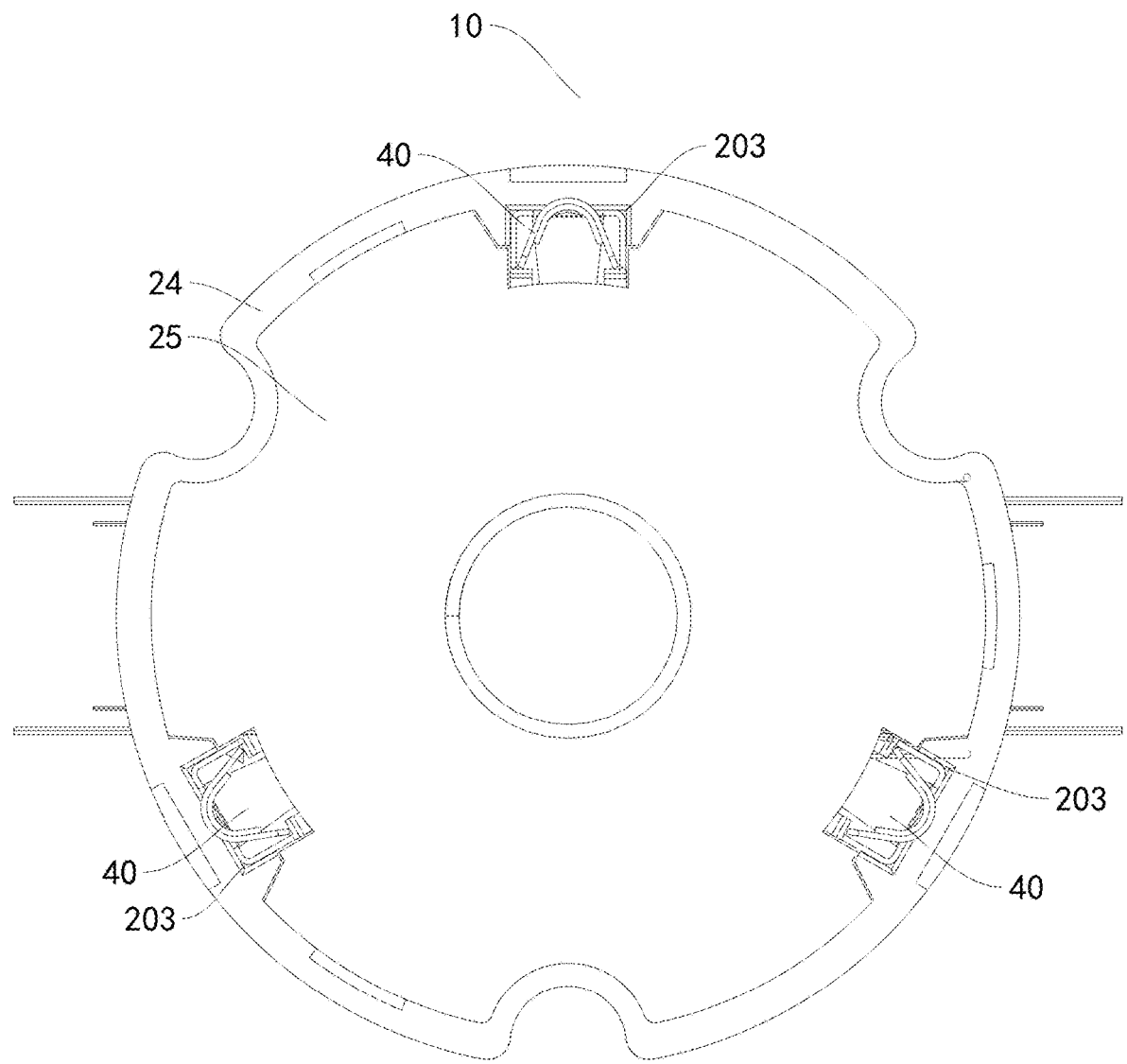
FIG. 10 is a top view of the input end assembly of the power coupler according to the first embodiment of the present disclosure.

It should be noted that the present disclosure does not make particular limitation to a connection structure of the input conductive member 40 and the input end base 20. For example, in some embodiments, as shown in FIG. 3, FIG. 10, FIG. 20, FIG. 30 and FIG. 33, mounting clamping grooves 203 may be formed in the inner wall of the input end base 20, and power supply line holes may be formed in the top wall of the input end base 20 and may communicate with the corresponding mounting clamping grooves 203. As shown in FIG. 4, each input conductive member 40 may include a terminal member 41 and an electrode member 42, As shown in FIG. 3 and FIG. 10, the terminal members 41 may be locked into the corresponding mounting clamping grooves 203 to realize connection of the input conductive member 40 to the input end base 20, and each terminal member 41 may be electrically connected to the external power supply. Alternatively, the terminal members 41 may penetrate through the power supply line holes to realize external electric connection to the external power supply, or the external power supply may penetrates through the power supply line holes to realize internal electric connection to the terminal members 41, even or the connection members of the terminal members 41 and the external power supply may be located in the power supply line holes respectively.

As shown in FIG. 3, FIG. 4 and FIG. 64, the electrode members 42 may be connected to the lower ends of the corresponding terminal members 41 and may extend out of the corresponding mounting clamping grooves 203 and into the slot 201 to realize electric connection to the output conductive member 62 in the slot 201; and as an electric connection structure is located in the slot 201, use is safer and more reliable.

Further, as shown in FIG. 3 and FIG. 4, clamping ports 204 may be formed in the groove bottom walls of the mounting clamping grooves 203 respectively, the terminal members 41 may be provided with clamping plates 401, and the clamping plates 401 may be clamped into the clamping ports 204 respectively to limit an axial position of the input conductive member 40 and the input end base 20 when the terminal members 41 is clamped into the mounting clamping grooves 203 respectively.

Figure 25:
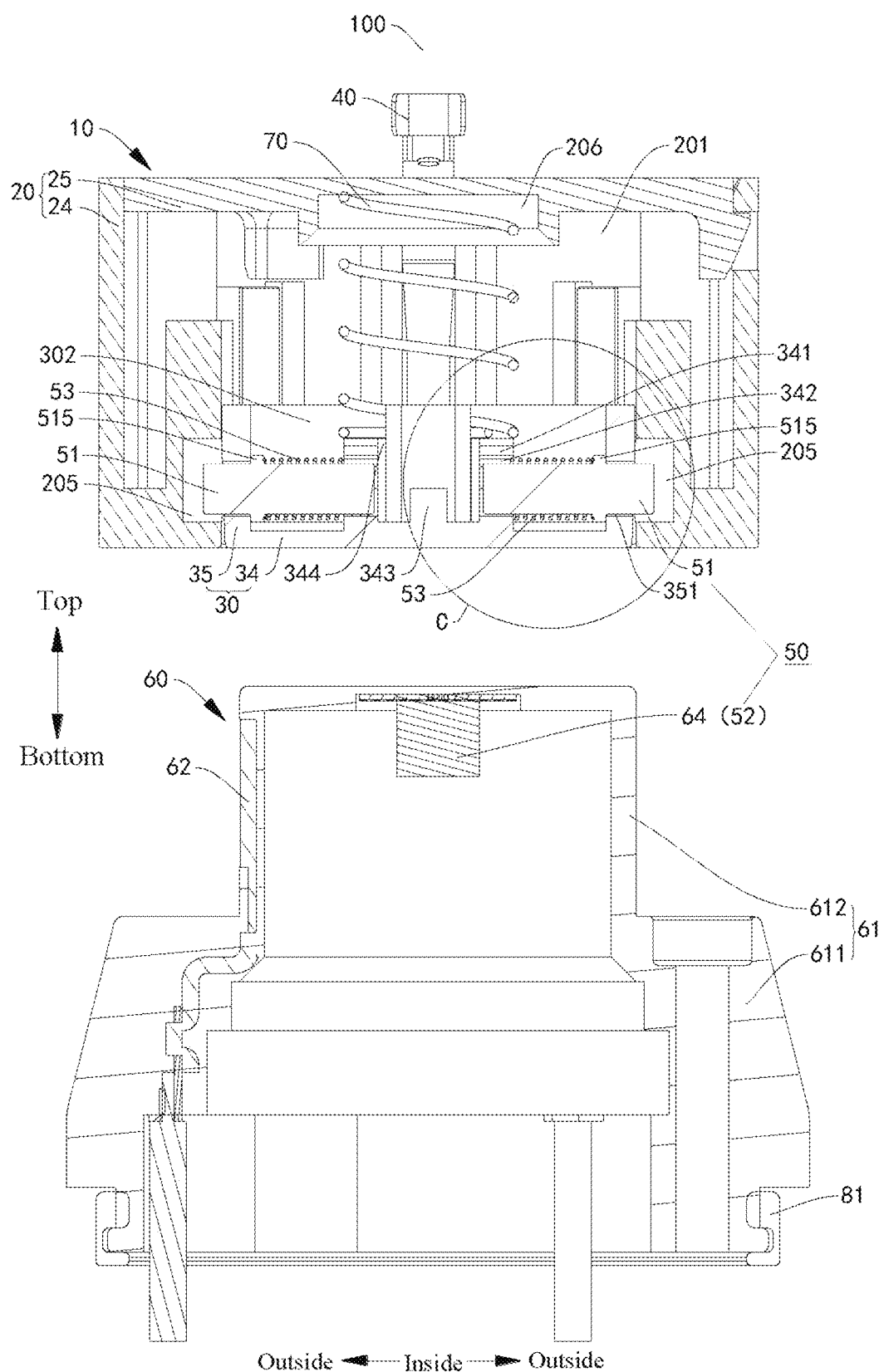
FIG. 25 is a schematic structural diagram of a power coupler according to a second embodiment of the present disclosure in one state.

In some embodiments of the present disclosure, as shown in FIG. 1 and FIG. 25, the self-locking structure 50 may include: stoppers 51 and drivers 52, where the stoppers 51 are connected to the input end base 20 or the sealing cover 30 and may move between the first position as shown in FIGS. 1-2 and FIGS. 25-26 and the second position as shown in FIG. 5 and FIG. 29. The stoppers 51 may stop the sealing cover 30 from moving towards the opening position when being located in the first position, such that the sealing cover 30 keeps a state of covering and sealing the slot port of the slot 201 and is always at the closing position. The stoppers 51 releases stopping to the sealing cover 30 when being in the second position, such that the sealing cover 30 may move towards the interior of the slot 201. Furthermore, the stoppers 51 are usually at the first position, that is, the stoppers 51 usually stop the sealing cover 30 to enable the sealing cover 30 not to move towards the opening position, such that the slot port of the slot 201 is usually in a covering and sealing state, and the effect of preventing electric shock is better.

The drivers 52 may be connected to the input end base 20 or may be arranged at the output end assembly 60 and may drive the stoppers 51 to move to the second position when the output end assembly 60 is inserted into the input end assembly 10. The drivers 52 may switch a mounting action of the output end assembly 60 to movement of the stoppers towards the second position, and thus the structure design is reasonable.

For example, in specific embodiments as shown in FIGS. 1-5, the drivers 52 are connected to the input end base 20, and the output end assembly 60 pushes the drivers 52 to rotate relative to the input end base 20 when the output end assembly 60 is inserted into the input end assembly 10; and in the process that the drivers 52 rotate from the position as shown in FIG. 1 to the position as shown in FIG. 5, the drivers 52 may generate extrusion with the stoppers 51 to enable the stoppers 51 to rotate relative to the input end base 20, and thus the stoppers 51 release limitation to the sealing cover 30.

It should be noted that, for easy understanding, the position shown in a block in FIG. 1 shows corresponding position states of each driver 52 when the corresponding stopper 51 is at the first position and the second position at the same time, rather than one position is provided with two drivers 52.

Figure 26:
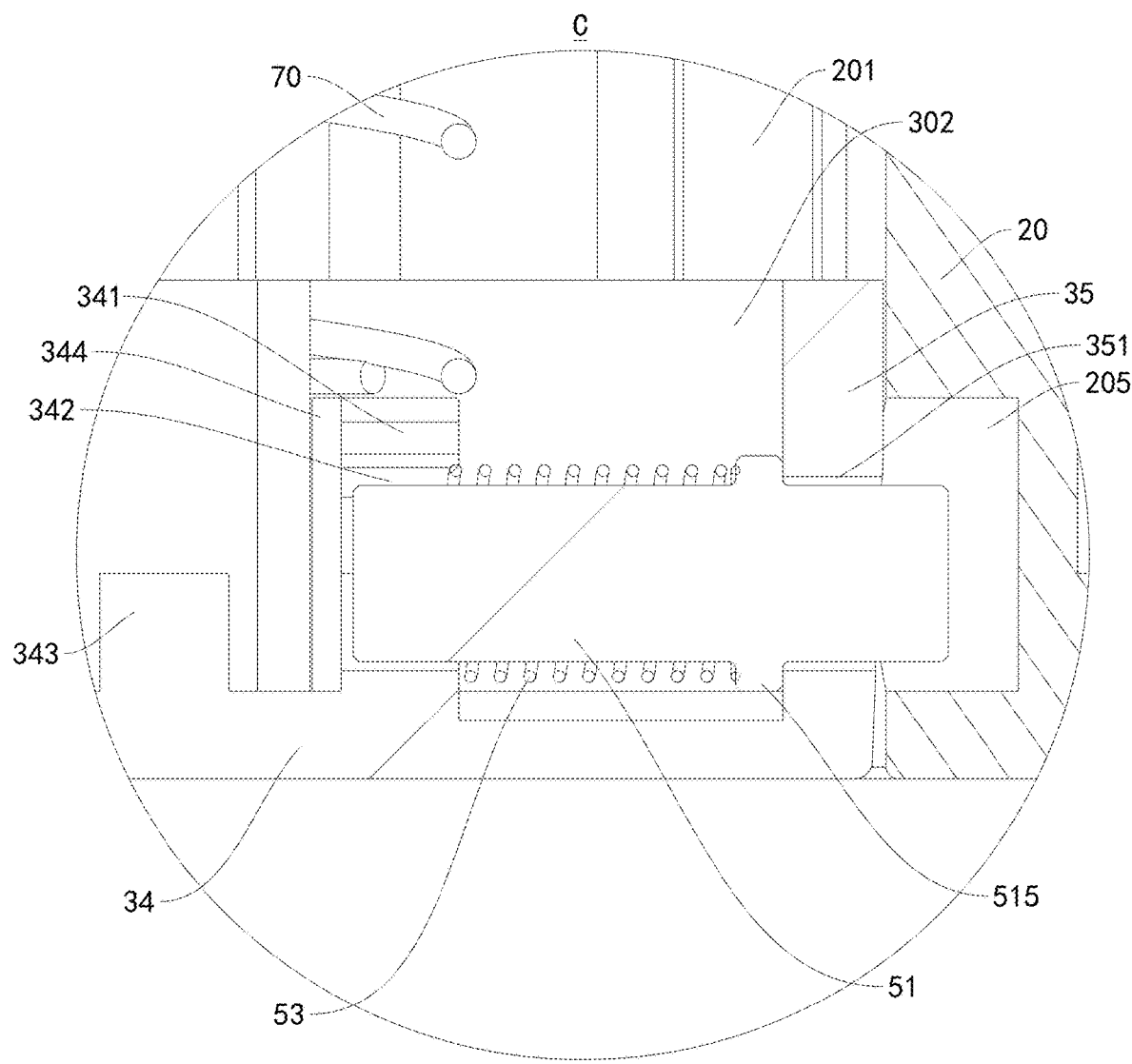
FIG. 26 is a schematic enlarged structural diagram of part C shown in FIG. 25.

In accordance with a further embodiment of the present disclosure, the stoppers 51 may be rotatably connected to the input end base 20 as shown in FIG. 1 and FIG. 2 or as shown in FIG. 25 and FIG. 26. The self-locking structure 50 may further includes a stopping reset members 53; and the stopping reset members 53 may be connected to the input end base 20 and may apply action forces to the corresponding stoppers 51 to enable the corresponding stoppers 51 to move towards the first position. That is, the stopping reset members 53 may usually drive the corresponding stoppers 51 to be at the first position, such that self locking of the input end assembly 10 is realized, and the situation that the user forgets operation to enable the input end assembly 10 to be self locked when the input end assembly 10 is separated from the output end assembly 60 is prevented.

Figure 6:
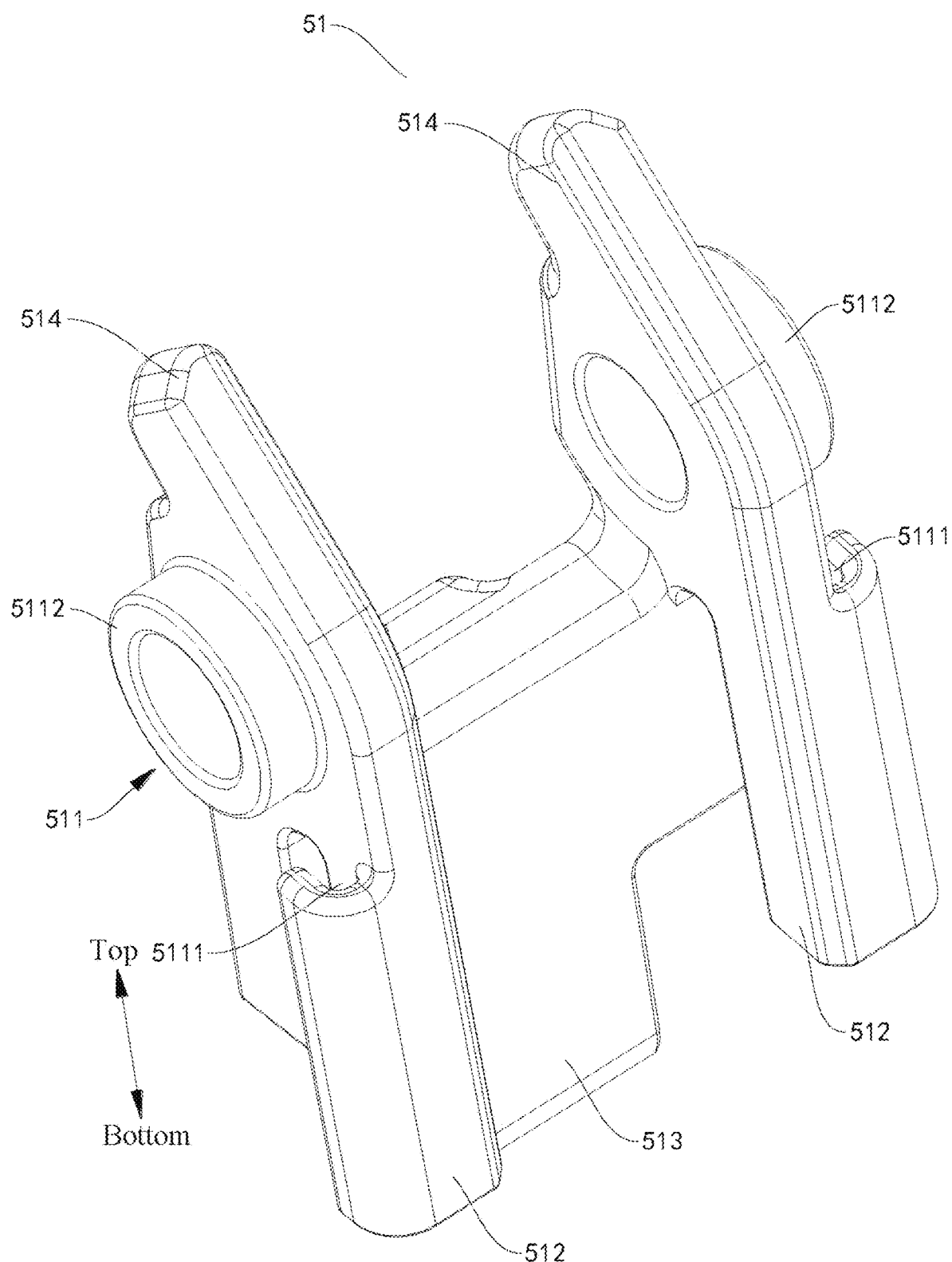
FIG. 6 is a schematic structural diagram of a stopper of the power coupler according to the first embodiment of the present disclosure.
Figure 8:
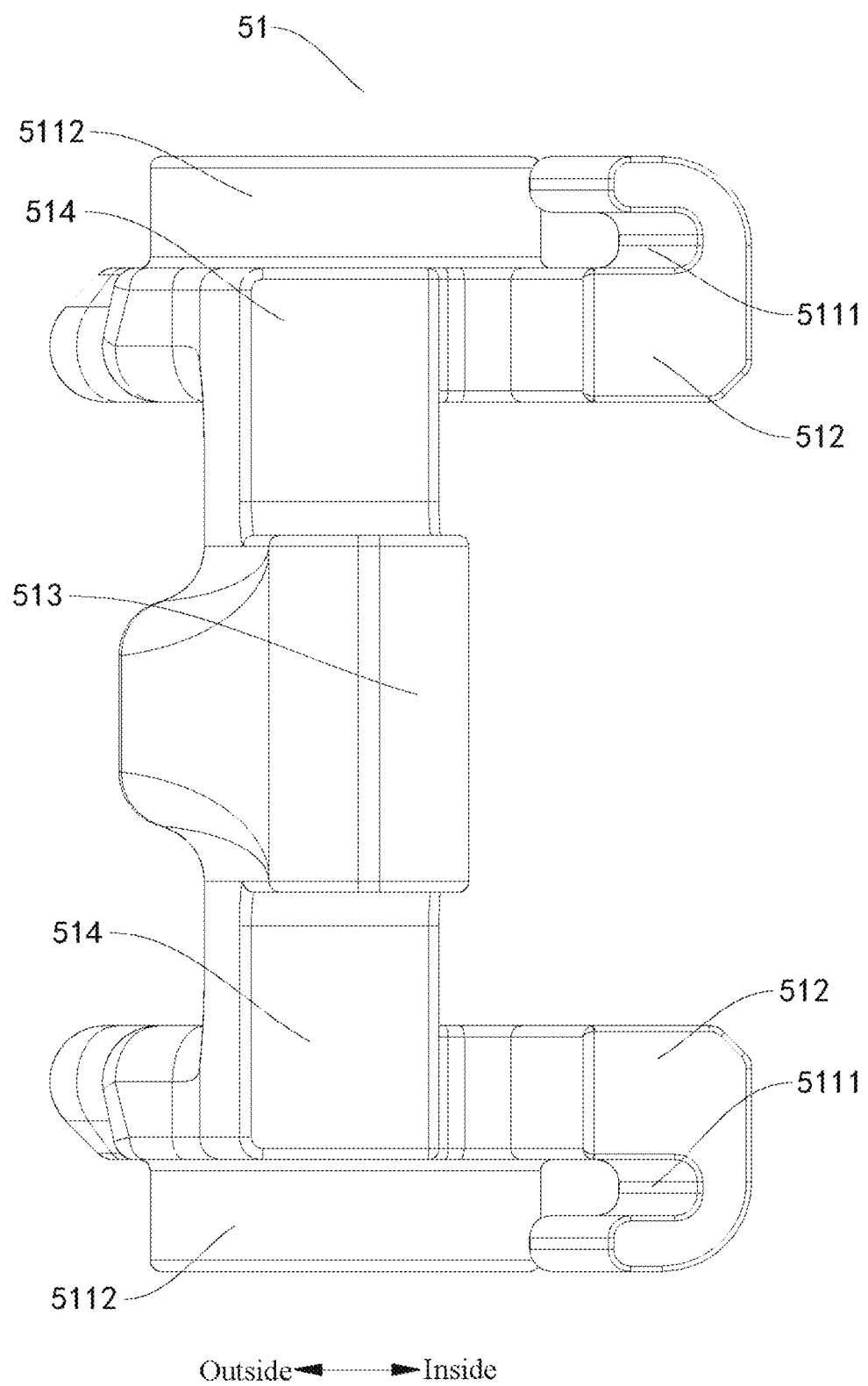
FIG. 8 is a top view of the power coupler according to the first embodiment of the present disclosure.

Further, as shown in FIG. 6 and FIG. 8, in the embodiment, in which the stoppers 51 are rotatably connected to the input end base 20, each stopper 51 may include: a connection member 511, a stopping member 512 and a drive matching member 513. As shown in FIG. 1 and FIG. 9, the stopping members 512 and the drive matching member 513 are connected to the connection member 511 separately, the stopping members 512 may stop the sealing cover 30, the drive matching member 513 may be matched with the drivers 52, and the connection members 511 is rotatably connected to the input end base 20. Therefore, movement of the drivers 52 may drive the drive matching member 513 to move, movement of the drive matching member 513 may drive the connection members 511 to rotate relative to the input end base 20, and thus the stopping members 512 are driven to rotate relative to the input end base 20 to realize stopping and stopping release between the stopping members 512 and the sealing cover 30.

Figure 14:
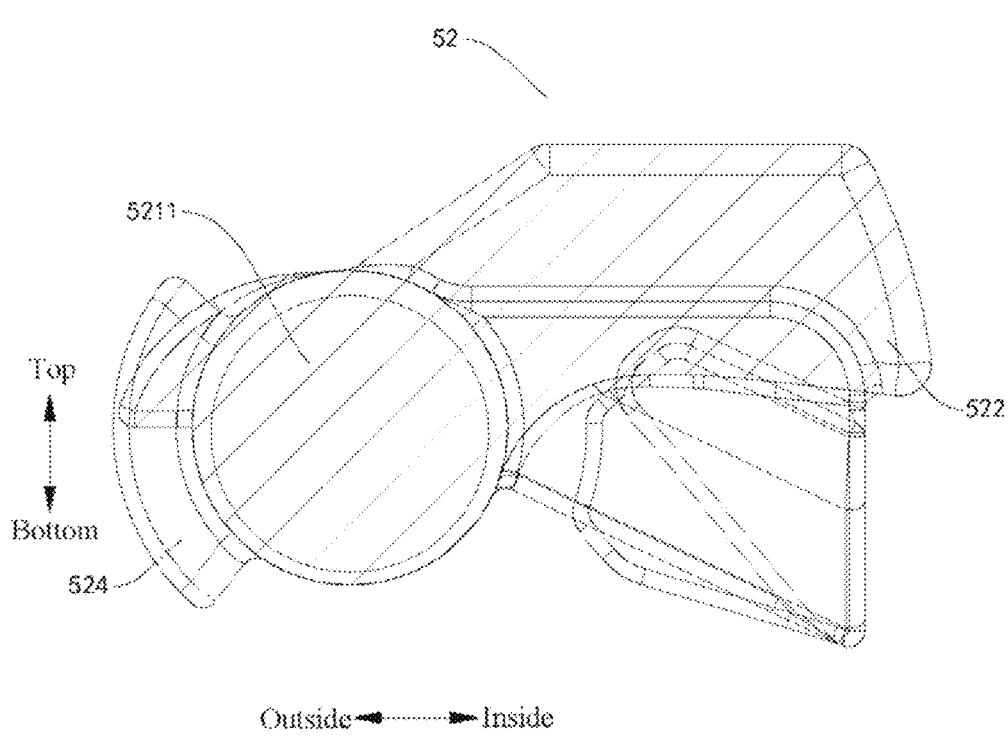
FIG. 14 is a cross-sectional view of the driver of the power coupler according to the first embodiment of the present disclosure.
Figure 18:
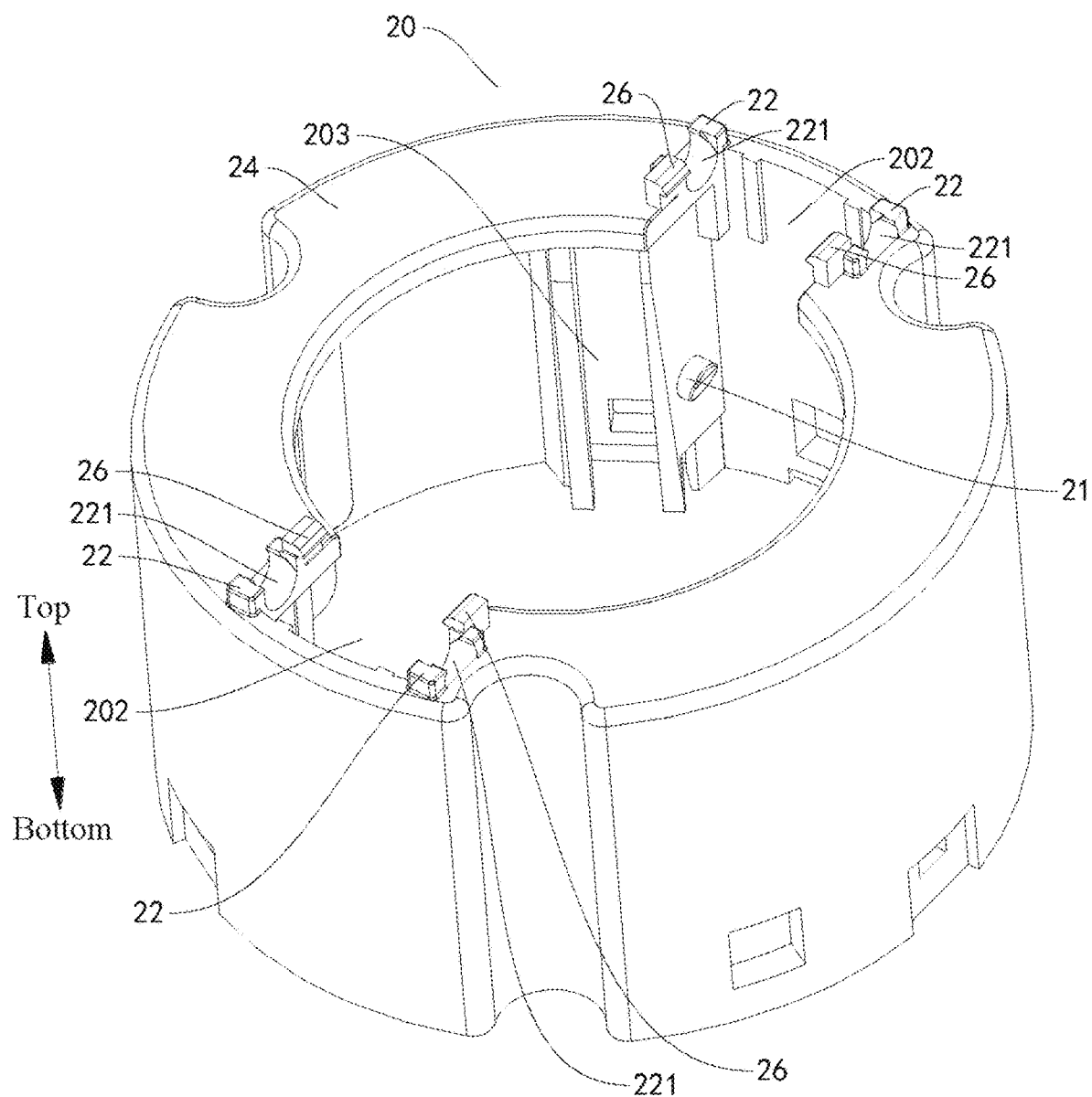
FIG. 18 is a schematic structural diagram of an input end base of the power coupler according to the first embodiment of the present disclosure from a certain viewing angle, where the top cover is not included.
Figure 19:
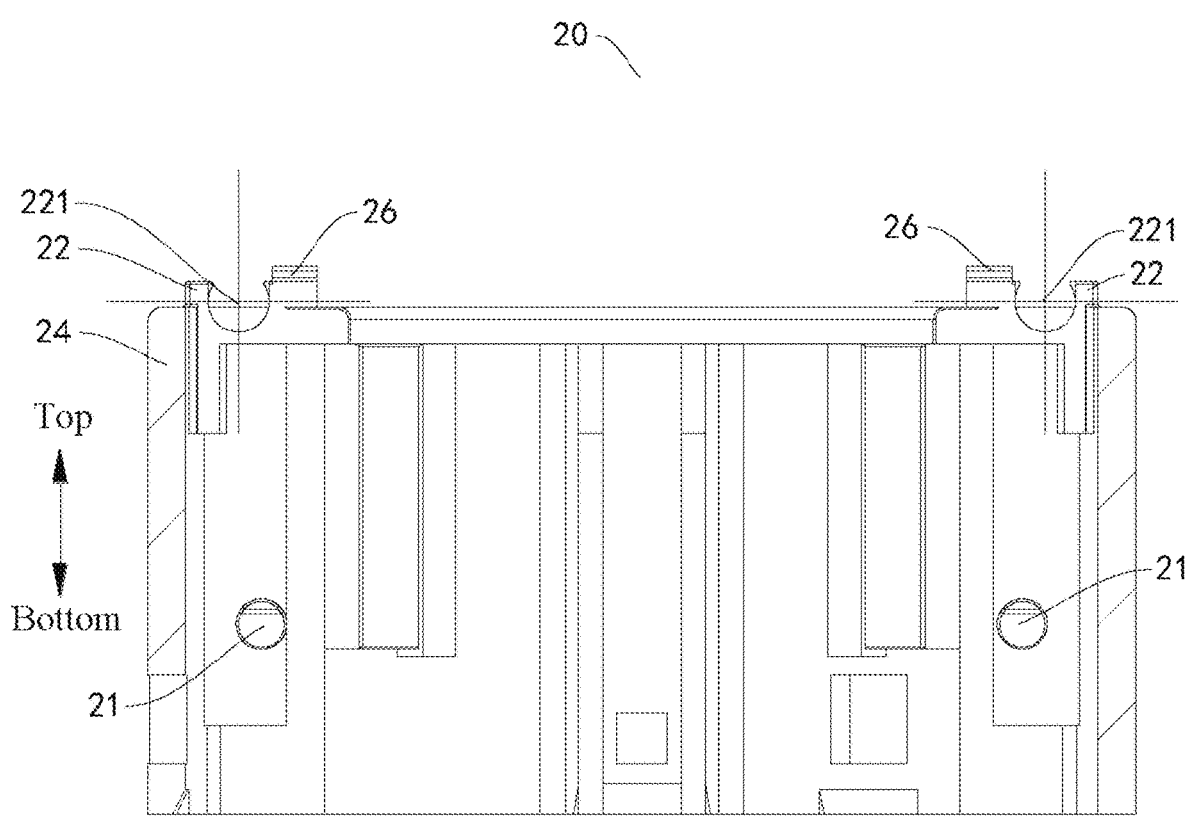
FIG. 19 is a cross-sectional view of the input end base of the power coupler according to the first embodiment of the present disclosure, where the top cover is not included.
Figure 20:
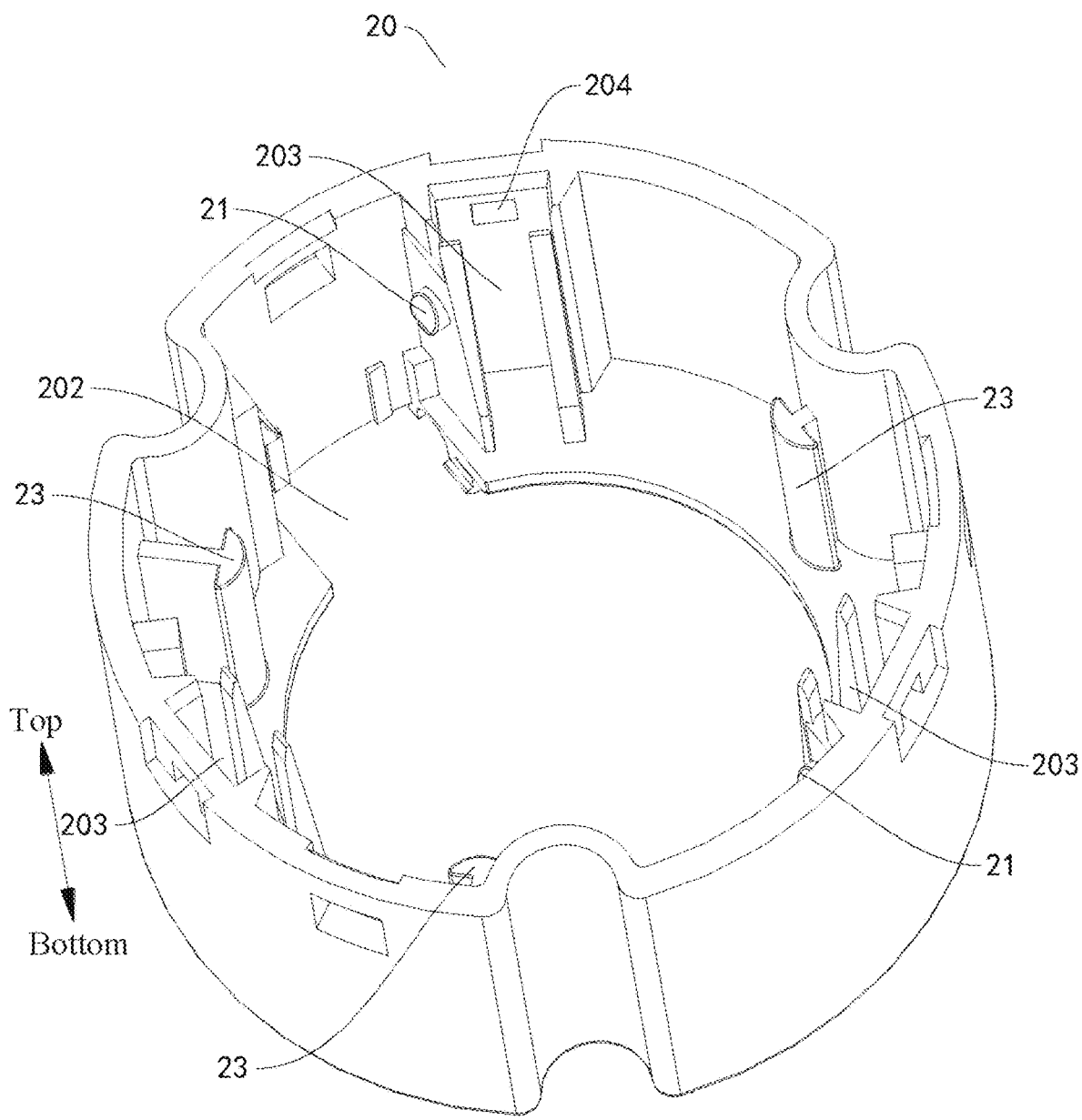
FIG. 20 is a schematic structural diagram of the input end base of the power coupler according to the first embodiment of the present disclosure from another viewing angle, where the top cover is not included.
Figure 21:
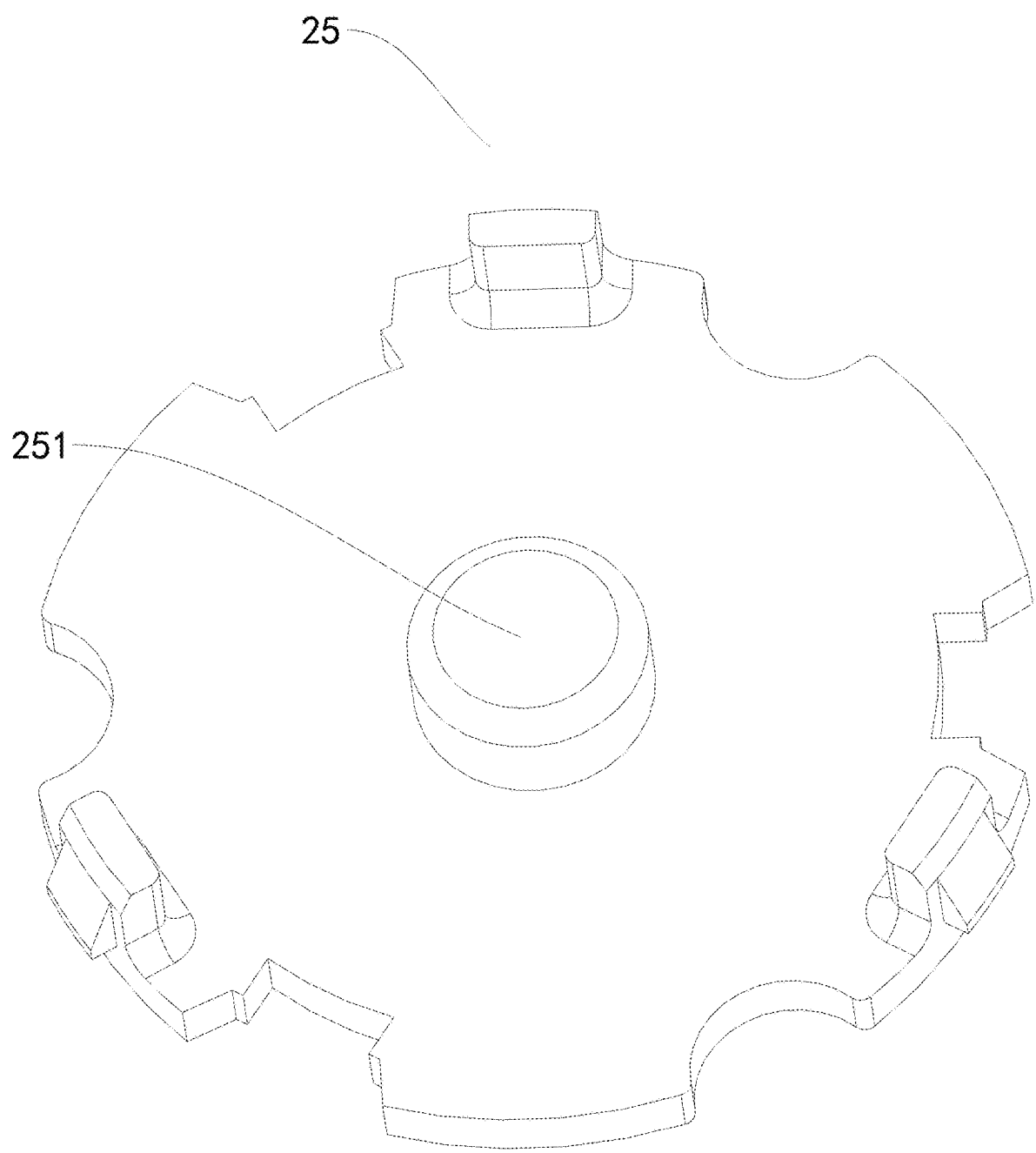
FIG. 21 is a schematic structural diagram of the top cover of the power coupler according to the first embodiment of the present disclosure.

According to some embodiments of the present disclosure, as shown in FIG. 1 and FIG. 14, each stopping reset member 53 may be a torsional spring; and as shown in FIG. 18-20, the input end base 20 may be provided with rotation shafts 21, and each connection member 511 may be provided with a first limiting slot 5111 and a rotary drum 5112. The rotary drums 5112 may be arranged at the corresponding rotation shafts 21 in a sleeved manner to rotate, such that the stopper 51 is difficult to offset or fall off when rotating relative to the input end base 20, and rotation is smoother. As shown in FIG. 9, a coil of each torsional spring may be arranged at the corresponding rotary drum 5112 in a sleeved manner, one end of each torsional spring is connected to the input end base 20, and the other end of each torsional spring may be arranged in the corresponding first limiting slot 5111, such that each torsional spring is firmly and reliably fixed and difficulty loosened.

Certainly, in some other embodiments, the rotation shafts 21 and the rotary drums 5112 may be exchanged in position, that is, the input end base 20 may be provided with the rotary drums 5112, and the connection members 511 may be provided with the rotation shafts 21, which may also realize rotatable connection between the stoppers 51 and the input end base 20.

Furthermore, it should be noted that particular limitation is not made to a connection structure of one end of each torsional spring and the input end base 20. For example, the input end base 20 may be provided with the fixation holes or fixed grooves, and one ends of the torsional springs may extend into the corresponding fixation holes or fixed grooves, such that one ends of the torsional springs are more reliable in fixing with the input end base 20. For another example, one ends of the torsional springs may abut against the inner wall face of the input end base 20, which may also provide supporting to the torsional springs when the other ends of the torsional springs are extruded by the corresponding stoppers 51 to enable the torsional springs to apply the action forces to the corresponding stoppers 51.

Further, as shown in FIGS. 18-20, two rotation shafts 21 are provided, and a fixed end of each rotation shaft 21 is connected to the input end base 20; two rotary drums 5112 are provided and are arranged at the two ends of a rotating axis of the corresponding stopper 51; and the rotation shafts 21 are clamped into the rotary drums 5112 in one-to-one correspondence. When the stoppers 51 are mounted at the input end base 20, the rotary drums 5112 are inserted in radial directions of the corresponding rotation shafts 21 until the rotation shafts 21 are clamped into the corresponding rotary drums 5112. At least a portion of an end surface of a free end of each rotation shaft 21 is formed into an inclined surface, the inclined surface slantingly extends in a direction close to the downside and close to another rotation shaft 21 along an inserting manner of the corresponding rotary drum 5112. When the rotary drums 5112 are inserted in the radial directions of the corresponding rotation shafts 21, the inclined surfaces may guide the corresponding rotary drum 5112, such that mounting of the stoppers 51 is more simple and labor saving.

Figure 7:
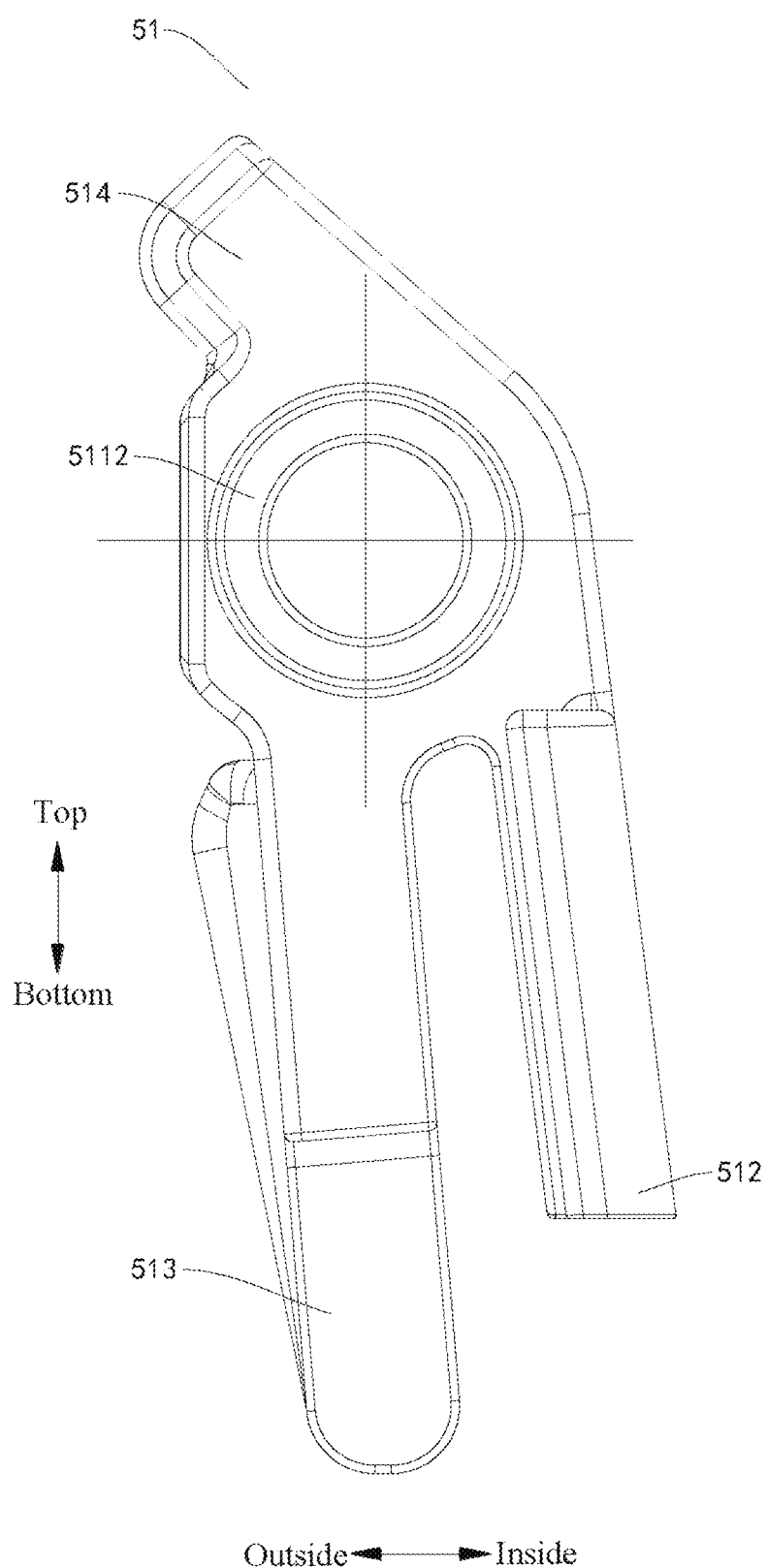
FIG. 7 is a front view of the stopper of the power coupler according to the first embodiment of the present disclosure.

Alternatively, the first limiting slots 5111 may be arranged at the corresponding stopping members 512 or drive matching members 513. For example, in the specific embodiments as shown in FIG. 6-8, there are two stopping members 512 arranged at the two axial ends of each stopper 51 respectively, a drive matching member 513 is arranged at the middle part of each stopper 51, and the size of the free end of the drive matching member 513 in the axial direction of each stopper 51 is smaller than that of the fixed end of the corresponding drive matching member 513 in the axial direction of each stopper 51. Flangings are formed at one sides, away from each other, of the two stopping members 512, the flangings and the stopping members 512 collectively define the first limiting slots 5111; the two torsional springs may act on the corresponding stopper 51 from the two axial ends of the stopper 51 when being inserted into the two first limiting slots 5111 respectively, such that the stopper 51 is more uniformly stressed; and furthermore, interference is not generated on both of matching of the drivers 52 and the corresponding drive matching members 513 and matching of the torsional springs, the stoppers 512 and the sealing cover, such that structure design is more reasonable.

In some embodiments of the present disclosure, as shown in FIG. 1, FIG. 5, FIG. 11 and FIG. 12, limiting mesas 301 may be arranged at the outer peripheral face of the sealing cover 30. The stoppers 51 may be interfered with the corresponding limiting mesas 301 to stop the sealing cover 30 from moving towards the opening position when being at the first position; and the stoppers 51 may move outsides to avoid the corresponding limiting mesas 301 when being at the second position.

For example, in examples that each stopper 51 includes the stopping member 512, as shown in FIG. 1 and FIG. 5, the sealing cover 30 move upwards to realize movement from the first position to the second position; shown in FIG. 1, each limiting mesa 301 is a stepped platform formed at the outer peripheral face of the sealing cover 30; and when the stoppers 51 are located at the first position, the free ends of the stopping members 512 may abut against the upper surfaces of the corresponding stepped platform or are spaced from the upper surfaces of the corresponding stepped platform by a relatively small distance, such that the sealing cover 30 cannot move into the slot to expose the output conductive member 40. As shown in FIG. 5, when the stoppers 51 are located at the second position, the second position 512 rotate along with the corresponding stoppers 51, the free ends of the second positions 512 move towards a direction of the axis of the sealing cover 30 in a radial direction of the sealing cover 30, such that the free ends of the second position 512 are located on the outer sides of the corresponding stepped platforms to release limiting effect to the stepped platforms, and the sealing cover 30 may move upwards.

Further, as shown in FIGS. 5-7, each stopper 51 may be further provided with a limiting convex rib 514; when the sealing cover 30 is not mounted at the input end base 20, the limiting convex rib 514 may abut against the input end base 20 to limit an angle of each stopper 51 rotating inwards, and thus the situation that the sealing cover 30 is interfered with each stopper 51 when being mounted is prevented. When the sealing cover 30 is mounted at the input end base 20, the angle of each stopper 51 rotating inwards may be limited by abutting the corresponding limiting convex rib 514 to the input end base 20 and may also be limited by abutting each stopper 51 to the sealing cover 30, which are all within the scope of the present disclosure.

For some embodiments according to the present disclosure, as shown in FIGS. 1-5, each driver 52 is rotatably connected to the input end base 20, the self-locking structure 50 may further includes the drive reset members 54, and each drive reset member 54 may be connected to the input end base 20 and may apply reset force to the corresponding driver 52 to enable the driver 52 to be restored to an initial position. Thus, after the output end assembly 60 is separated from the input end assembly 10, under the effect of the reset force of each drive reset member 54, the corresponding driver 52 may automatically rotate to the initial position as shown in FIG. 1, such that each driver 52 releases the drive action to the corresponding stopper 51 to enable the stopper 51 to move to the first position to limit movement of the sealing cover 30. The input end assembly 60 may compress the drive reset members 54 when being inserted into the input end assembly 10, such that the reset forces of the drive reset members 54 are overcome to enable the corresponding drivers 52 to rotate.

Figure 13:
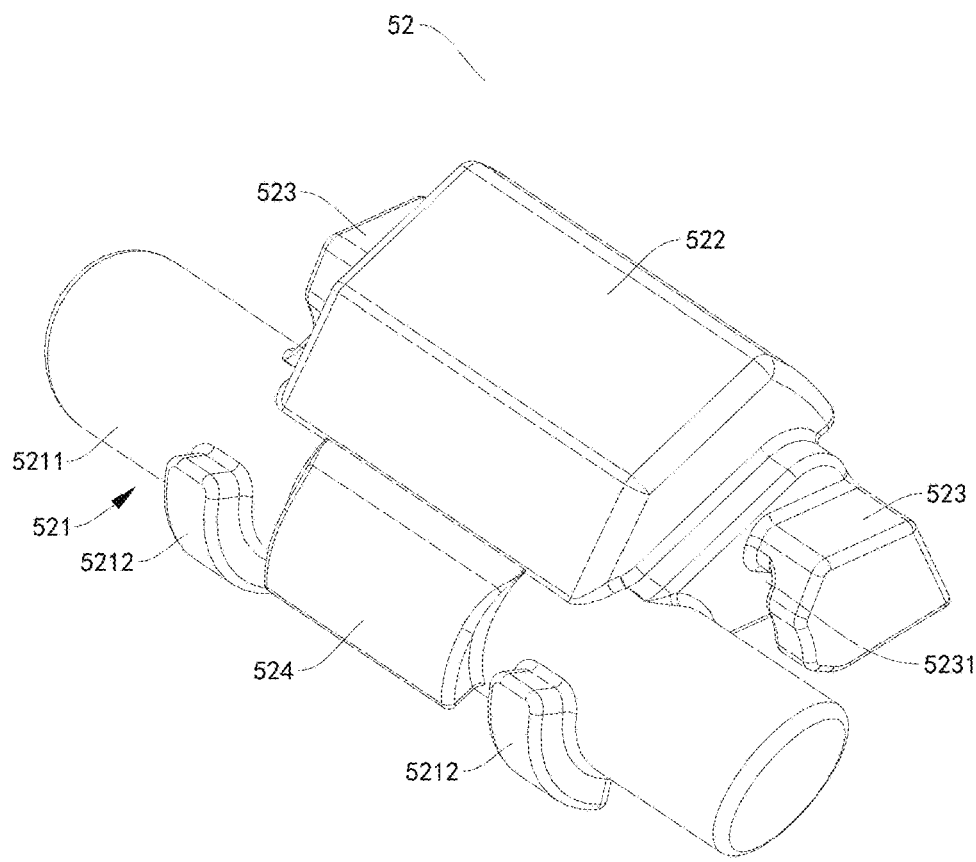
FIG. 13 is a schematic structural diagram of a driver of the power coupler according to the first embodiment of the present disclosure.
Figure 15:
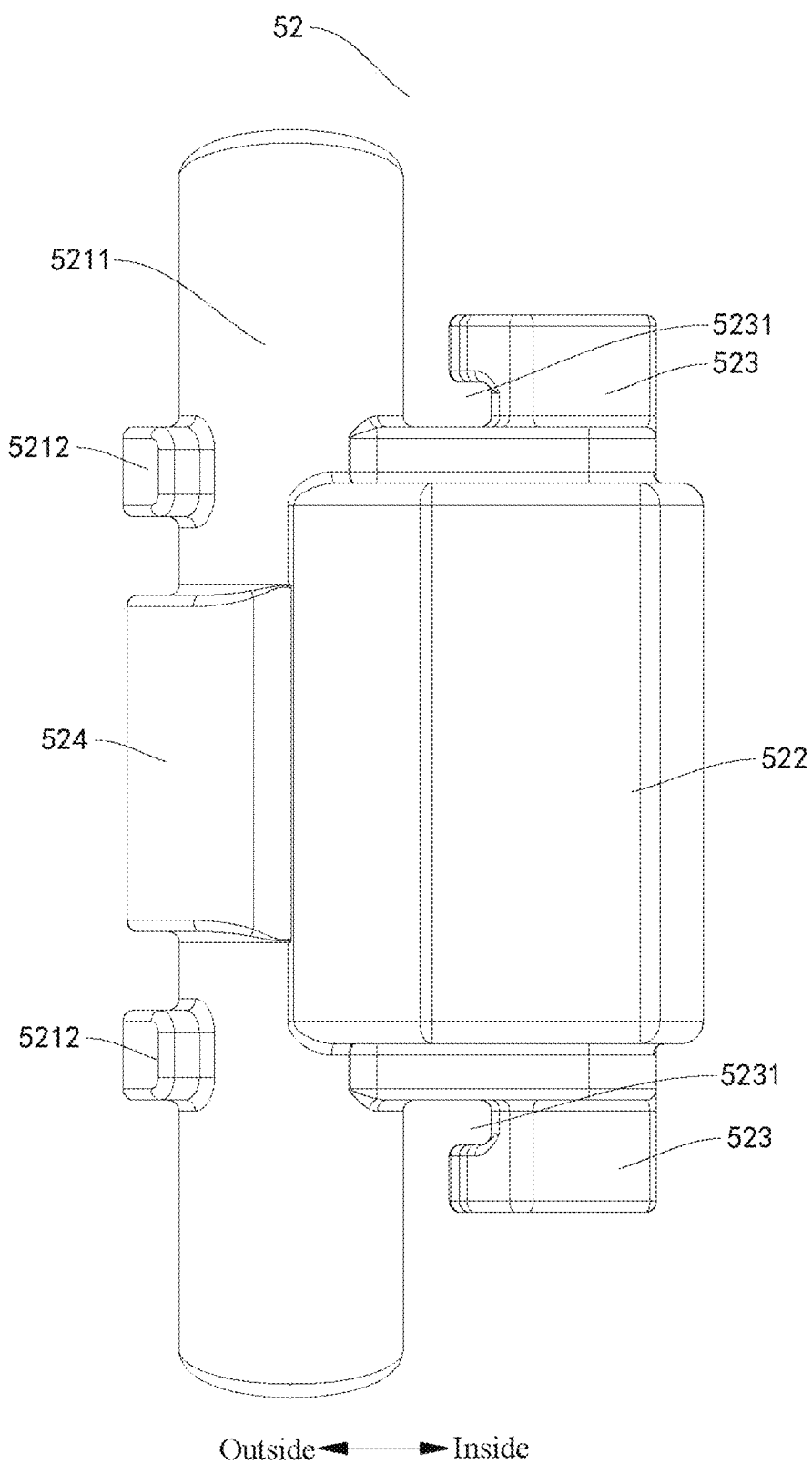
FIG. 15 is a top view of the driver of the power coupler according to the first embodiment of the present disclosure.

Further, as shown in FIGS. 13-15, each driver 52 may include: a drive connection member 521, a drive member 522 and a limiting matching member 523. Each drive member 522 may be connected to the corresponding drive connection member 521, may drive the corresponding stopper 51 to rotate and may be rotatably connected to the input end base 20. Thus, each driver 52 may drive the corresponding drive member 522 to rotate when rotating relative to the input end base 20 to realize matching and matching escapement of each driver 52 with the corresponding stopper 51.

Figure 16:
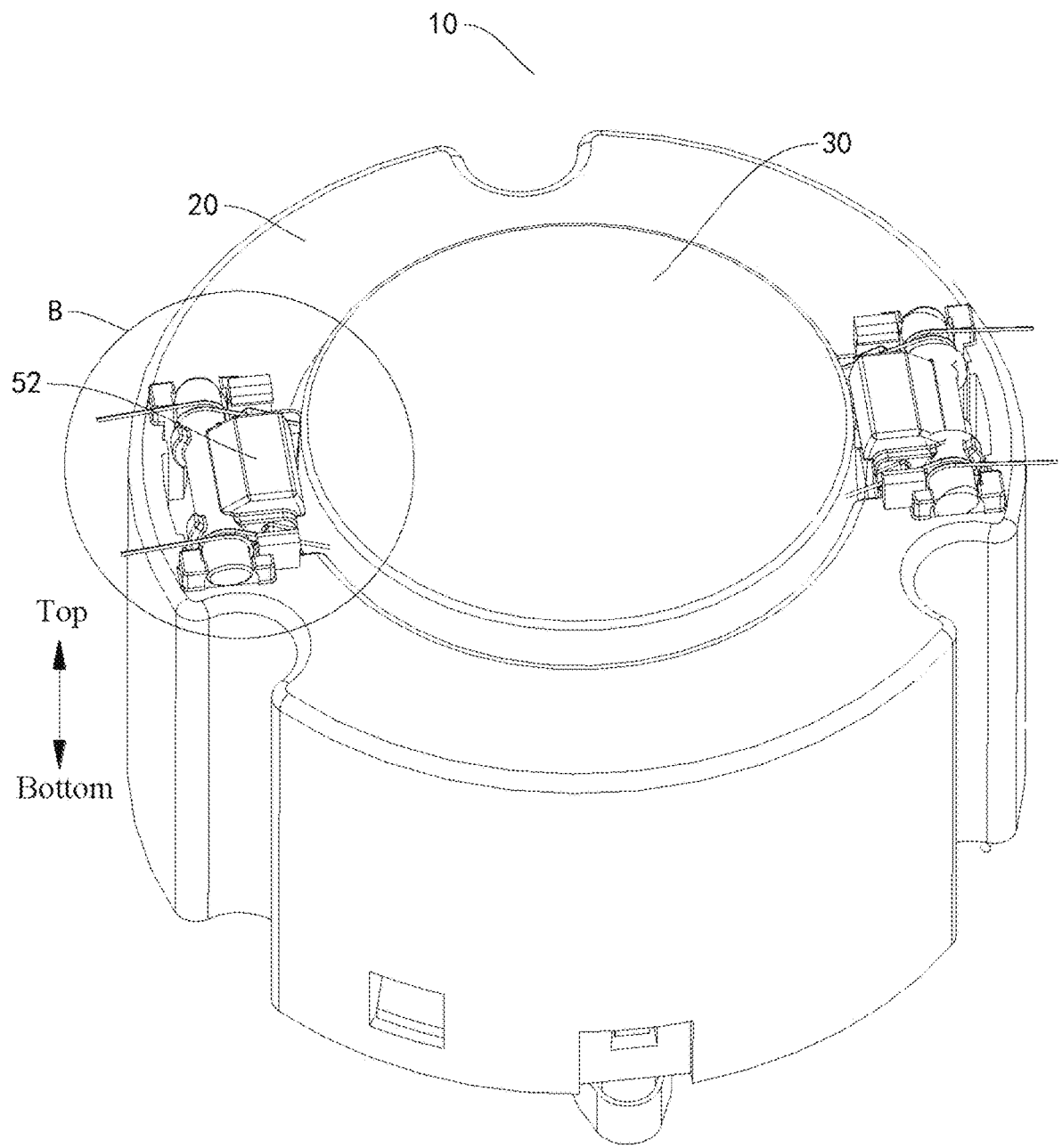
FIG. 16 is a schematic structural diagram of an angle of the input end assembly of the power coupler according to the first embodiment of the present disclosure.
Figure 17:
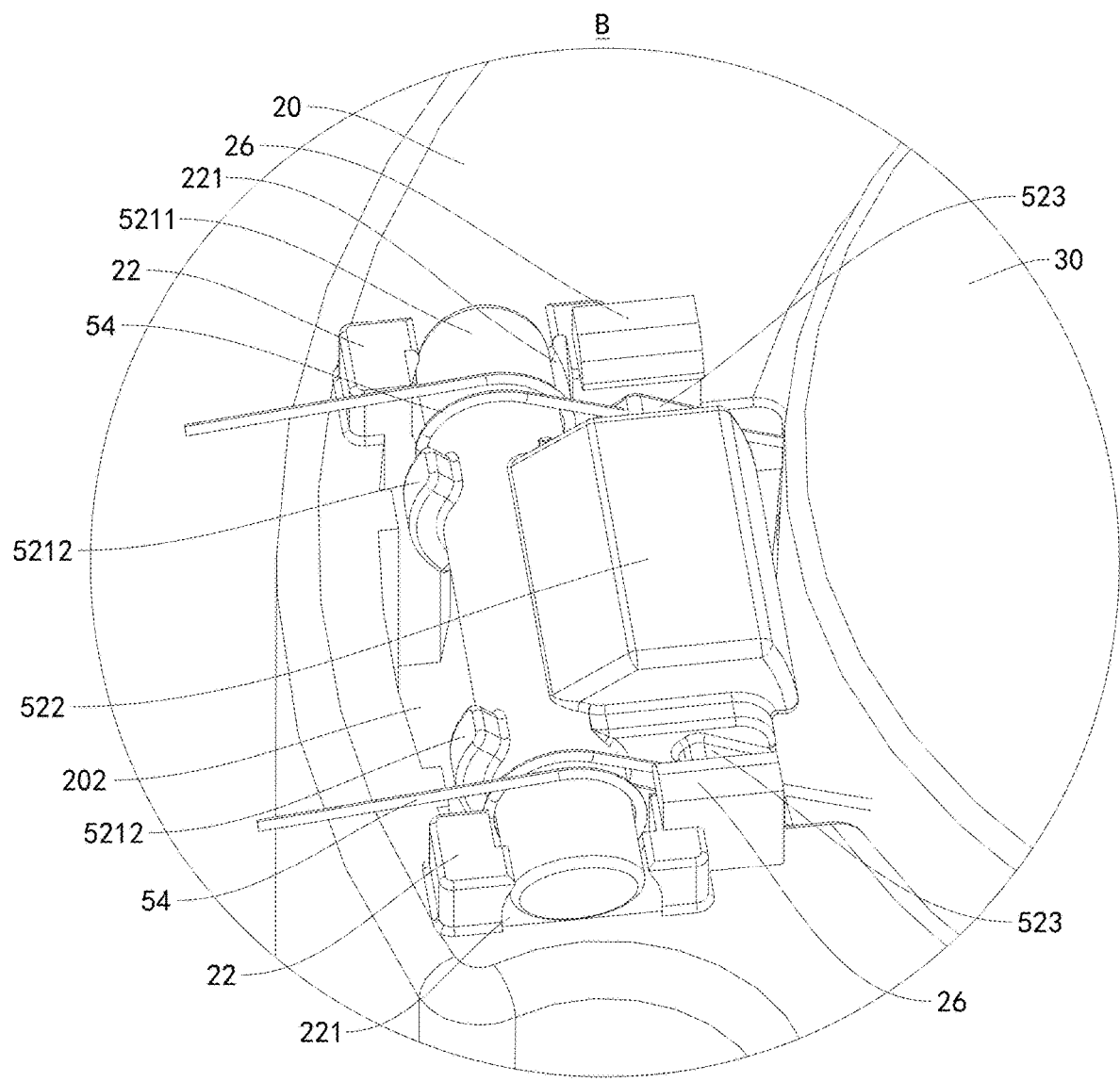
FIG. 17 is a schematic enlarged structural diagram of part B shown in FIG. 16.

Furthermore, as shown in FIGS. 13-15, each limiting matching member 523 may be connected to the corresponding drive connection member 521; and as shown in FIG. 16 and FIG. 17, the input end base 20 may be provided with limiting members 26. When the output end assembly 60 is separated from the input end assembly 10, the limiting matching member 523 may abut against the corresponding limiting member 26 under the reset forces of the drive reset members 54 to limit the drivers 52, such that matching escapement of the drivers 52 with the input end base 20 is prevented.

According to the further embodiments of the present disclosure, as shown in FIGS. 13-19, the drive reset members 54 may be torsional springs, the input end base 20 may be provided with shaft slots 221, the limiting matching members 523 may be provided with second limiting slots 5231 respectively, the drive connection members 521 may be provided with shaft rods 5211 respectively, and the shaft rods 5211 may be arranged in the shaft slots 221 respectively and may rotate in the shaft slots 221 respectively, such that the drivers 52 are difficult to offset or fall off when rotating relative to the input end base 20, and rotation is smoother. As shown in FIG. 17, a coil of each torsional spring may be arranged at the corresponding shaft rod 5211 in the sleeved manner, one end of each torsional spring is connected to the input end base 20, and the other end of each torsional spring may be arranged in the corresponding first limiting slot 5231, such that each torsional spring is firmly and reliably fixed and difficulty loosened.

Further, as shown in FIG. 18, mounting holes 202 may be formed in the bottom wall of the input end base 20, the drivers 52 may be arranged at the corresponding mounting holes 202, mounting seats 22 may be arranged at the edges of the corresponding mounting holes 202, the shaft slots 221 may be arranged at the corresponding mounting seats 22 to enable the mounting seats 22 to support the corresponding drivers 52 from the two axial ends of the drivers 52, the drivers 52 is more uniformly stressed, and rotation is smoother. The limiting members 26 may be buckles which are connected to the corresponding mounting seats 22 and extend inwards, and "inwards" herein refers to orientations facing the mounting holes 202, such that the drivers 52 rotate under the effect of reset forces of the torsional springs, and the inner ends of the buckles may abut against the corresponding limiting matching members 523 to prevent the drivers 52 to rotate to the outsides of the corresponding mounting holes 202.

According to some embodiments of the present disclosure, as shown in FIG. 15, each shaft rod 5211 may be provided with a retaining rib 5212, the retaining rib 5212 may limit the corresponding torsional spring in the axial direction of the shaft rod 5211, and the situation that the reset force is influenced due to overlarge displacement of the torsional spring in the axial direction of the shaft rod 5211 is prevented.

In some embodiments of the present disclosure, as shown in FIGS. 13-15, each drive member 522 may be connected to the middle part of the corresponding shaft rod 5211 to enable the corresponding driver 52 to be uniformly stressed, and the action force of the driver 52 to the corresponding stopper 51 is more stable. Furthermore, a check rib 524 may be arranged at the middle part of each shaft rod 5211; and when each driver 52 rotates under the effect of the reset force of the corresponding torsional spring, the check rib 524 may abut against the bottom wall face of the input end base 20 to limit the corresponding driver 52, and the situation that the driver 52 is departed from the input end base 20 due to overlarge rotation angle of the driver 52 is prevented. The check ribs 524 and the drive members 522 may be distributed in circumferential directions of the corresponding shaft rods 5211, such that stress uniformity of the drivers 52 may be further improved, interference on structures of the check ribs 524 and the drive members 522 may be prevented, and the structure design is reasonable.

Alternatively, the power coupler 100 may include the limiting members 26 and the limiting matching member 523 only, may also include the check ribs 524 only, or is provided with the limiting members 26, the limiting matching member 523 and the check ribs 524 at the same time, which may all limit rotating angles of the drivers 52.

Figure 22:
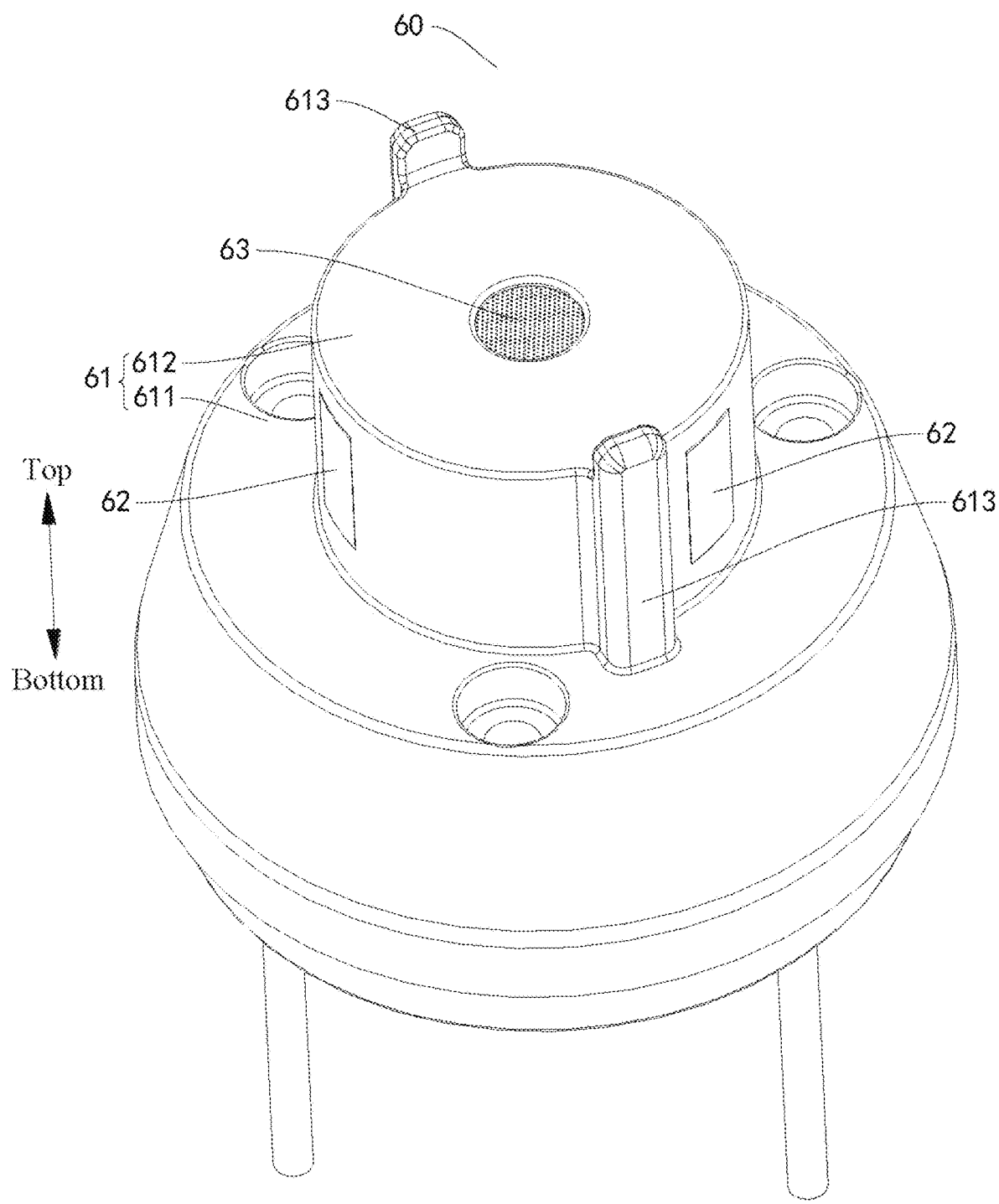
FIG. 22 is a schematic structural diagram of an output end assembly of the power coupler according to the first embodiment of the present disclosure.
Figure 23:
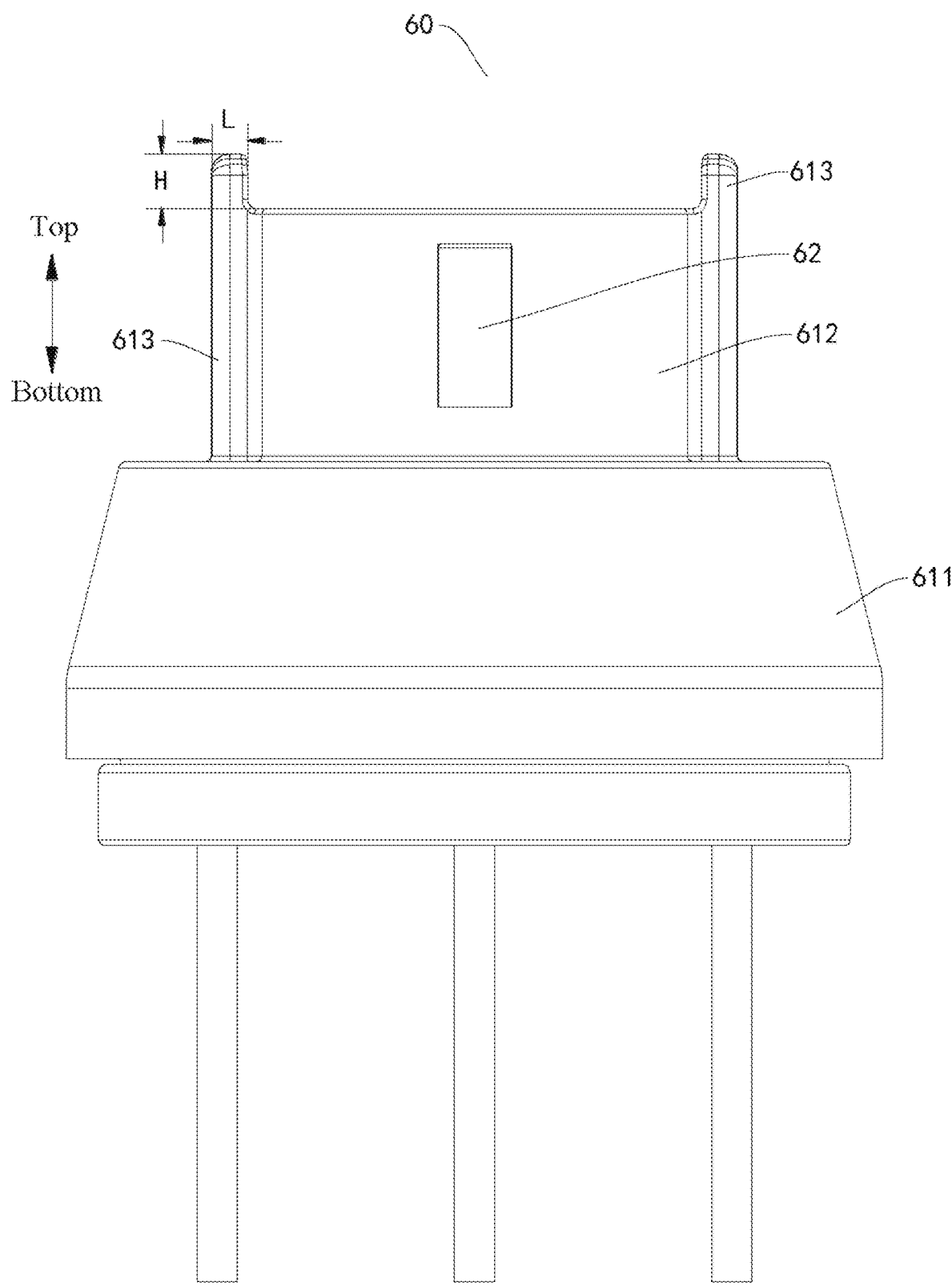
FIG. 23 is a front view of the output end assembly of the power coupler according to the first embodiment of the present disclosure.
Figure 24:
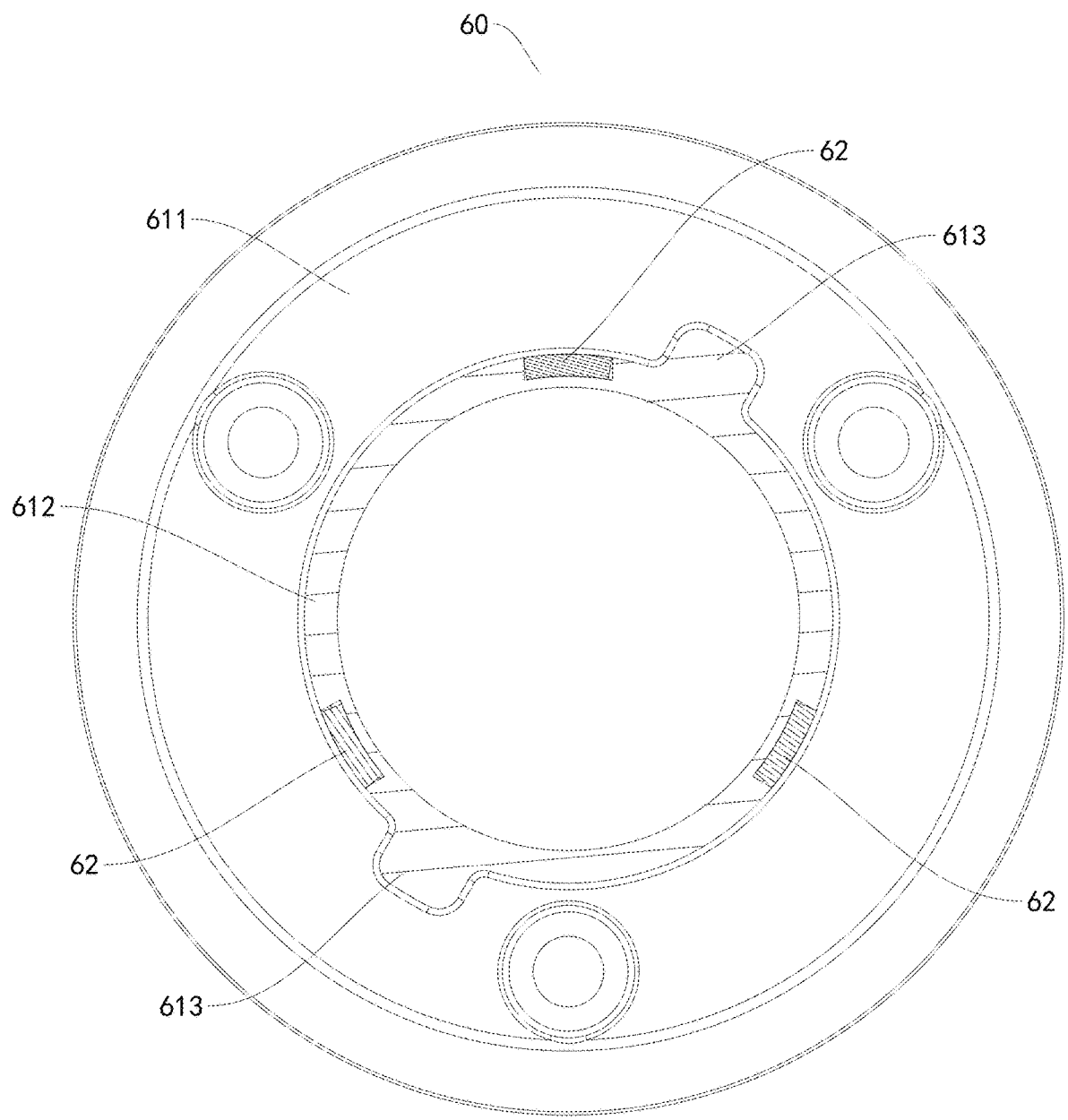
FIG. 24 is a cross-sectional view of the output end assembly of the power coupler according to the first embodiment of the present disclosure.

In some embodiments of the present disclosure, as shown in FIGS. 22-24, the output end assembly 60 may include the output end base 61, the output end base 61 may include a base main body 611 and a convex member 612, and the convex member 612 is arranged at one side of the base main body 611 in a protruding manner to enable the output end base 61 to form into a convex-shaped structure, such that a dead angle is difficultly generated, and accumulation of residues is avoided. The convex member 612 may extend into the slot 201 to realize connection of the output end assembly 60 to the input end assembly 10, such that a connection mode is simple, and connection is liable to disassemble.

Continue to refer to FIGS. 22-24, the output conductive member 62 may be connected to the output end base 61 and may be exposed from the outer peripheral face of the convex member 612, such that the output conductive member 62 may be connected to the input conductive member 40 as the convex member 612 extends into the slot 201. Furthermore, the convex member 612 may drive the self-locking structure 50 to move when extending into the slot 201 to enable the self-locking structure 50 to be switched to the unlocked state; and as unlocking and mounting are performed at the same time, operation steps are less, and mounting is more convenient.

Further, as shown in FIG. 22 and FIG. 23, convex ribs 613 may be arranged at the outer peripheral face of the convex member 612 and extend in the axial direction of the convex member 612. In the process that the convex member 612 extends into the slot 201, the convex ribs 613 may drive the self-locking structure 50 to move. Furthermore, in the embodiments that the mounting holes 202 are formed in the bottom wall of the input end base 20, the convex ribs 613 may be matched with the interiors of the mounting holes 202 respectively, the mounting holes 202 may limit the circumferential direction of the convex member 612 to prevent the convex member 612 from arbitrarily rotating, such that alignment of the input conductive member 40 and the output conductive member 62 is more accurate.

Alternatively, as shown in FIG. 23, a protruding height L of each convex rib 613 protruding from the outer peripheral face of the convex member 612 satisfies: 0 mm<L≤3 mm, for example, in some specific embodiments, the protruding height L of each convex rib 613 protruding from the outer peripheral face of the convex member 612 may be 1 mm, 1.5 mm, 2 mm, 2.5 mm and the like separately. L>0 mm, such that alignment of the convex ribs 613 and the self-locking structure 50 is more convenient and accurate; and if L≤3 mm, the radial size of the power coupler 100 may be prevented from being too large, and the structure is more compact.

According to some embodiments of the present disclosure, as shown in FIG. 23, each convex rib 613 exceeds the end surface of one end, away from the base main body 611, of the convex member 612, such that the alignment of each convex rib 613 and the self-locking structure 50 is more convenient and accurate; and in addition, the exceeding distance H may satisfy: 1 mm<H≤6 mm, for example, in some specific embodiments, the exceeding distance H may be 2 mm, 3 mm, 4 mm, 5 mm and the like separately. H≤6 mm, such that overlong axial length of the power coupler 100 may be prevented, and the structure is more compact. Further, the exceeding distance H may satisfy: 2 mm≤H≤4 mm.

Alternatively, in the embodiments that the self-locking structure 50 includes the drivers 52, the drive members 522 of the drivers 52 may be formed into drive plates, the convex ribs 613 may abut against the surface of one side, facing away from the slot 201, of the corresponding drive plates to push the corresponding drive plates to rotate around the axis, and thus opening of the self-locking structure 50 and the sealing cover 30 is realized.

Alternatively, a waterproof air-permeable membrane 63 may be arranged at the top wall of the convex member 612, such that inside sealing of the output end base 61 may be realized to prevent components in the output end base 61 from being wet by water ingress, and heat dissipation may be realized to prevent the situation that the components in the output end base 61 are damaged due to overhigh temperature in the output end base 61.

Figure 42:
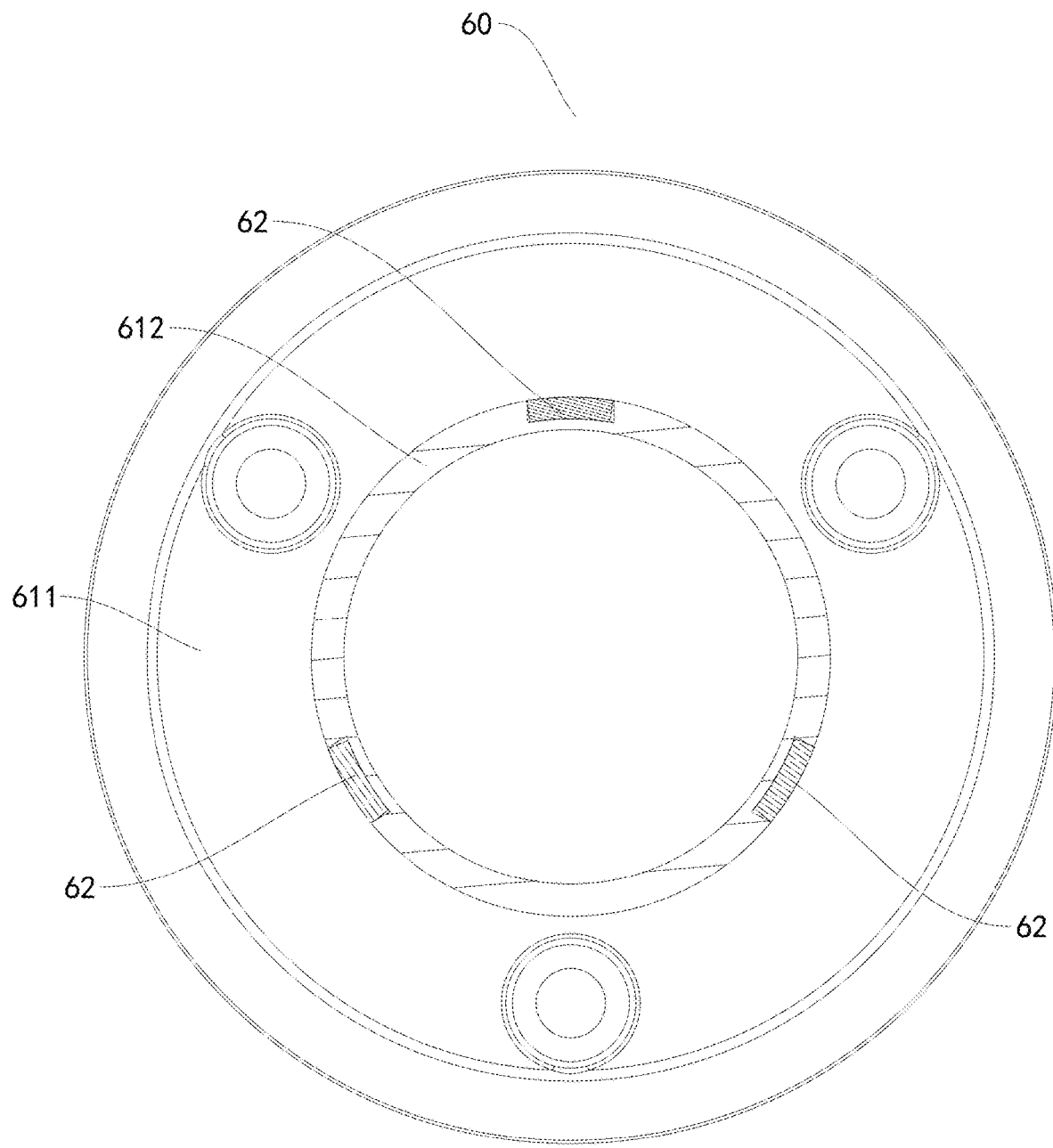
FIG. 42 is a top view of the output end assembly of the power coupler according to the second embodiment of the present disclosure.
Figure 43:
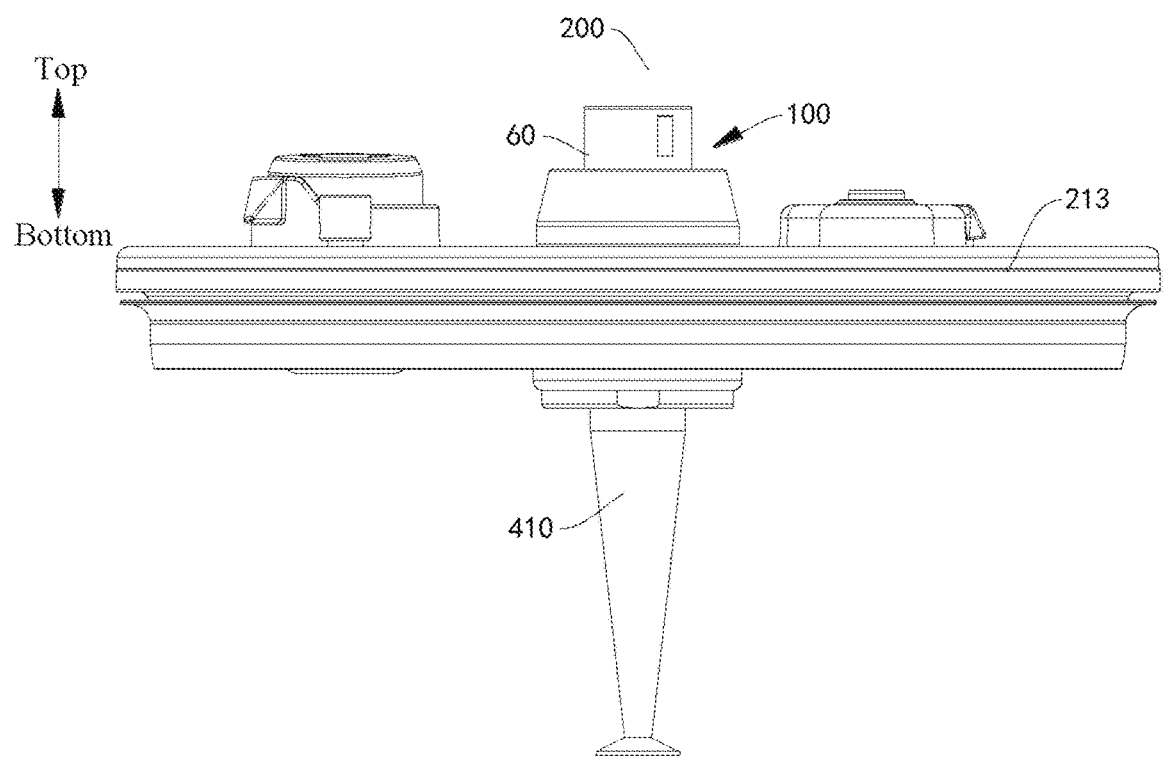
FIG. 43 is a schematic structural diagram of a cover body assembly according to the second embodiment of the present disclosure, where the top cover is not included.
Figure 44:
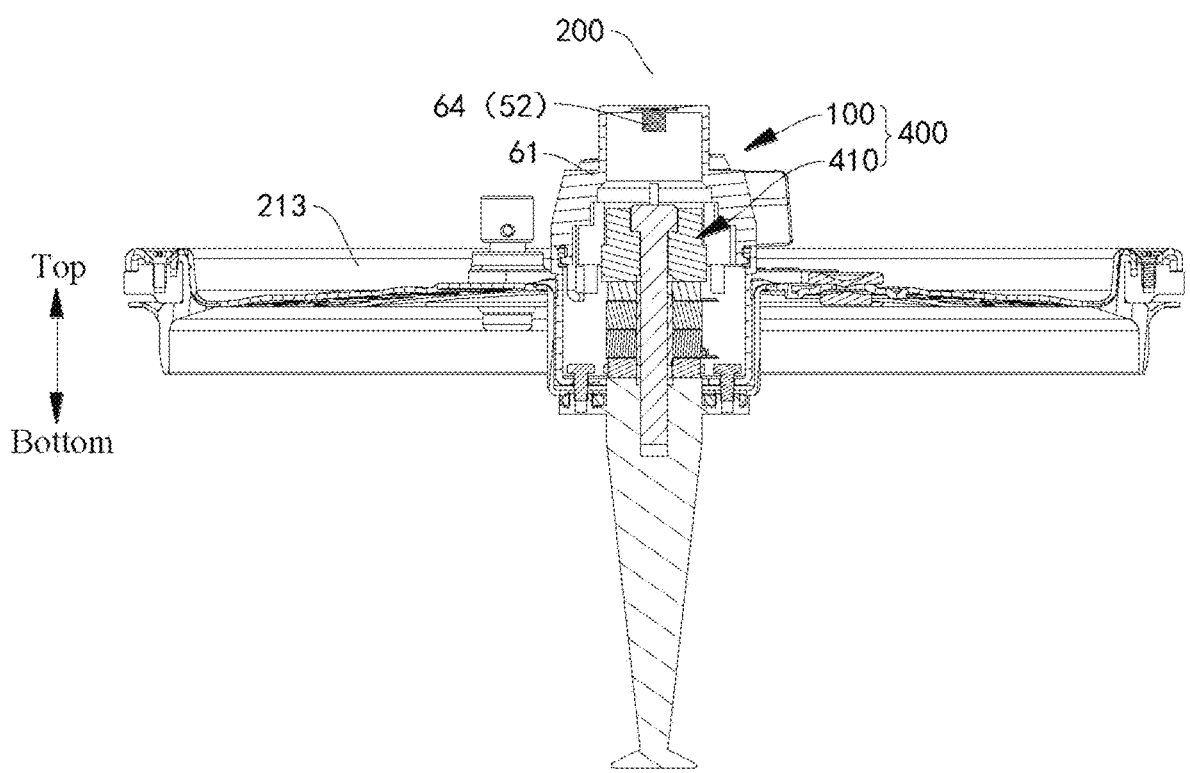
FIG. 44 is a schematic structural diagram of the cover body assembly according to the second embodiment of the present disclosure, where the input end assembly is not included.
Figure 45:
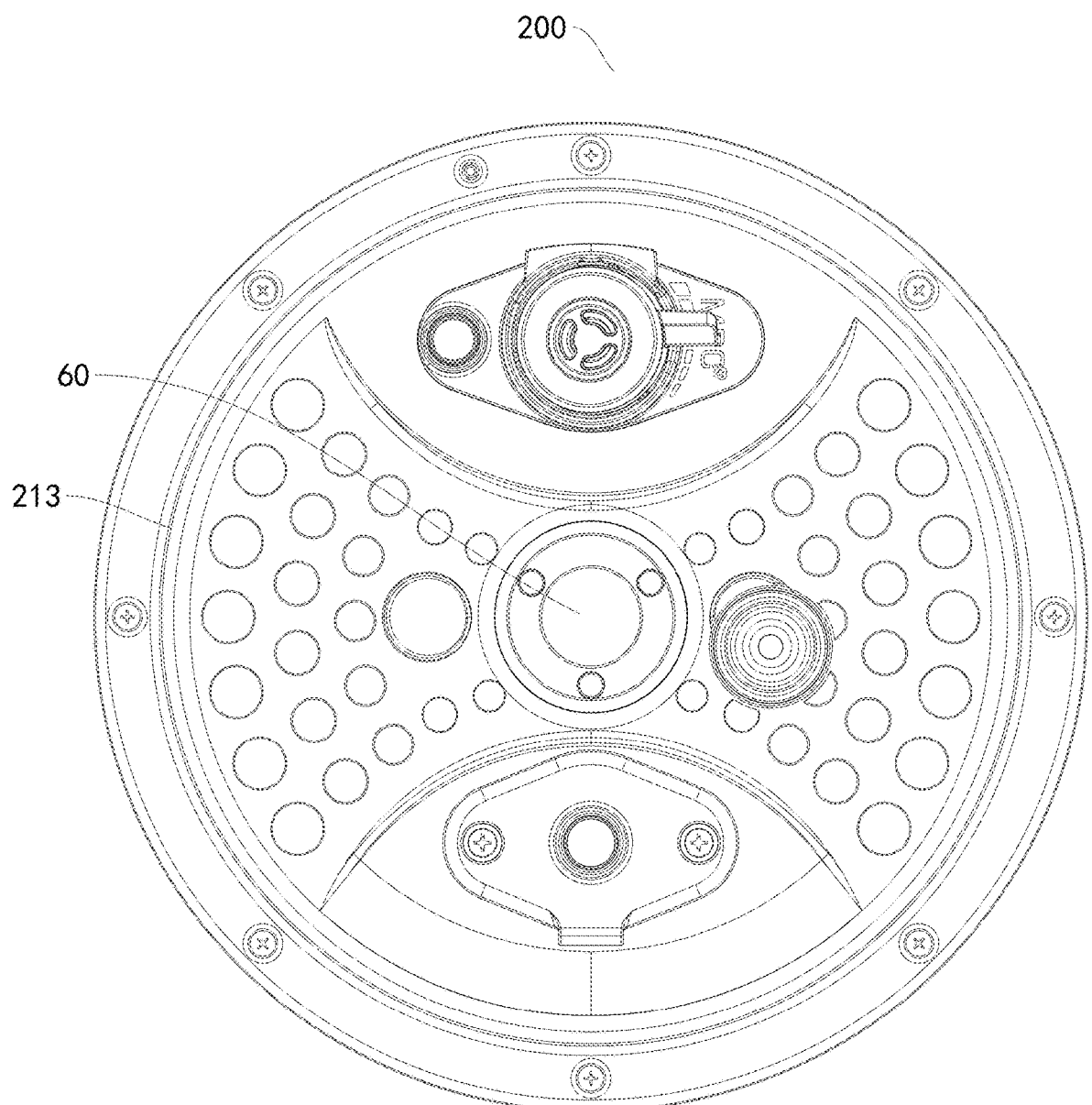
FIG. 45 is a top view of the cover body assembly according to the second embodiment of the present disclosure, where the input end assembly is not included.
Figure 46:
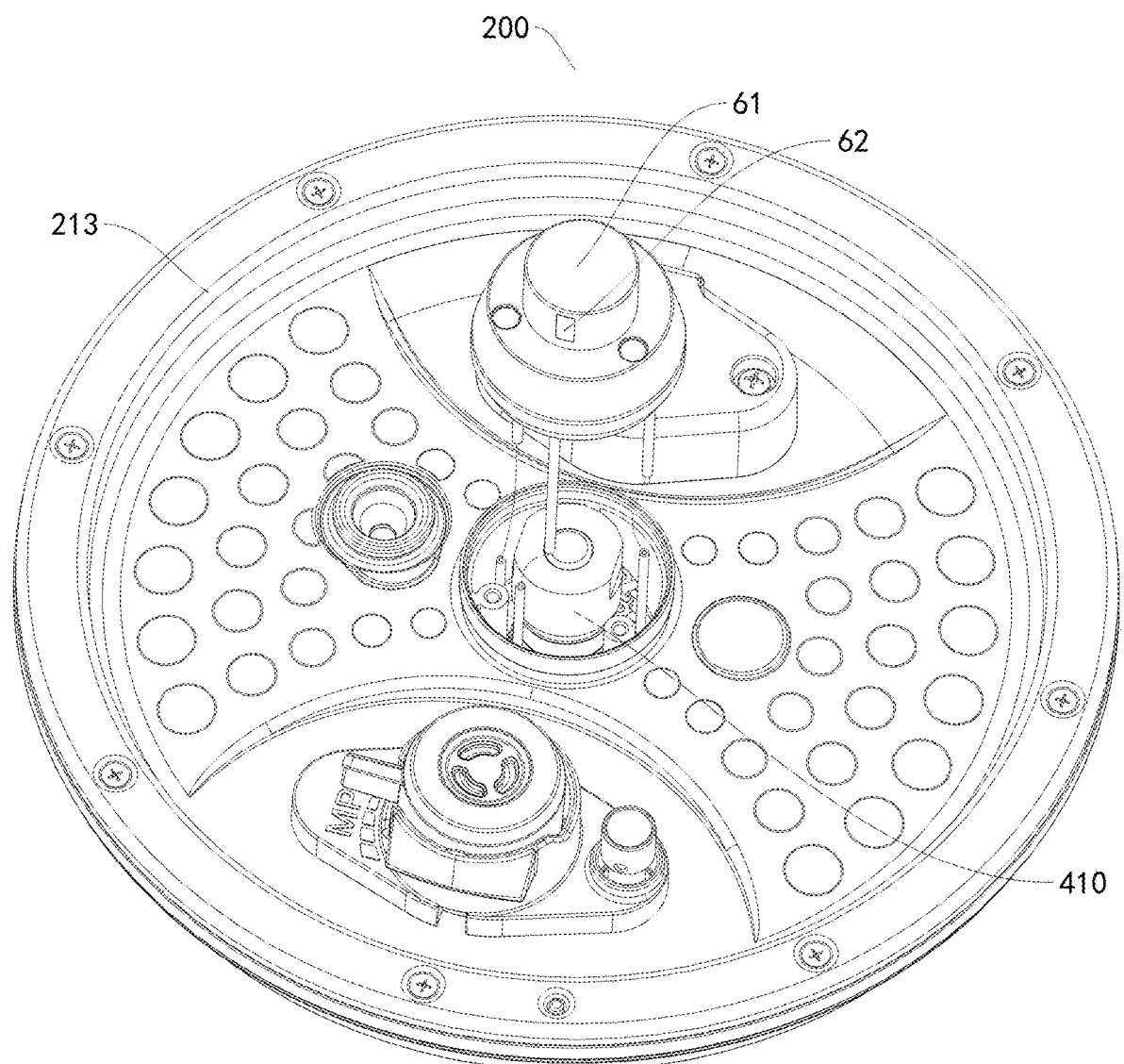
FIG. 46 is an exploded view of the cover body assembly according to the second embodiment of the present disclosure, where the input end assembly is not included.

In some embodiments of the present disclosure, as shown in FIG. 24 and FIG. 42, the output conductive member 62 may include a positive conductive sheet, a negative conductive sheet and a grounding conductive sheet, three output slots may be formed in the outer peripheral face of the convex member 612, the positive conductive sheet, the negative conductive sheet and the grounding conductive sheet are inlaid into the three output slots in one-to-one correspondence, each output slot communicates with a base cavity of the output end base 61 through a line passing hole, and a positive electrode line 471, and a negative electrode line 472 and a ground line 470 may penetrate through the line passing hole through the base cavity of the output end base 61 to be connected with the positive conductive sheet, the negative conductive sheet and the grounding conductive sheet respectively. An external structure of the output end assembly 60 is more simple, a dead angle is difficultly generated, and accumulation of the residues is avoided. Furthermore, the output end base 61 may shield wires, such that on one hand, an electric connection structure may be more firm and reliable; and on the other hand, in severe environments with water spots, oil contamination and the like, stains are difficult to contaminate an electric connection structure, and cleaning is more convenient.

Refer to FIGS. 25-42, according to some embodiments of the present disclosure, the stoppers 51 may be magnetic members, for example, magnets, ferrous metal and the like. The drivers 52 may be magnetic drivers 64; the magnetic drivers 64 may be arranged at the output end assembly 60, for example, be connected to the output end base 61; and furthermore, the magnetic drivers 64 may be magnetically matched with the corresponding stoppers 51 to enable the stoppers 51 to form magnetic drive self-locking pins, and the magnetic drive self-locking pins may move between the first position and the second position under the effect of magnetic force.

Thus, as shown in FIG. 25 and FIG. 26, when the input end assembly 10 is separated from the output end assembly 60, the output conductive member 62 moves out of the slot 201, and the sealing cover 30 is located at the closing position; and the magnetic drivers 64 is located at a relatively far position, and the stoppers 51 may be usually at the first position, such that self locking of the input end assembly 10 is realized, and the electrical shock accident as the user pushes the sealing cover 30 to extend into the slot 201 is prevented.

Figure 27:
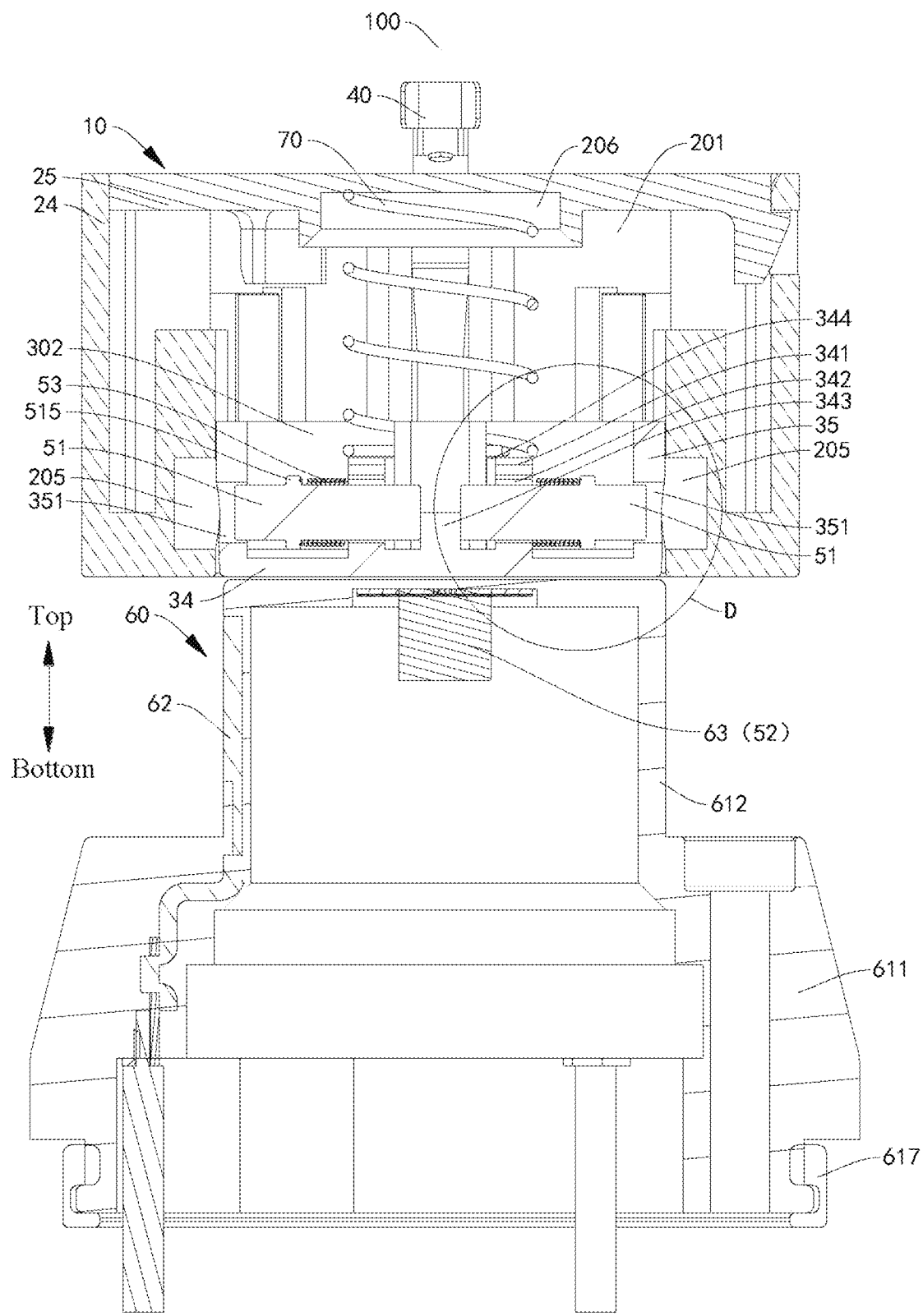
FIG. 27 is a schematic structural diagram of the power coupler according to the second embodiment of the present disclosure in another state.
Figure 28:
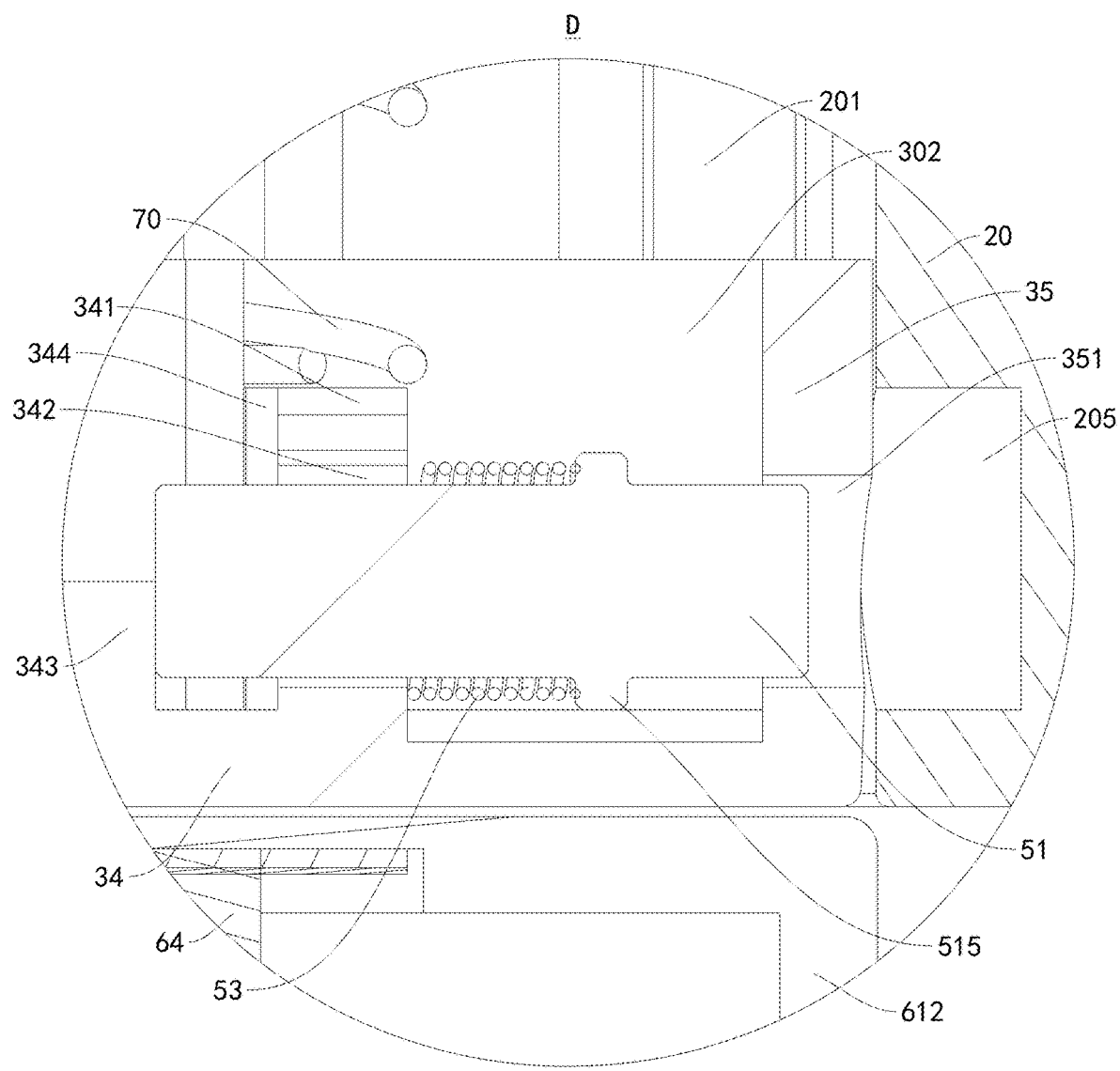
FIG. 28 is a schematic enlarged structural diagram of part D shown in FIG. 27.
Figure 29:
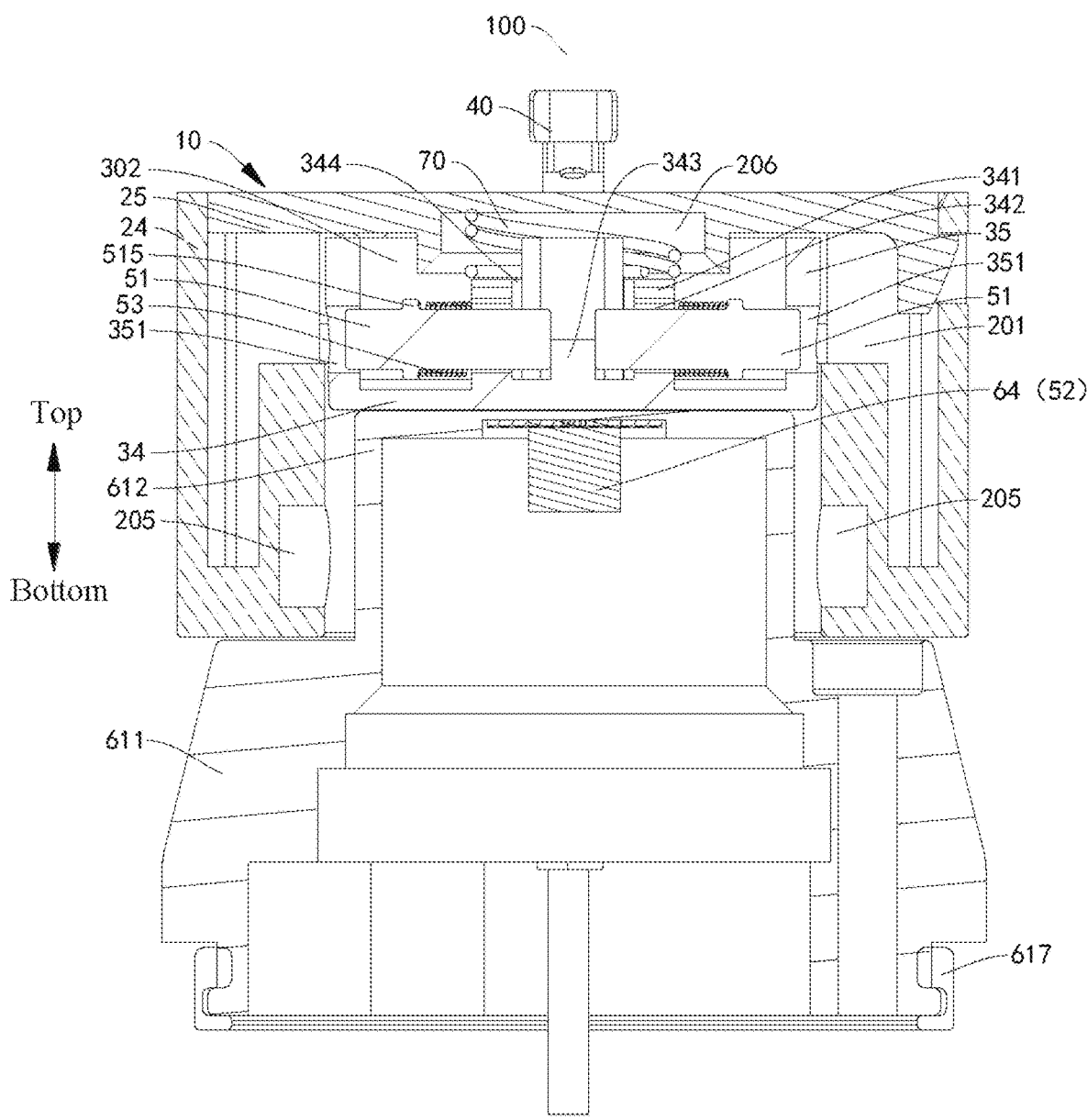
FIG. 29 is a schematic structural diagram of the power coupler according to the second embodiment of the present disclosure in yet another state.
Figure 30:
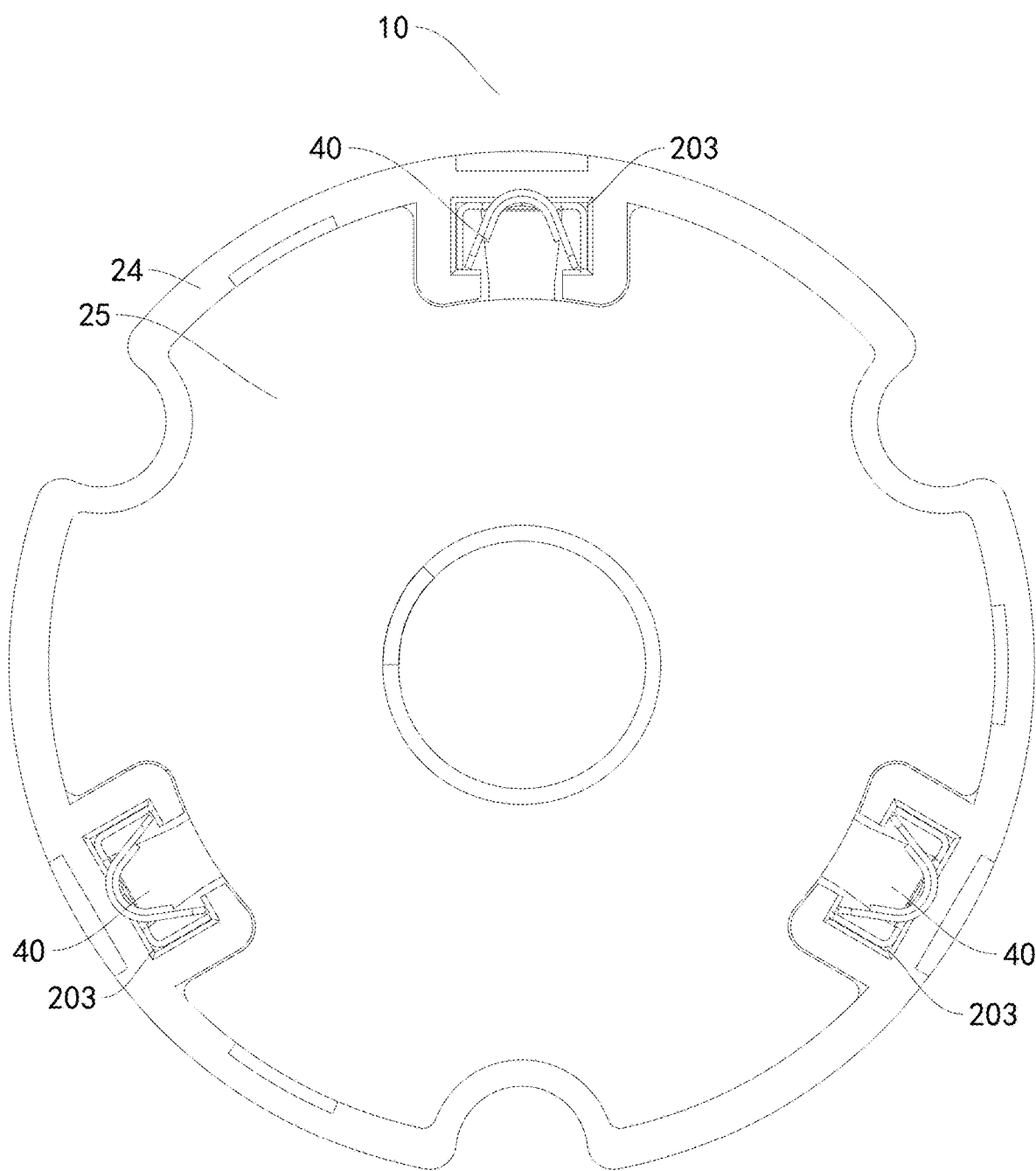
FIG. 30 is a top view of the input end assembly of the power coupler according to the second embodiment of the present disclosure.
Figure 31:
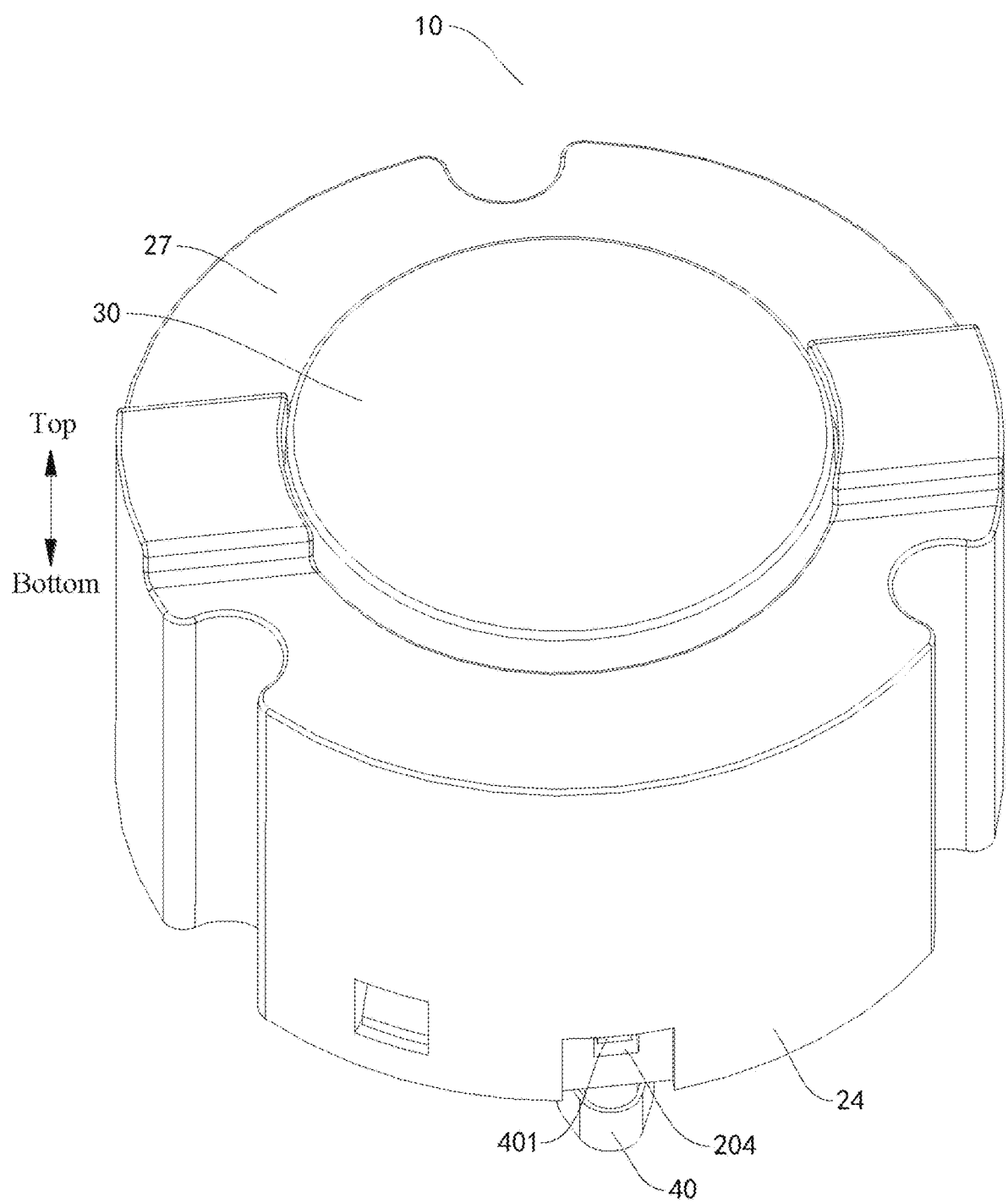
FIG. 31 is a schematic structural diagram of the input end assembly of the power coupler according to the second embodiment of the present disclosure.

When the input end assembly 10 is connected to the output end assembly 60, as shown in FIG. 27 and FIG. 28, the magnetic drivers 64 may be less distant from the corresponding stoppers 51, and the stoppers 51 move to the second position under the effect of the magnetic forces of the corresponding magnetic drivers 64. Position transformation of the stoppers 51 may be realized automatically without additional operation by the user, such that the situation that the user forgets operation to enable the input end assembly 10 not to be self-locked is prevented, the operation steps during mounting of the output end assembly 60 and the input end assembly 10 are also reduced, and mounting is more convenient. As shown in FIG. 29, the sealing cover 30 may move to the opening position under the pushing of the output end base 61, the output conductive member 62 may extend into the slot 201 to be connected to the input conductive member 40, a connection member of the input conductive member 40 and the output conductive member 62 is located in the slot 201, and the user may also be prevented from getting an electric shock by contacting the connection member.

It should be noted that in the present disclosure, the numbers of the stoppers 51 and the magnetic drivers 64 may be adjusted according to the actual needs. In specific embodiments as shown in FIG. 25-29, the power coupler 100 includes two stoppers 51 and one magnetic driver 64 for illustrative purposes only. However, ordinary skill in the art may apparently understand that the solution is applied to a technical solution with one, three or more stoppers 51 or more magnetic drivers 64 after reading the technical solution of the present disclosure, which may all fall within the protection scope of the present disclosure.

The power coupler 100 according to the embodiments of the present disclosure form a magnetically-attracting coupler structure by matching of the sealing cover 30, the stoppers 51 and the magnetic drivers 64 and has a magnetic self-locking structure, and self locking of the input end assembly 10 can be realized when the input end assembly 10 is separated from the output end assembly 60, such that the input conductive member 40 cannot be exposed outsides, the risk of electric shock of the user is effectively lowered, and the user is safer; and the input end assembly 10 may also be unlocked automatically when the input end assembly 10 is connected to the output end assembly 60, and disassembly is more convenient.

Figure 32:
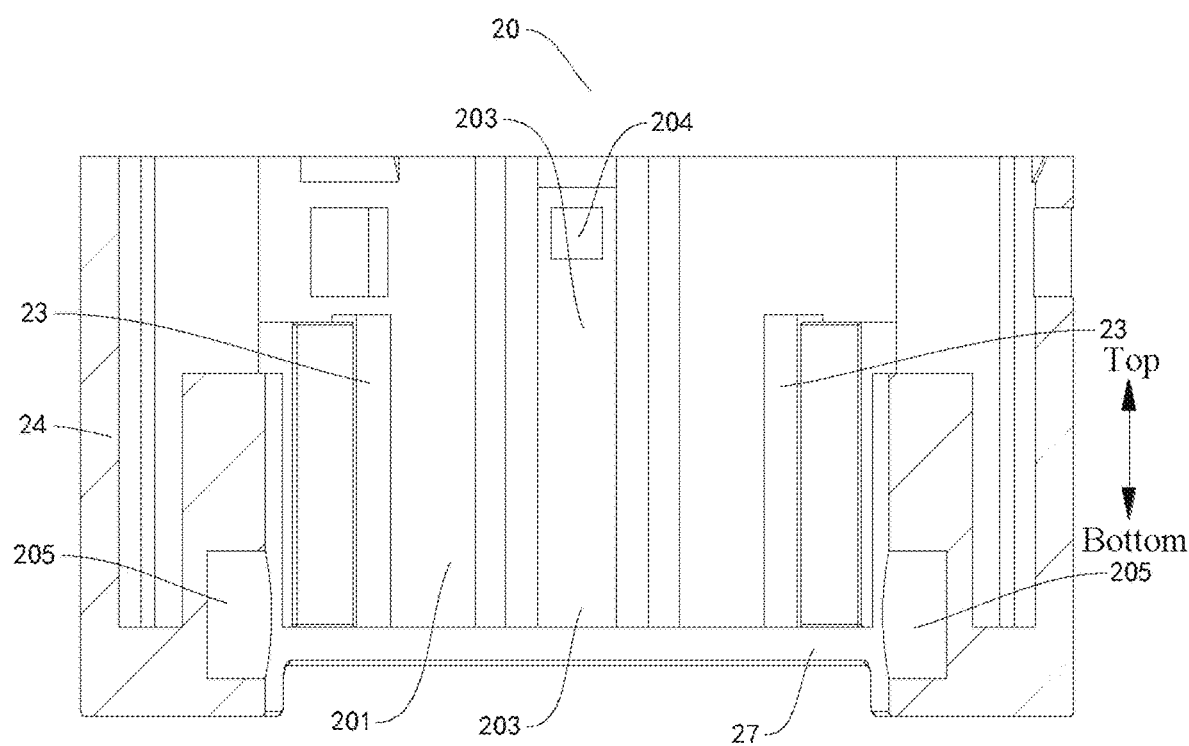
FIG. 32 is a cross-sectional view of the input end base of the power coupler according to the second embodiment of the present disclosure, where the top cover is not included.
Figure 33:
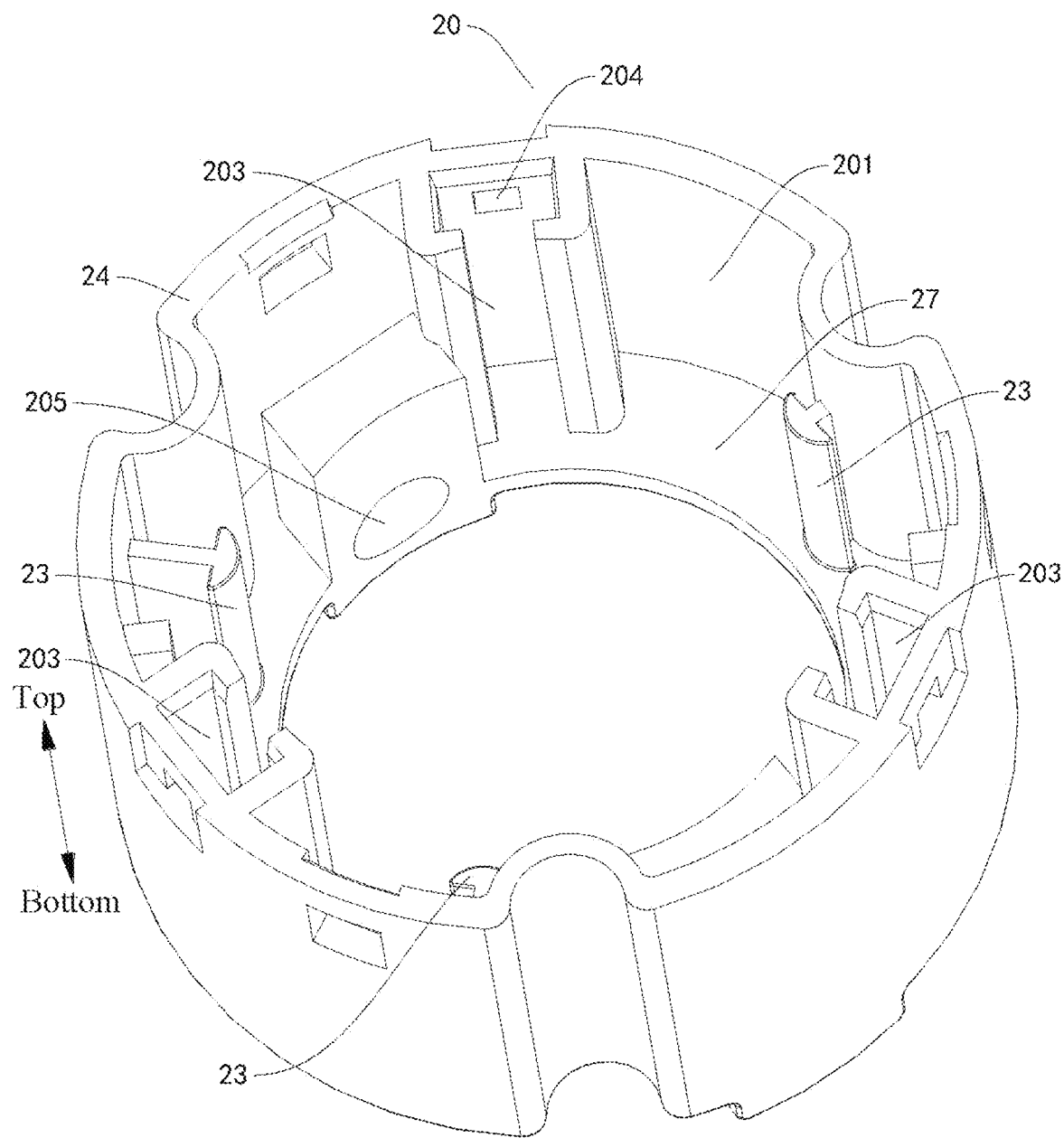
FIG. 33 is a schematic structural diagram of the input end base of the power coupler according to the second embodiment of the present disclosure from a certain viewing angle, where the top cover is not included.
Figure 34:
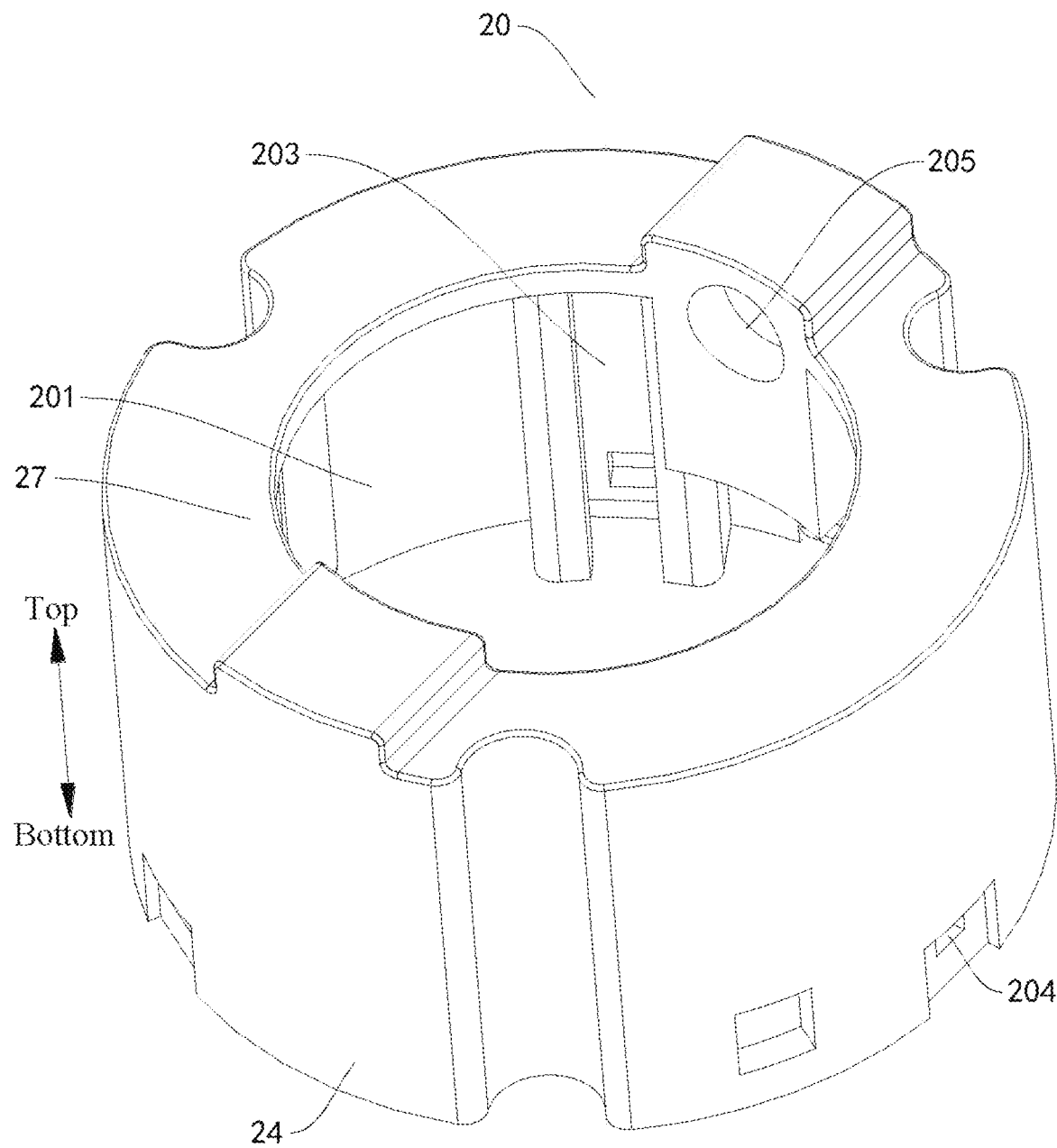
FIG. 34 is a schematic structural diagram of the input end base of the power coupler according to the second embodiment of the present disclosure from another viewing angle, where the top cover is not included.

Further, as shown in FIG. 26 and FIG. 28, the stoppers 51 may be arranged at the sealing cover 30 and may translate in the radial direction of the sealing cover 30. As shown in FIG. 32-34, stopping slots 205 may be formed in the inner peripheral face of the slot 201. As shown in FIG. 25 and FIG. 26, the stoppers 51 may extend into the corresponding stopping slots 205 when being at the first position to limit the position of the sealing cover 30 in the slot 201 in the axial direction. As shown in FIG. 27-29, the stoppers 51 may move out of the corresponding stopping slots 205 when being at the second position; and at this time, the matching of the stoppers 51 with the input end base 20 is escaped, and the sealing cover 30 may move in the slot 201 in the axial direction.

Figure 35:
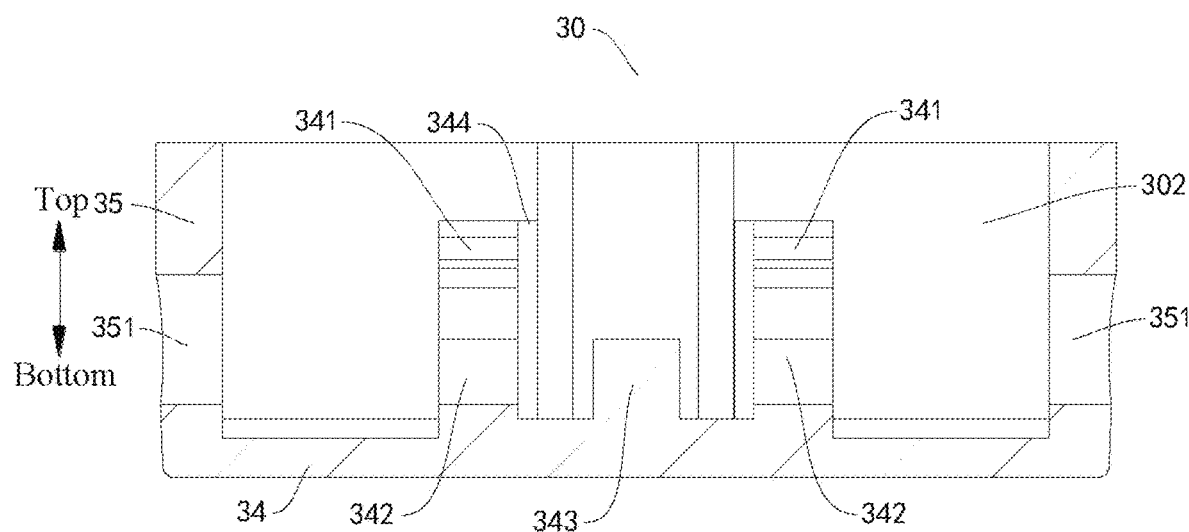
FIG. 35 is a cross-sectional view of the sealing cover of the power coupler according to the second embodiment of the present disclosure.
Figure 36:
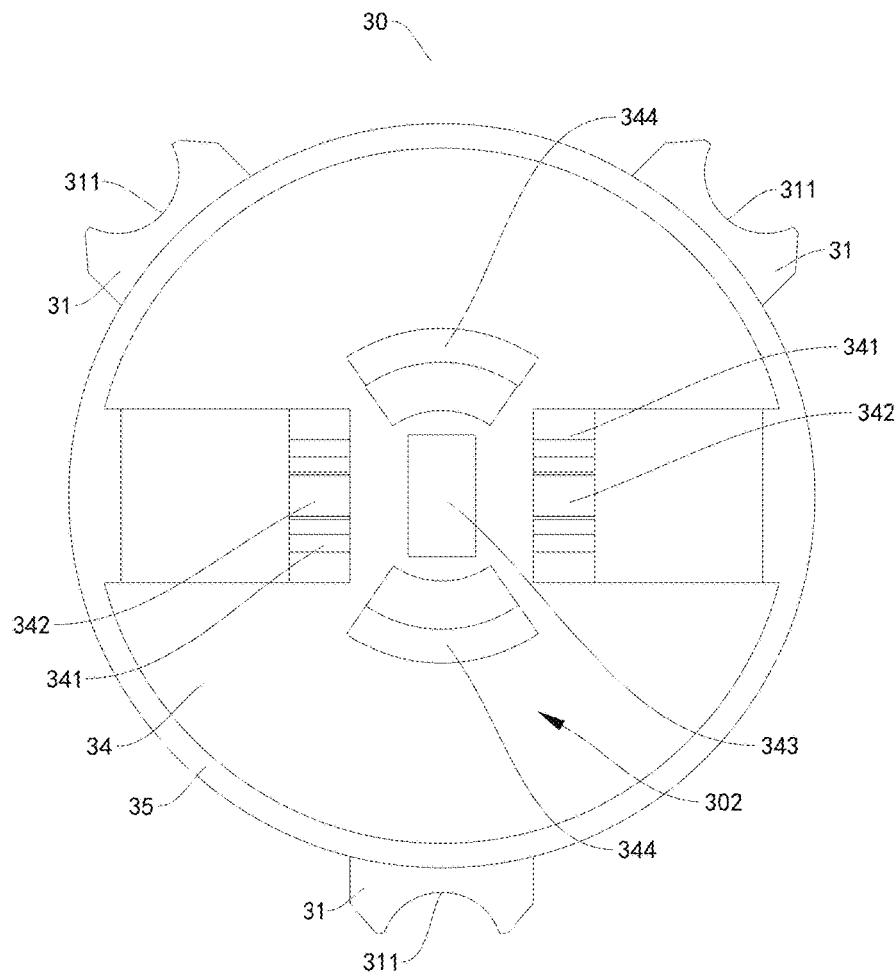
FIG. 36 is a top view of the sealing cover of the power coupler according to the second embodiment of the present disclosure.

Still further, as shown in FIG. 35 and FIG. 36, the sealing cover 30 may include: a sealing plate 34 and a side wall 35, and the side wall 35 may be connected to the outer peripheral edge of the sealing plate 34 and is located on one side of the sealing plate 34 to form a sealing cover slot 302 by matching with the sealing plate 34. As shown in FIG. 26, through holes 351 may be formed in the side wall 35, and the stoppers 51 may be arranged in the sealing cover slot 302. The stoppers 51 may extend into the corresponding through holes 351 to realize connection of the stoppers 51 and the sealing cover 30. Furthermore, the outer ends of the stoppers 51 may penetrate through the corresponding through holes 351 to extend into the corresponding stopping slots 205 when the stoppers 51 are at the first position, such that the stoppers 51 may enable the through holes 351 and the stopping slots 205 to be fixed at the axial position of the sealing cover 30, and the sealing cover 30 and the input end base 20 are axially fixed.

Furthermore, as shown in FIGS. 25-29, the stopping reset members 53 may be arranged in the sealing cover slot 302 so as to apply the action forces to the corresponding stoppers 51, and thus the structure is compact.

Figure 37:
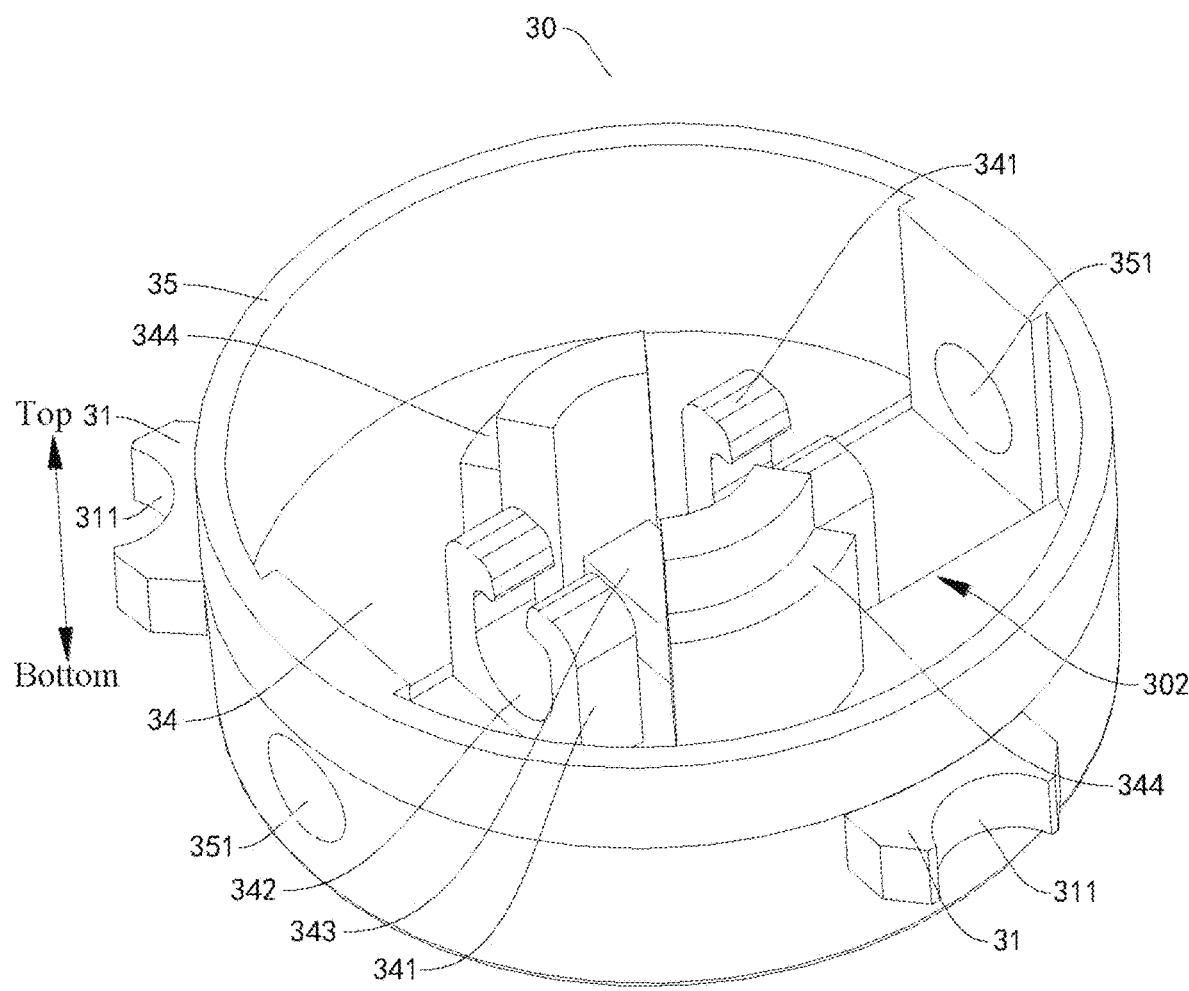
FIG. 37 is a schematic structural diagram of the sealing cover of the power coupler according to the second embodiment of the present disclosure.
Figure 38:
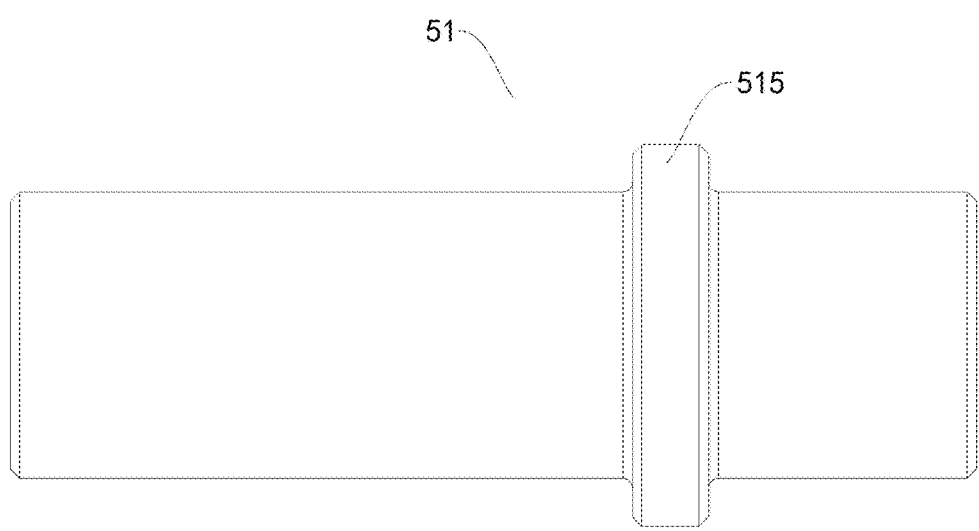
FIG. 38 is a schematic structural diagram of the stopper of the power coupler according to the second embodiment of the present disclosure.
Figure 39:
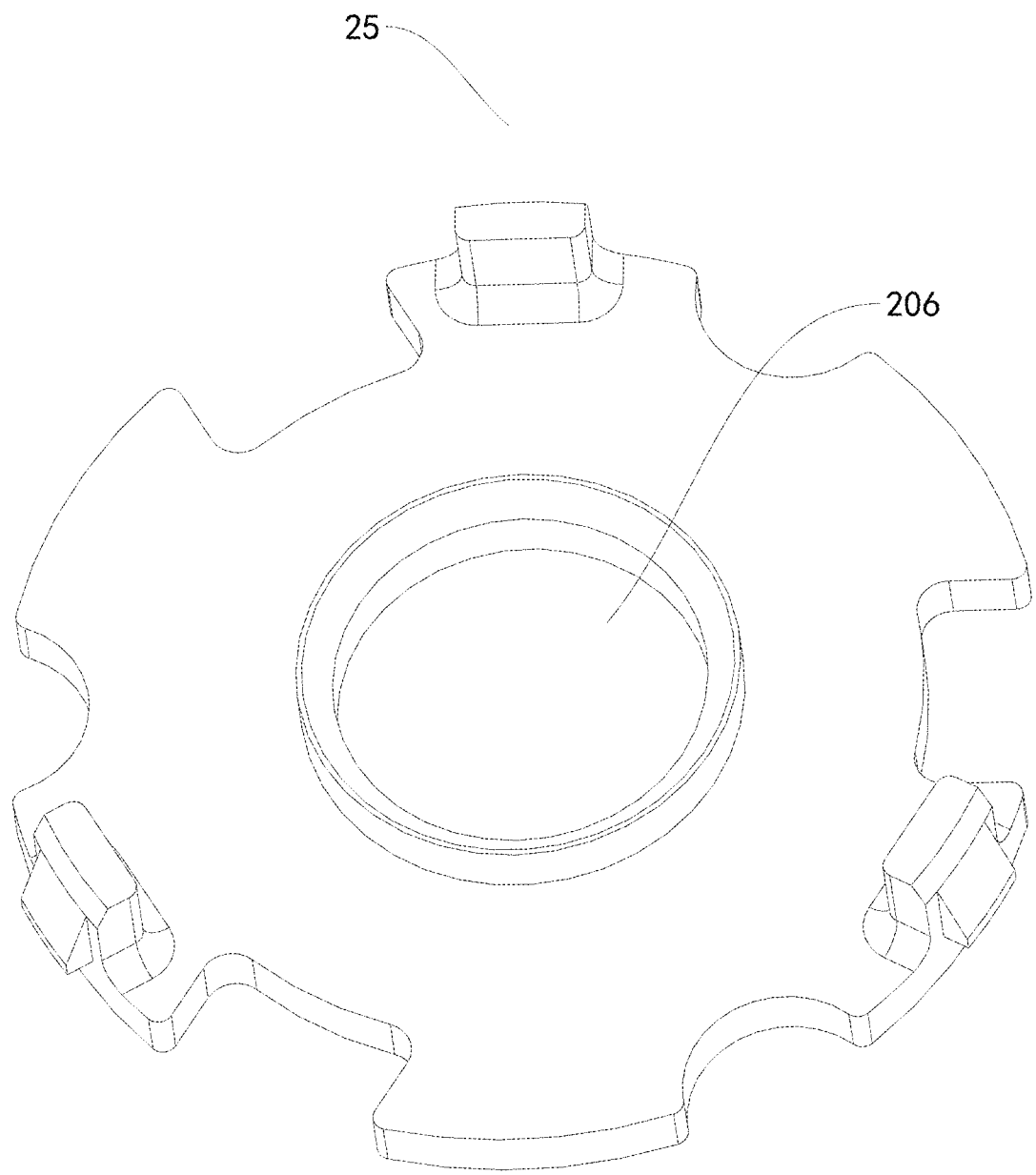
FIG. 39 is a schematic structural diagram of the top cover of the power coupler according to the second embodiment of the present disclosure.

In some embodiments of the present disclosure, as shown in FIGS. 35-37, the sealing plate 34 may be provided with sealing plate bulges 341 located in the sealing cover slot 302, and the stopping reset members 53 may be helical springs; and as shown in FIG. 38, outer bulges 515 may be arranged at the outer peripheral faces of the corresponding stoppers 51. As shown in FIG. 25-29, the helical springs may be arranged at the corresponding stoppers 51 in the sleeved manner, and the two ends of the helical springs may abut against the sealing plate bulges 341 and the outer bulges 515 respectively. For the purpose that axial drive forces are applied to the stoppers 51 to enable the stoppers 51 to move to the first position by pushing the outer bulges 51 by the helical springs, the outer bulges 515 may compress the helical springs when the stoppers 51 is affected by the magnetism to move to the second position.

Furthermore, as shown in FIG. 26, the outer bulges 515 may define movement strokes of the stoppers 51 between the first position and the second position; when the stoppers 51 move to the first position under the effect of the corresponding helical springs, the outer bulges 515 may abut against the inner peripheral face of the side wall 35 to prevent the stoppers 51 from thoroughly departed from the corresponding through holes 351 outwards.

Further, as shown in FIGS. 35-37, limiting slots 342 may be formed in the sealing plate bulges 341 respectively and may extend in the radial direction of the sealing cover 30, and the inner ends of the stoppers 51 may be arranged in the corresponding limiting slots 342 in a translating and penetrating manner. The limiting slots 342 may limit movement routes of the stoppers 51 to prevent the situation that the stoppers 51 offset to escape matching with the corresponding through holes 351 to influence the self-locking function of the input end assembly 10.

Still further, as shown in FIGS. 35-37, the two ends of each limiting slot 342 in the radial direction of the sealing cover 30 are both opened, such that the stoppers 51 may penetrate out of the two ends of the corresponding limiting slots 342. The sealing plate 34 may further be provided with stopping convex ribs 343 located in the sealing cover slot 302; and when the stoppers 51 are located at the second position, the inner ends of the stoppers 51 may abut against the corresponding stopping convex ribs 343. Thus, when the stoppers 51 move to the second position under the driving of the corresponding magnetic drivers 64, the stopping convex ribs 343 may limit the movement strokes of the stoppers 51, and design is reasonable.

Alternatively, as shown in FIG. 37, each sealing plate bulge 341 may include two arm portions, a limiting slot 342 is formed between the two arm portions, each stopper 51 may be clamped into the corresponding limiting slot 342 from a gap between the free ends of the two arm portions, and mounting is convenient; and the free ends of the two arm portions extend, close to each other, such that each stopper 51 is difficultly departed after being clamped into the corresponding limiting slot 342, and fixing is more reliable.

In the present disclosure, when there are multiple stoppers 51, multiple stopping slots 205 and stopping reset members 53 may also be provided, and the stoppers 51, the stopping slots 205 and the stopping reset member 53 may be arranged in one-to-one correspondence. As shown in FIG. 33 and FIG. 34, the multiple stopping slots 205 may be arranged spaced from each other in the circumferential direction of the slot 201 to stop the sealing cover 30 from multiple positions in the circumferential direction of the sealing cover 30, such that the sealing cover 30 is more uniformly stressed. As shown in FIG. 27 and FIG. 28, when the output end assembly 60 approaches the input end assembly 10, the multiple stoppers 51 may move towards the second position under the magnetic attraction of the magnetic driver 64. Thus, the multiple stoppers 51 may move under the effect of one magnetic driver 64, and the number of the magnetic driver 64 is less, such that the structure is more simple, and the cost is lower.

It should be noted that the output end assembly 60 may drive the stoppers 51 to move towards the second position when abutting against the sealing cover 30 of the input end assembly 10 as shown in FIG. 27 and FIG. 28 and may drive the stoppers 51 to move towards the second position when being spaced from the input end assembly 10 by a certain distance.

According to some embodiments of the present disclosure, as shown in FIGS. 1-5 and FIGS. 25-29, an elastic member 70 may also be arranged between the sealing cover 30 and the bottom wall face of the slot 201, and the sealing cover 30 and the bottom wall face of the slot 201 may perform axial positioning on the elastic member 70. The elastic member 70 may enable the sealing cover 30 to be restored to the closing position, i.e., the elastic member 70 may usually drive the sealing cover 30 to cover and seal the slot port of the slot 201. When the output end assembly 60 is separated from the input end assembly 10, the elastic member 70 may drive the sealing cover 30 to move automatically to the closing position without manual operation, such that use is more convenient.

Figure 11:
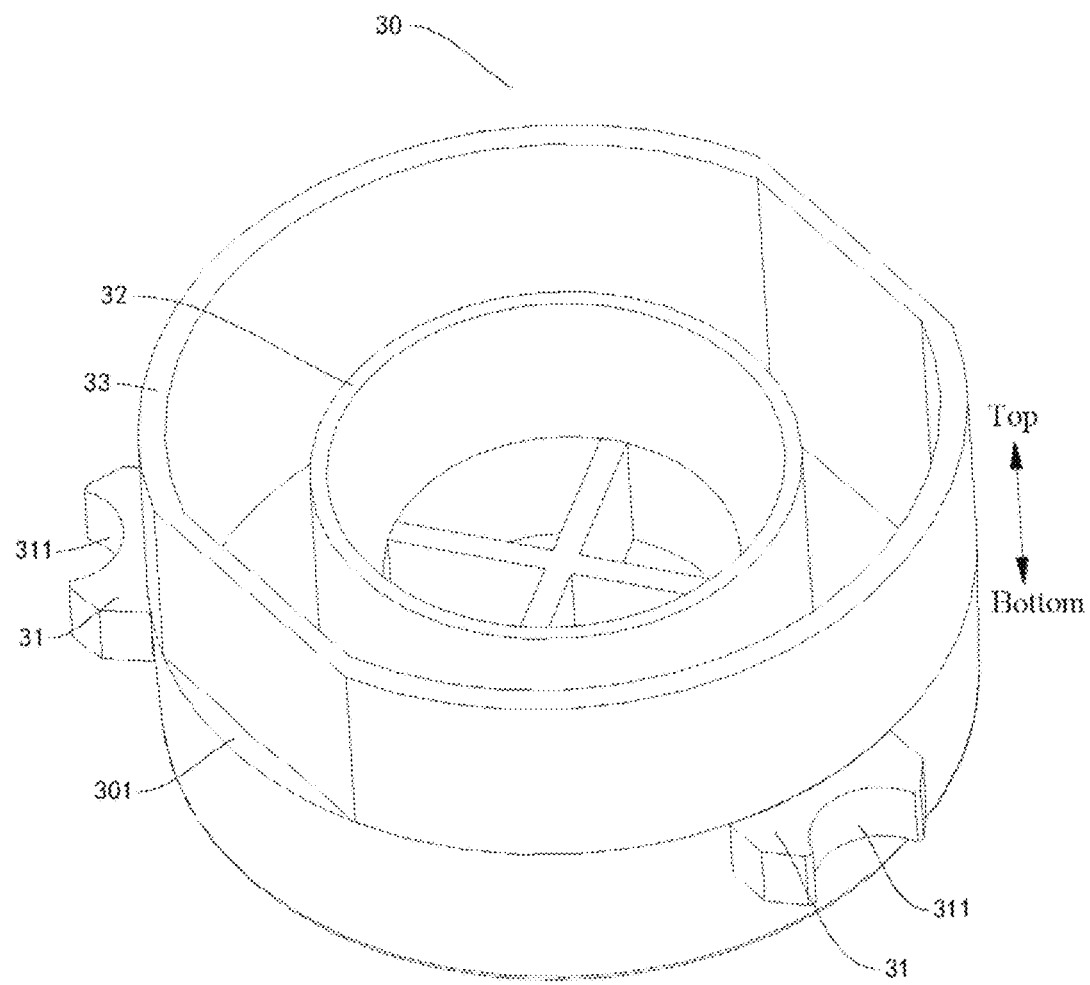
FIG. 11 is a schematic structural diagram of a sealing cover of the power coupler according to the first embodiment of the present disclosure.
Figure 12:
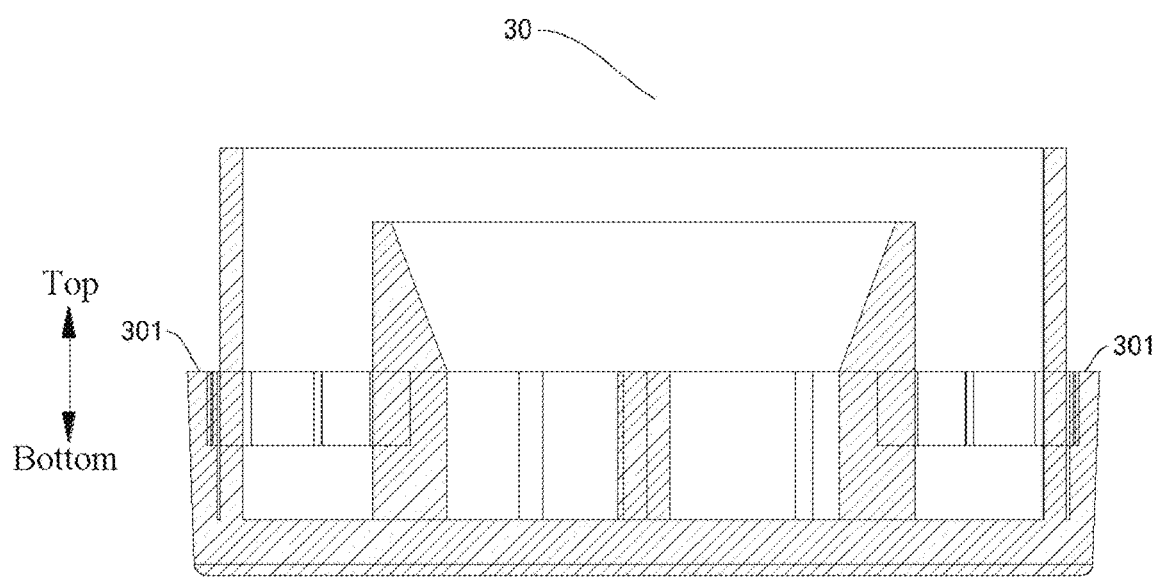
FIG. 12 is a cross-sectional view of the sealing cover of the power coupler according to the first embodiment of the present disclosure.

Alternatively, as shown in FIG. 1 and FIG. 5, a positioning column 251, protruding towards the interior of the slot 201, may be arranged at the bottom wall face of the slot 201; and as shown in FIG. 11, the sealing cover 30 may be provided an inner cylinder 32 and an outer cylinder 33 which are coaxially arranged, one end of the elastic member 70 may be arranged at the positioning column 251 in the sleeved manner, the other end of the elastic member 70 may be inserted into the inner cylinder 32, and the inner cylinder 32 and the positioning column 251 may limit the radial position of the elastic member 70 to prevent the situation that the drive effect on the sealing cover 30 is influenced by radial twisting deformation or displacement of the elastic member 70.

Alternatively, as shown in FIGS. 25-29 and FIGS. 35-37, the positioning groove 206 may be formed in the bottom wall face of the slot 201, the sealing cover 30 may be provided with positioning bosses 344, and the two ends of the elastic member 70 may abut against the interior of the positioning groove 206 and the positioning bosses 344 respectively. The positioning groove 206 and the positioning bosses 344 may limit the radial position of the elastic member 70 to prevent the situation that the drive effect on the sealing cover 30 is influenced by radial twisting deformation or displacement of the elastic member 70.

Alternatively, in some embodiments, as shown in FIG. 36 and FIG. 37, the positioning boss 344 may extend to form arch-shaped bulges, each arch-shaped bulge may be provided with an arch-shaped stepped face, the elastic member 70 may be a helical spring, the helical spring may be arranged at the arch-shaped bulges in the sleeved manner and abuts against the arch-shaped stepped faces, and the arch-shaped bulges are more adapted to the helical spring, such that the limiting effect on the helical spring is better. Furthermore, there are two arch-shaped bulge spaced from each other, the stopping convex rib 343 may be located between the two arch-shaped bulges, and the arch-shaped stepped faces are higher than or equal to the corresponding sealing plate bulges 341. Thus, the stoppers 51 may extend into a space between the two arch-shaped bulges to abut against the stopping convex ribs 343, such that the structure is more compact; and in addition, interference cannot be generated between the stoppers 51 and the elastic member 70.

According to some embodiments of the present disclosure, as shown in FIGS. 32-34, the edge plate 27, extending inwards, may be arranged at the slot port of the slot 201; and as shown in FIG. 36 and FIG. 37, the positioning convex members 31, protruding outwards, may be arranged at the outer peripheral face of the sealing cover 30 and may abut against the edge plate 27 to limit the sealing cover 30 when the sealing cover 30 is located at the closing position, such that the sealing cover 30 is prevented from departing from the slot port of the slot 201, and fixing of the sealing cover 30 is more reliable.

Further, as shown in FIGS. 32-34, guide convex ribs 23 may be arranged at the inner peripheral face of the slot 201 and extend to the edge plate 27 in the axial direction of the slot 201; and as shown in FIG. 36 and FIG. 37, a positioning slot 311 may be formed in each positioning convex member 31 and may be movably matched with the corresponding guide convex rib 23 to guide and limit movement of the sealing cover 30, such that the situation that the sealing cover 30 is inclined and jammed and the situation that the sealing cover 30 rotates to enable the stoppers 51 to be staggered with the stopping slots 205 are prevented, and movement of the sealing cover 30 is smoother.

Alternatively, as shown in FIG. 1, FIGS. 20-21, FIG. 25, FIG. 30 and FIG. 39, the input end base 20 may include a housing 24 and a top cover 25, the top cover 25 may cover one axial end of the housing 24 to define the slot 201 with the housing 24 together, the inner surface of the top cover 25 is formed into the bottom wall face of the slot 201, the positioning columns 251 may be arranged at the top cover 25, and the other axial end of the housing 24 may be formed into the slot port of the slot 201. The structures of the input conductive member 40, the stoppers 50 and the like may be mounted in the housing 24 from one axial end of the housing 24 when the top cover 25 is not mounted at the housing 24, such that mounting is more convenient and is liable to operate.

Furthermore, an opening may be formed in the top cover 25, as shown in FIG. 1, FIG. 5, FIG. 25, FIG. 27 and FIG. 30; and the input conductive member 40 may extend out of the slot 201 through the opening to be connected to a power input wire, or the power input wire may extend into the slot 201 through the opening to be connected to the input conductive member 40.

Figure 40:
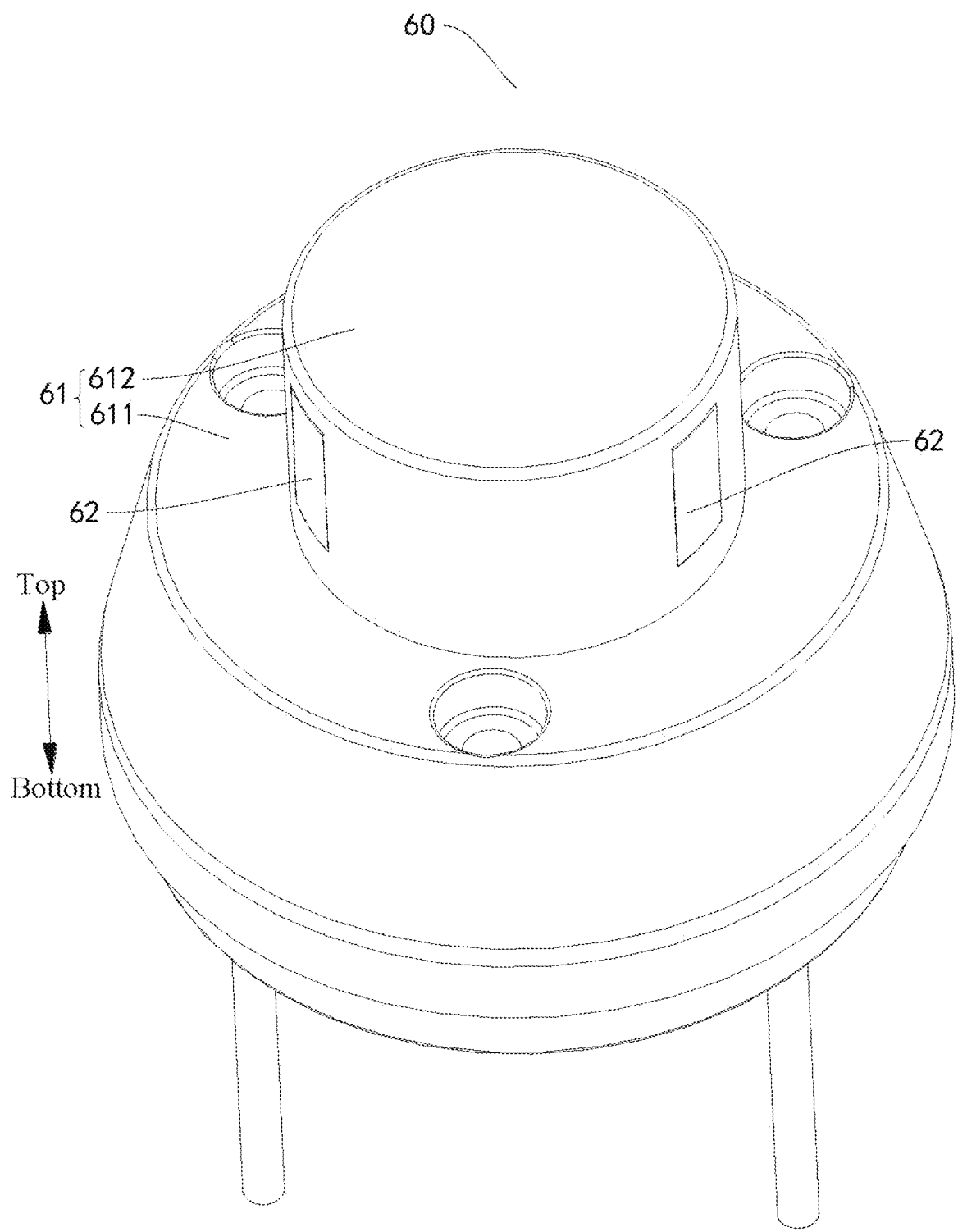
FIG. 40 is a schematic structural diagram of the output end assembly of the power coupler according to the second embodiment of the present disclosure.
Figure 41:
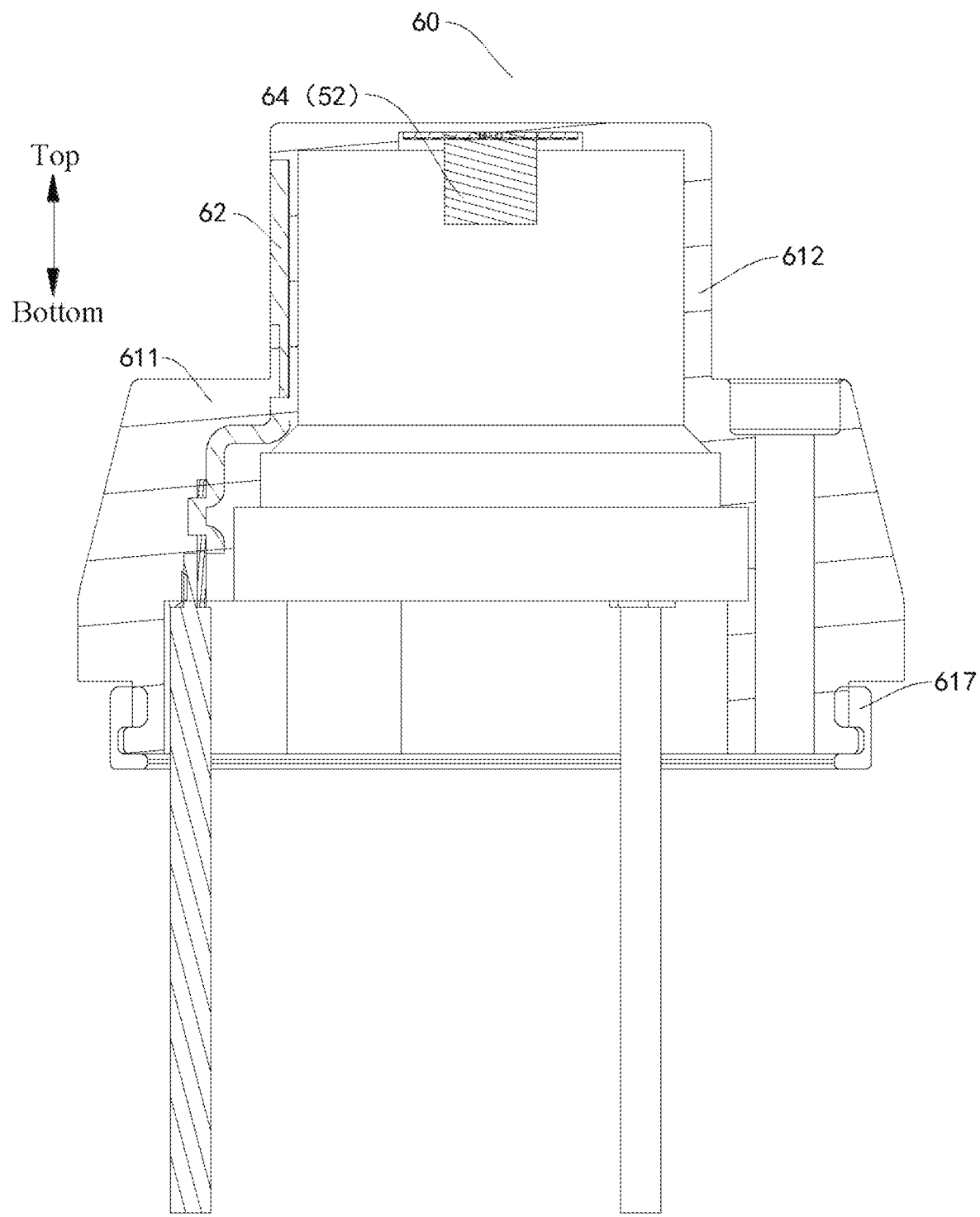
FIG. 41 is a front view of the output end assembly of the power coupler according to the second embodiment of the present disclosure.

In some embodiments of the present disclosure, as shown in FIGS. 40-42, the output end assembly 60 may include the output end base 61, the output end base 61 may include a base main body 611 and a convex member 612, and the convex member 612 is arranged at one side of the base main body 611 in the protruding manner to enable the output end base 61 to form into the convex-shaped structure, such that a dead angle is difficultly generated, and accumulation of residues is avoided. The convex member 612 may extend into the slot 201 to realize connection of the output end assembly 60 to the input end assembly 10, such that a connection mode is simple, and connection is liable to disassemble.

Continue to refer to FIGS. 40-42, the output conductive member 62 may be connected to the output end base 61 and may be exposed from the outer peripheral face of the convex member 612, such that the output conductive member 62 may be connected to the input conductive member 40 as the convex member 612 extends into the slot 201. Furthermore, the convex member 612 may drive the sealing cover 30 to move when extending into the slot 201, and the magnetic drivers 64 may be mounted at the convex member 612 to drive the corresponding stoppers 51 to move towards the second position before the convex member 612 is inserted into the slot 201, such that insertion of the convex member 612 into the slot 201 is smoother, the operation steps are less, and mounting is more convenient.

Further, as shown in FIG. 41, the magnetic drivers 64 may be magnets built in the convex member 612, such that the appearance of the convex member 612 is simple and beautiful; and in addition, the magnets are strong in drive forces to the stoppers 51. The present disclosure does not made particular limitation to a fixing mode of the magnets, for example, the magnets may be connected to the inner wall face of the convex member 612 in an adhering manner, a clamping manner, through the corresponding fasteners or the like. Alternatively, the convex member 612 and the base main body 611 may be an integral rubber seat, the structure is more simple, and the processing procedures and the assembly procedures may be reduced.

The power coupler 100 according to a specific embodiment of the present disclosure is described in details with reference to the drawings below. It should be understood that the following descriptions are for illustrative purposes only, but not to be construed as limiting the present disclosure.

As shown in FIGS. 25-68, the input end assembly 10 of the power coupler 100 is mounted at the upper cover 212 of the cover body assembly 200, the output end assembly 60 is mounted at the cover plate 213 of the cover body assembly 200, the magnetic drivers 64 are the magnets, the stoppers 51 are magnetic drive self-locking pins, and the stopping slots 205 are self-locking holes.

As shown in FIG. 25 and FIG. 26, when the cover plate 213 is in a pulled out state, i.e., when the cover plate 213 is removed from the upper cover 212, the output end assembly 60 is separated from the input end assembly 10, the magnets are farther from the magnetic drive self-locking pins, and the sealing cover 30 moves downwards under the effect of the elastic member 70; and when the sealing cover 30 moves to a stopping position, i.e. the sealing cover 30 blocks off the slot port of the slot 201, the magnetic drive self-locking pins penetrate through the corresponding through holes 351 and then the corresponding self-locking holes due to the effect of the thrust of the stopping reset members 53 to realize the self-locking function.

As shown in FIG. 26 and FIG. 27, when the cover plate 213 is inserted into the upper cover 212, the output end assembly 60 approaches the interpose 10, the magnets approach the corresponding magnetic drive self-locking pins, and the magnetic drive self-locking pins compress the corresponding stopping reset members 53 to move inwards under the effect of the magnets and are departed from the corresponding self-locking holes of the input end base 20 so as to be in an opening state. At the time, as shown in FIG. 28 and FIG. 29, the output end assembly 60 may push the sealing cover 30 to compress the elastic member 70 to move upwards, such that the convex member 612 of the output end assembly 60 may be inserted into the slot 201 of the input end assembly 10 for power coupling.

An ultrasonic oscillator device 400 according to the embodiment of the second aspect of the present disclosure is described with reference to the drawings below.

Refer to FIGS. 47-68, the ultrasonic oscillator device 400 according to the embodiment of the second aspect of the present disclosure includes an ultrasonic oscillator 410 and the power coupler 100 according to the embodiment of the first aspect of the present disclosure.

Figure 55:
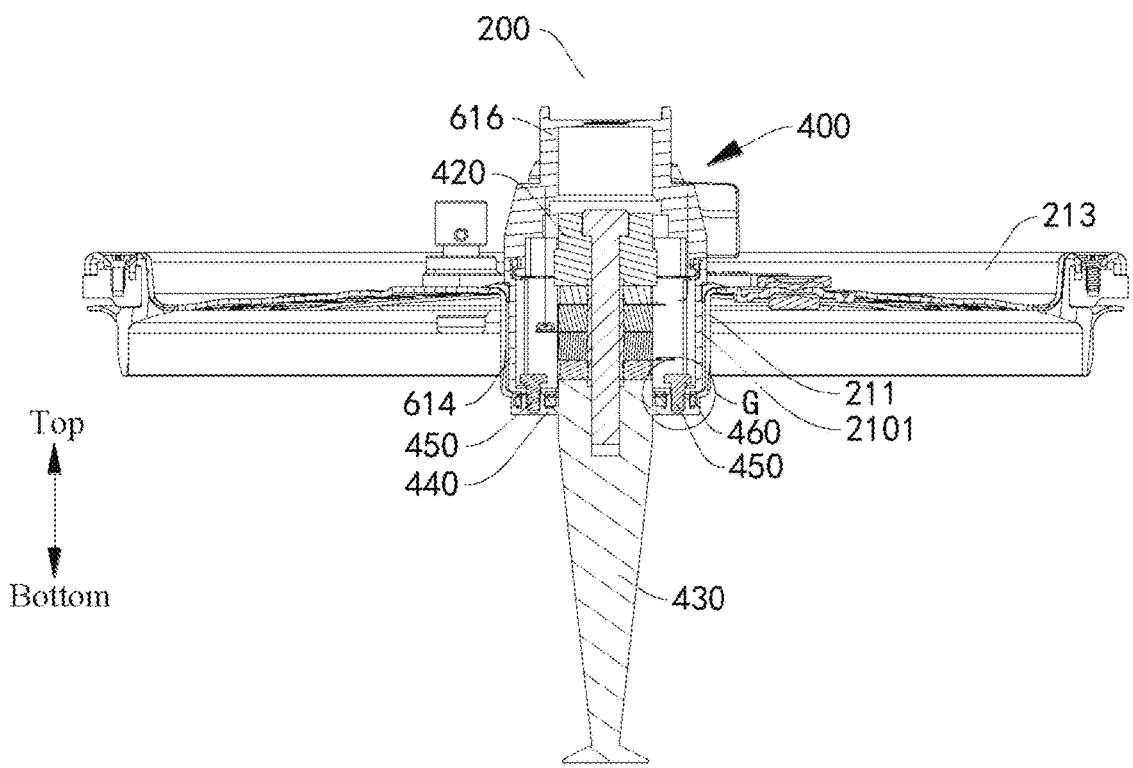
FIG. 55 is a cross-sectional view of the cover body assembly according to the embodiments of the present disclosure.
Figure 62:
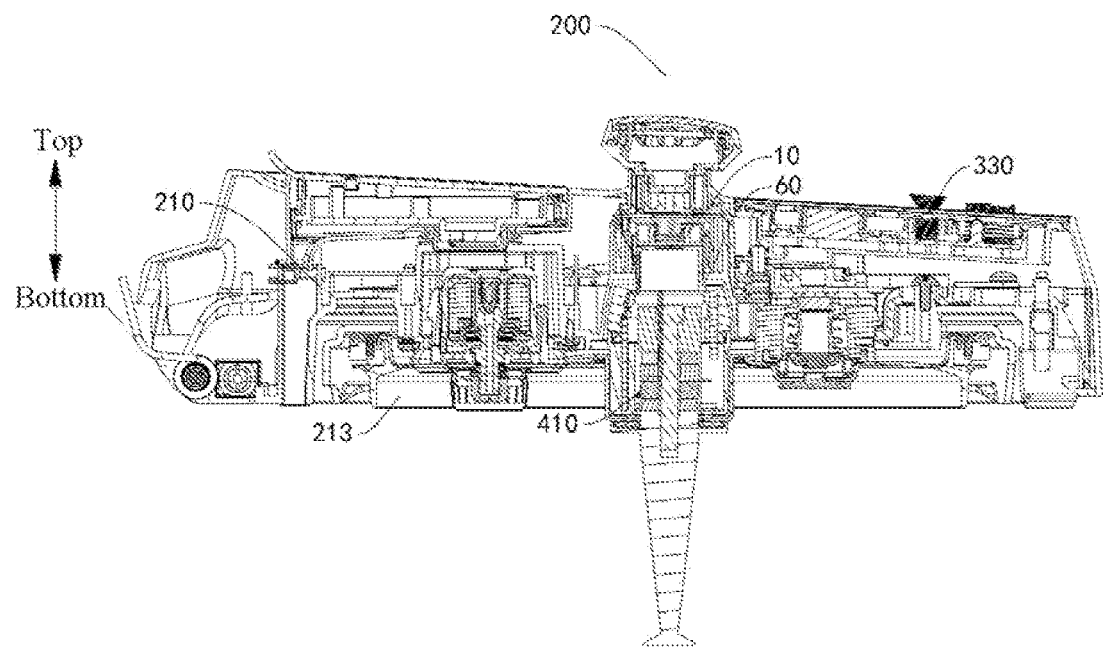
FIG. 62 is a schematic structural diagram of the cover body assembly according to the embodiments of the present disclosure, where the power coupler is the power coupler according to the first embodiment of the present disclosure.
Figure 63:
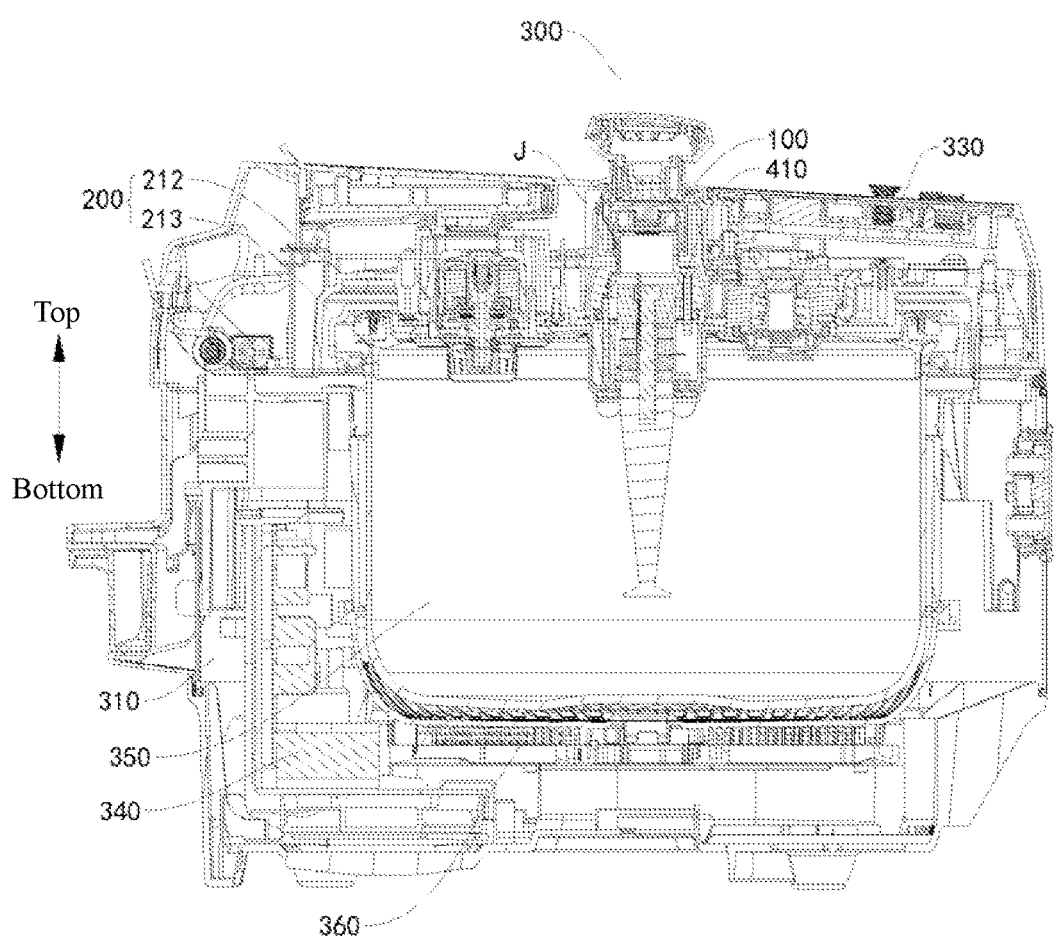
FIG. 63 is a schematic structural diagram of the cooking utensil according to some embodiments of the present disclosure, where the power coupler is the power coupler according to the first embodiment of the present disclosure.

As shown in FIG. 55 and FIG. 62, one end of the output end assembly 60 is in coupling connection to the input end assembly 10, and the other end of the output end assembly 60 is electrically connected to the ultrasonic oscillator 410. Thus, the external power supply may supply power to the ultrasonic oscillator 410 by matching the output end assembly 60 to the input end assembly 10 to generate ultrasonic waves.

Refer to FIGS. 47-53, the ultrasonic oscillator 410 according to the embodiment of the third aspect of the present disclosure may include: a piezoelectric assembly 4201, a first end block 4202, a second end block 4208, an oscillation rod 430, a first insulation ring 480 and a pre-tightening member 451. The ultrasonic oscillator 410 of the ultrasonic oscillator device 400 according to the embodiment of the second aspect of the present disclosure may be an ultrasonic oscillator 410 according to the embodiment of the third aspect of the present disclosure.

Particularly, the piezoelectric assembly 4201 may include piezoelectric sheets (for example, piezoelectric ceramics) 11 and electrode sheets 4207, and the electrode sheets 4207 may be connected to the corresponding piezoelectric sheets 4206. When the electrode sheets 4207 are energized, voltages at the two end surfaces of the piezoelectric sheets 4206 may be varied; and the piezoelectric sheets 4206 generate high-frequency oscillation under current excitation by using the inverse piezoelectric effect, conversion from electric power to mechanical power is realized, and the ultrasonic waves are generated. Alternatively, in some embodiments, there may be multiple piezoelectric sheets 4206, and the multiple piezoelectric sheets 4206 may be arranged in a stacking manner.

As shown in FIGS. 47-51, the first end block 4202 may be arranged at one axial end of the piezoelectric assembly 4201, and the second end block 4208 may be arranged at the other axial end of the piezoelectric assembly 4201, such that the ultrasonic oscillator 400 may be formed into a sandwich type ultrasonic oscillator device; the first end block 4202 and the second end block 4208 are matched to be capable of fixing the piezoelectric assembly 4201 to improve the stability of the piezoelectric assembly 4201; and a resonance frequency of the ultrasonic oscillator 410 may be adjusted at the same time, and energy transfer may be performed. The sandwich type ultrasonic oscillator device is liable to process and is liable in adjusting a frequency, and the structure is simple.

When the ultrasonic oscillator 410 is applied to apparatuses, such as the cooking utensil 300, the ultrasonic waves generated by the piezoelectric assembly 4201 may be transferred outwards in an indirect mode of transferring the ultrasonic waves by a medium and also in an entering mode that the oscillation rod 430 directly goes deep into the medium for working. The oscillation rod 430 may be arranged at one end, away from the piezoelectric assembly 4201, of the second end block 4208, and mechanical oscillation generated by the piezoelectric assembly 4201 may be transferred to the oscillation rod 430 through the second end block 4208, may be continuously transferred along the oscillation rod 430 and then may be emitted outwards to be acted on a propagation medium.

When the ultrasonic oscillator works, voltage of each electrode sheet is several times higher than the mains voltage, and thus the ultrasonic oscillator is dangerous. In the related art, the design of the ultrasonic oscillator has the creepage phenomenon and has a weak current; and the user may have a sense of electric shock in the using process and in a touchable application scenario, and certain security risks are generated.

In the present disclosure, the first insulation ring 480 may be arranged between the piezoelectric assembly 4201 and the second end block 4208 and may isolate the piezoelectric assembly 4201 from the second end block 4208, a distance between the piezoelectric assembly 4201 and the second end block 4208 is increased, and in addition, a high-voltage creepage phenomenon occurring in the working process of the piezoelectric assembly 4201 is isolated, such that a current cannot be transferred to the second end block 4208 from the piezoelectric assembly 4201, and the risk that the user gets an electric shock by touching the second end block 4208 is lowered.

Figure 49:
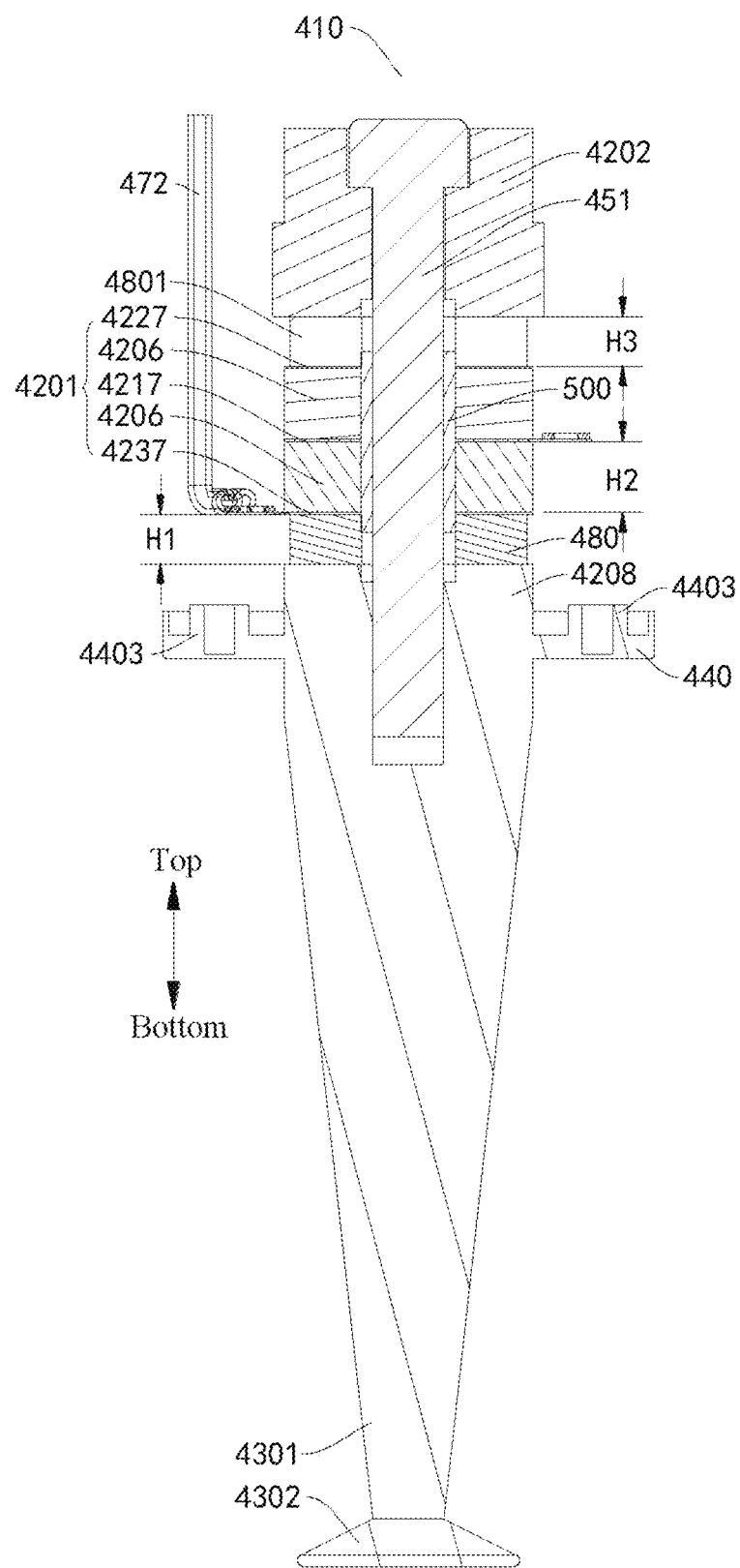
FIG. 49 is a cross-sectional view of the ultrasonic oscillator according to one embodiment of the present disclosure.
Figure 51:
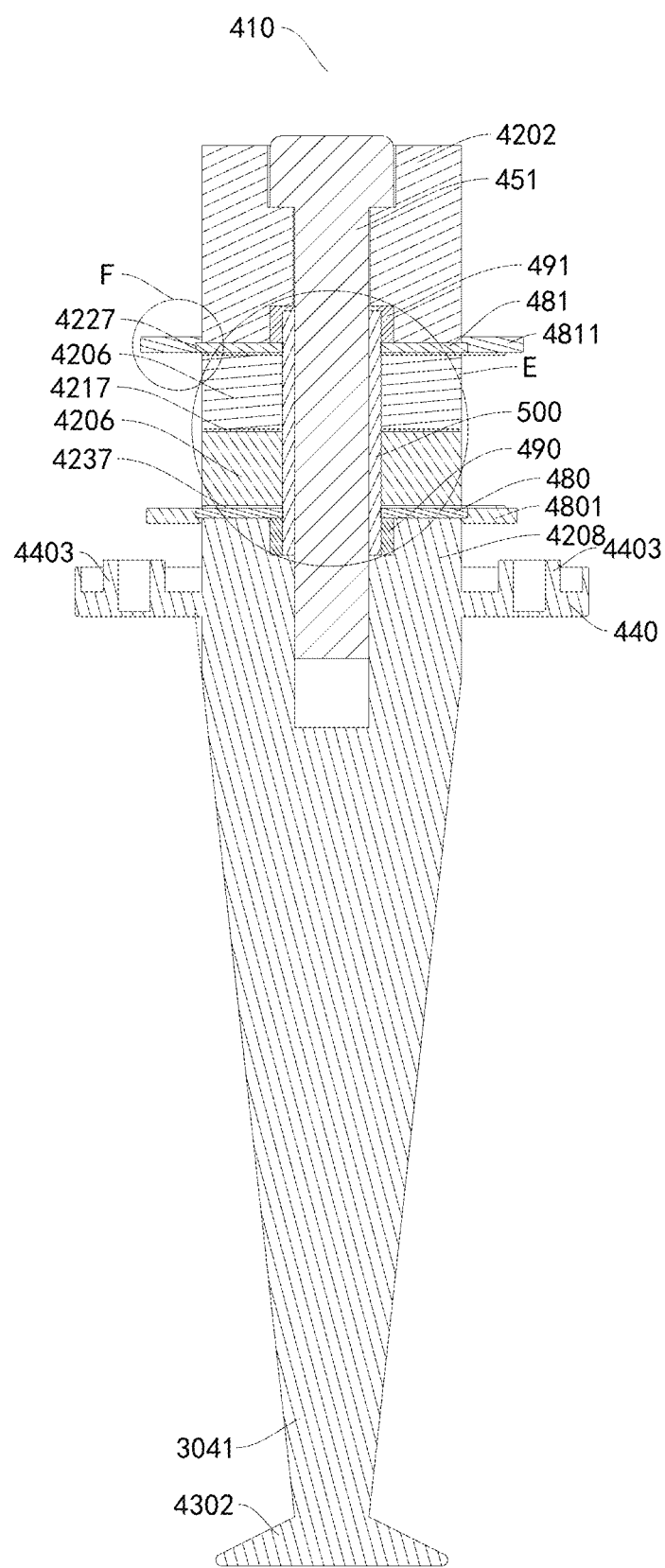
FIG. 51 is a cross-sectional view of the ultrasonic oscillator according to another embodiment of the present disclosure.

Furthermore, as shown in FIG. 49 and FIG. 51, the pre-tightening member 451 may penetrate into the first end block 4202, the pre-tightening member 4201, the first insulation ring 480, the second end block 4208 and the oscillation rod 430 to apply sufficient axial pre-tightening force to the first end block 4202, the pre-tightening member 4201, the first insulation ring 480, the second end block 4208 and the oscillation rod 430, such that the first end block 4202, the pre-tightening member 4201, the first insulation ring 480, the second end block 4208 and the oscillation rod 430 are connected together, and connection is firm.

Further, a contact portion of the pre-tightening member 451 and the piezoelectric assembly 4201 is a plastic piece, or the pre-tightening member 451 is formed into the plastic piece, such that insulating arrangement may be formed between the pre-tightening member 451 and the piezoelectric assembly 4201. The pre-tightening member 451 may isolate the first end block 4202, the pre-tightening member 4201 the second end block 4208 and the oscillation rod 430, on one hand a short circuit of the pre-tightening member 4201 may be prevented; and on the other hand, the pre-tightening member 451 may cause insulation among the first end block 4202, the second end block 4208, the oscillation rod 430 and the piezoelectric assembly 4201, and the user is further prevented from getting the electric shock.

For the ultrasonic oscillator 410 according to the embodiments of the present disclosure, by arranging the first insulation ring 480 between the piezoelectric assembly 4201 and the second end block 4208, the second end block 4208 may be isolated from the piezoelectric assembly 4201, such that the high-voltage creepage phenomenon is effectively improved, the risk of electric shock of the user is lowered, hurts on a human body are avoided, and the ultrasonic oscillator 410 is safer and more reliable.

Alternatively, in the present disclosure, the first insulation ring 480 may be a ceramic ring, for example, an alumina ceramic ring or a zirconia ceramic ring, is good in the insulativity, resists high temperature and wear and thus is beneficial to prolonging the service life of the ultrasonic oscillator 410.

In some embodiments of the present disclosure, as shown in FIG. 49, the thickness H1 of the first insulation ring 480 (i.e. an axial length of the first insulation ring 480) may satisfy: 4 mm≤H1≤7 mm, for example, the thickness H1 may be 4.5 mm, 5 mm, 5.5 mm, 6 mm, 6.5 mm and the like. Therefore, the high-voltage creepage phenomenon may be guaranteed to be isolated, too long axial length of the first insulation ring 480 or large impedance caused by overlarge thickness H1 of the first insulation ring 480 is also prevented, decrease in working temperature of the ultrasonic oscillator 410 is facilitated, and the ultrasonic oscillator 410 may keep good energy transfer efficiency.

According to some embodiments of the present disclosure, as shown in FIG. 49, the thickness H2 of the piezoelectric sheet 4206 may satisfy: 3 mm≤H2≤6 mm, for example, the thickness H2 of the piezoelectric sheet 4206 may be 3.5 mm, 4 mm, 4.5 mm, 5 mm, 5.5 mm and the like; and the thickness H1 of the first insulation ring 480 and the thickness H2 of the piezoelectric sheet 4206 may satisfy: 10 mm≤H1+H2≤13 mm, for example, H1+H2 may be 10.5 mm, 11 mm, 11.5 mm, 12 mm, 12.5 mm and the like. Thus, a distance between the electrode sheet 4207 and the second end block 4208 of the piezoelectric assembly 4201 may be further ensured to be long enough, such that the high-voltage creepage phenomenon may be better isolated, and meanwhile, serious heating of the piezoelectric assembly 4201 caused by too long axial length of the ultrasonic oscillator 410 is prevented.

Figure 52:
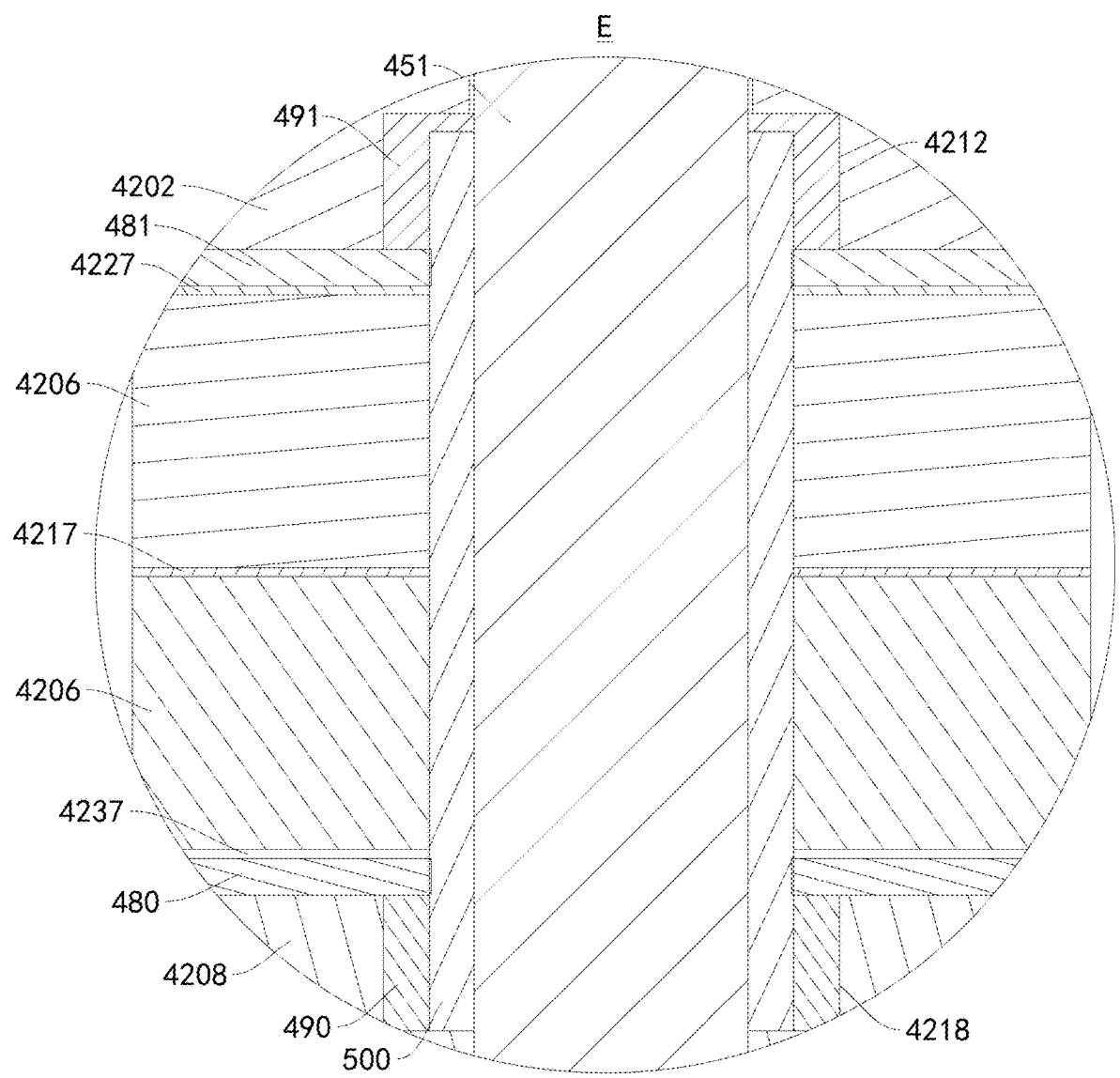
FIG. 52 is a schematic enlarged structural diagram of part E shown in FIG. 51.

In some embodiments of the present disclosure, as shown in FIG. 49, FIG. 51 and FIG. 52, the ultrasonic oscillator 410 may further include an insulation sleeve 500, the insulation sleeve 500 may be arranged between the pre-tightening member 451 and the piezoelectric assembly 4201, for example, the insulation sleeve 500 may be arranged at the pre-tightening member 451 in the sleeved manner to be capable of forming insulating arrangement between the pre-tightening member 451 and the piezoelectric assembly 4201. Thus, the insulation sleeve 500 may isolate the first end block 4202, the piezoelectric assembly 4201, the second end block 4208 and the oscillation rod 430, such that a short circuit of the piezoelectric assembly 4201 is prevented, and the insulating effect on the first end block 4202, the second end block 4208 and the oscillation rod 430 is better.

It should be noted that in the embodiments including the insulation sleeve 500, the pre-tightening member 451 may be an insulating fastener, for example, plastic fastener and the like and may also be a metal fastener, for example, a stainless steel bolt and the like.

Furthermore, when the voltage of the piezoelectric assembly 4201 is overlarge, the risk of high-voltage creepage from the inner peripheral face of the first insulation ring 480 to the second end block 4208 still exists. Thus, in a further embodiment of the present disclosure, a first annular slot 4218 may be formed in the inner peripheral face of one end, facing the first insulation ring 480, of the second end block 4208 and may be internally provided with a first sealant layer 490. The first sealant layer 490 may seal the gap between the inner peripheral face of the first insulation ring 480 and the pre-tightening member 451, and high-voltage creepage from the inner peripheral face of the first insulation ring 480 to the second end block 4208 is further isolated, such that the insulativity of the second end block 4208 is better.

Figure 50:
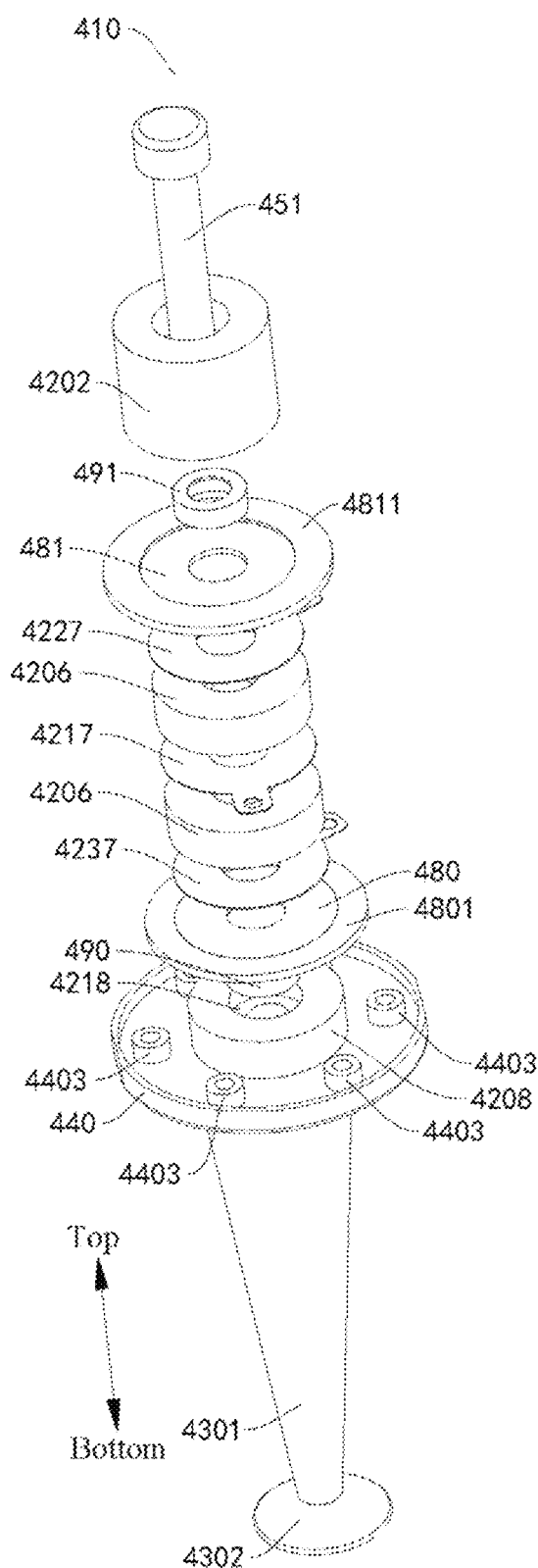
FIG. 50 is an exploded view of the ultrasonic oscillator according to another embodiment of the present disclosure.

In some embodiments, as shown in FIG. 50 and FIG. 52, one end of the insulation sleeve 500 may extend into the first annular slot 4218, such that the area, isolating the first end block 4202, the second end block 4208 and the oscillation rod 430, of the insulation sleeve 500 may be increased to improve the insulating effect, and the first annular slot 4218 may limit the insulation sleeve 500 to enable fixing of the insulation sleeve 500 to be more stable. For example, when the axial end surface of the insulation sleeve 500 abuts against the bottom slot surface of the first annular slot 4218, the axial position of the insulation sleeve 500 may be limited.

As shown in FIG. 52, the first sealant layer 490 is at least arranged between the outer peripheral face of the insulation sleeve 500 and the inner peripheral face of the first annular slot 4218 to seal the gap between the outer peripheral face of the insulation sleeve 500 and the inner peripheral face of the first insulation ring 480 with glue and shield the outer peripheral face of the insulation sleeve 500, such that the creepage phenomenon at a corner formed by the first insulation ring 480 and the insulation sleeve 500 is prevented. Thus, on the premise of meeting the safety regulation requirements the thickness of the first insulation ring 480 may be reduced according to the actual condition to lower the impedance and the calorific value of the piezoelectric assembly 4201, and in addition, the production cost of the first insulation ring 480 may be lowered.

It should be noted that the arrangement position of the first sealant layer 490 is not limited to be between the outer peripheral face of the insulation sleeve 500 and the inner peripheral face of the first annular slot 4218. For example, in some embodiments, the first sealant layer 490 may further be arranged between the axial end surface, away from the first end block 4202, of the insulation sleeve 500 and the bottom slot surface of the first annular slot 4218 to seal the axial end surface, away from the first end block 4202, of the insulation sleeve 500 with the glue, and thus creepage caused by a slit between the outer peripheral face of the insulation sleeve 500 and the first sealant layer 490 is prevented.

According to a further embodiment of the present disclosure, as shown in FIGS. 47-52, the ultrasonic oscillator 410 may further include a second insulation ring 481. The pre-tightening member 451 may penetrate through the second insulation ring 481 to enable the second insulation ring 481 to be connected to the first end block 4202, the piezoelectric assembly 4201, the first insulation ring 480, the second end block 4208 and the oscillation rod 430 together; the second insulation ring 481 may be arranged between the piezoelectric assembly 4201 and the first end block 4202 to isolate the piezoelectric assembly 4201 from the first end block 4202, such that a distance between the piezoelectric assembly 4201 and the first end block 4202 is increased, the high-voltage creepage phenomenon in the working process of the piezoelectric assembly 4201 is isolated, the electric shock of the user caused by energization of the first end block 4202 is prevented, and user is safer.

Alternatively, the second insulation ring 481 may be a ceramic ring, for example, an alumina ceramic ring or a zirconia ceramic ring, is good in the insulativity, resists high temperature and wear and thus being beneficial to prolonging the service life of the ultrasonic oscillator 410.

Alternatively, as shown in FIG. 49, the thickness H3 of the second insulation ring 481 may satisfy: 4 mm≤H3≤7 mm, the thickness H2 of the piezoelectric sheet 4206 may satisfy: 3 mm≤H2≤6 mm, and the thickness H3 of the second insulation ring 481 and the thickness H2 of the piezoelectric sheet 4206 may satisfy: 10 mm≤H2+H3≤13 mm. Therefore, the high-voltage creepage phenomenon may be guaranteed to be isolated, serious heating of the piezoelectric assembly 4201 caused by overlarge thickness H3 of the second insulation ring 481 is also prevented, decrease in working temperature of the ultrasonic oscillator 410 is facilitated, and the ultrasonic oscillator 410 may keep good energy transfer efficiency.

As shown in FIG. 52, the second annular slot 4212 may be formed in the inner peripheral face of the first end block 4202, one end, away from the second end block 4208, of the insulation sleeve 500 may extend into the second annular slot 4212 to further limit the insulation sleeve 500. Furthermore, the second annular slot 4212 may be further internally provided with a second sealant layer 491, the second sealant layer 491 is at least arranged between the inner peripheral face of the second annular slot 4212 and the outer peripheral face of the insulation sleeve 500 to seal the gap between the outer peripheral face of the insulation sleeve 500 and the inner peripheral face of the second insulation ring 481 with the glue and shield the outer peripheral face of the insulation sleeve 500, such that the creepage phenomenon at a corner formed by the second insulation ring 481 and the insulation sleeve 500 is prevented. Thus, on the premise of meeting the safety regulation requirements the thickness of the second insulation ring 481 may be reduced according to the actual condition to lower the impedance and the calorific value of the piezoelectric sheet 4206, and in addition, the production cost of the first insulation ring 481 may be lowered.

Certainly, the arrangement position of the second sealant layer 491 is not limited to be between the outer peripheral face of the insulation sleeve 500 and the inner peripheral face of the second annular slot 4212 either, for example, in a specific embodiment as shown in FIG. 52, the second sealant layer 491 is further arranged between the axial end surface, away from the second end block 4208, of the insulation sleeve 500 and the bottom slot surface of the second annular slot 4212 to seal the axial end surface, away from the second end block 4208, of the insulation sleeve 500 with the glue, and thus creepage caused by a slit between the outer peripheral face of the insulation sleeve 500 and the second sealant layer 491 is prevented.

Figure 53:
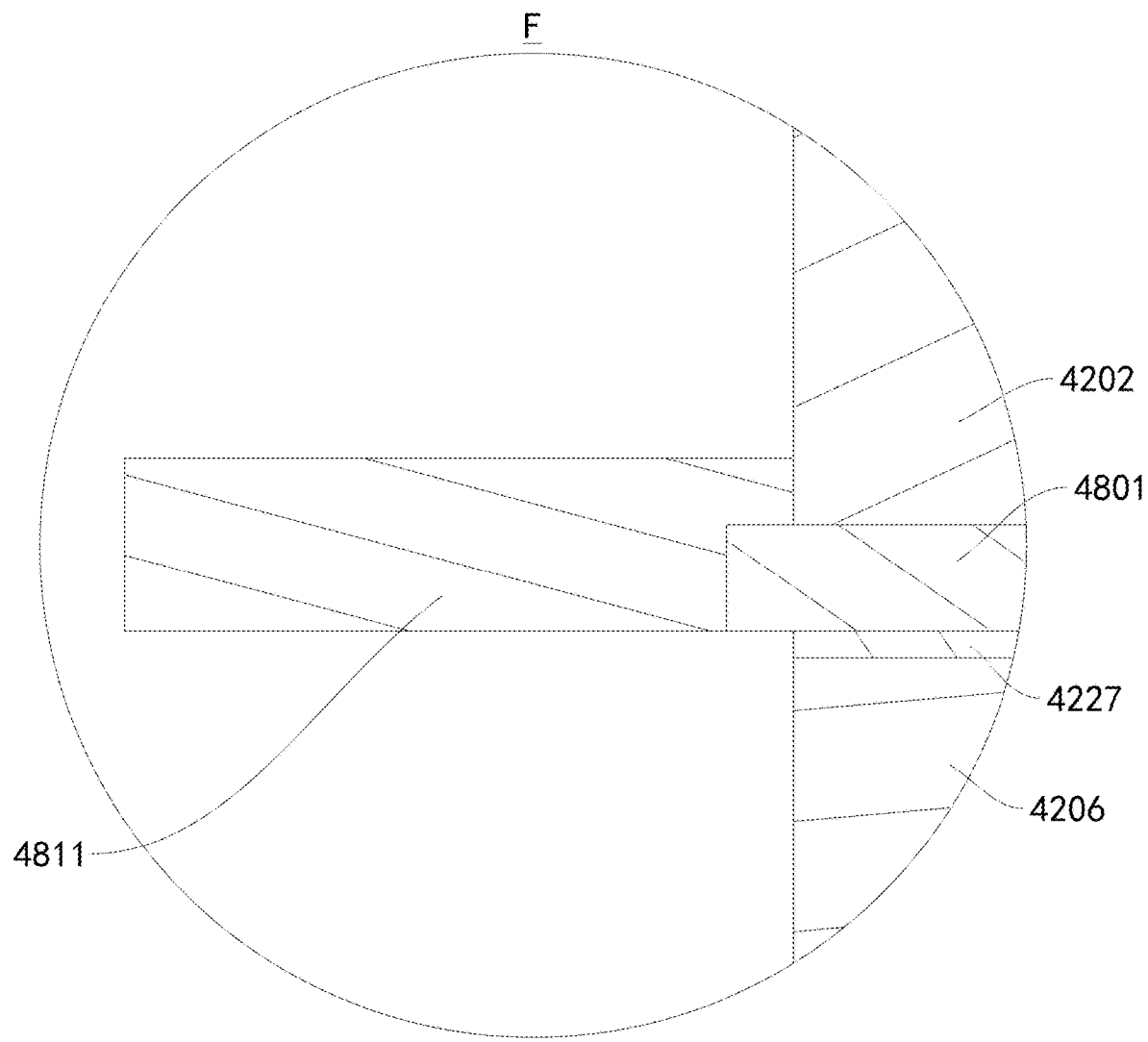
FIG. 53 is a schematic enlarged structural diagram of part F shown in FIG. 51.
Figure 54:
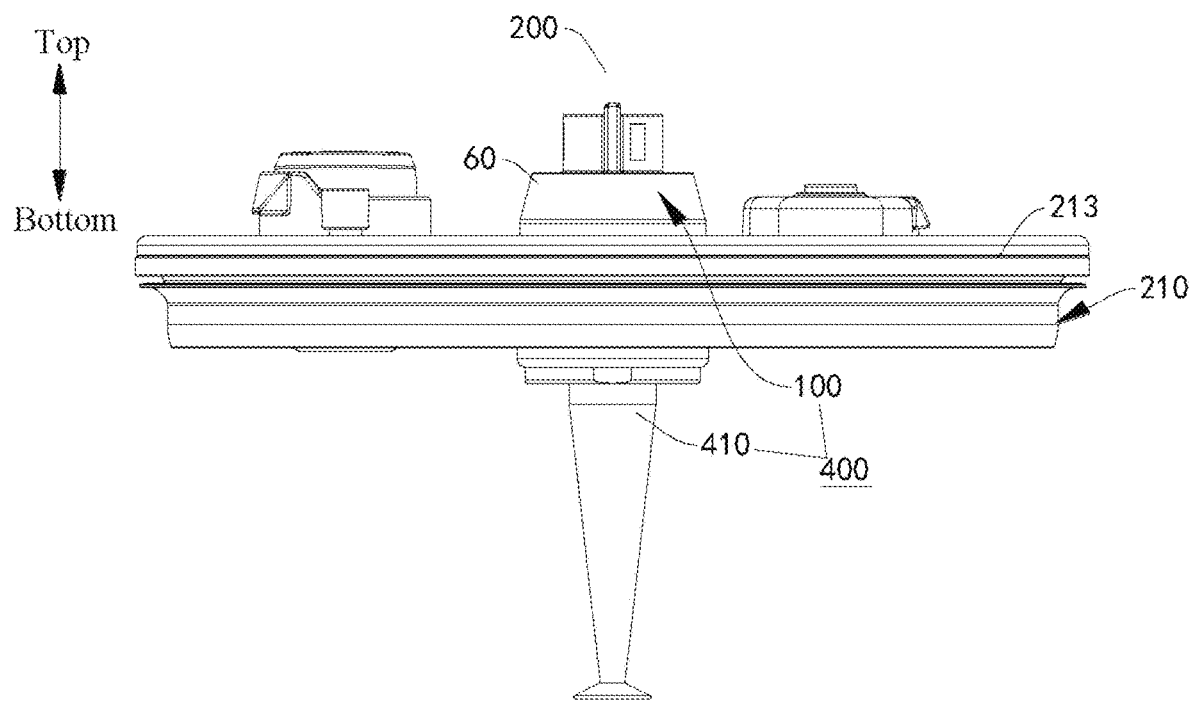
FIG. 54 is a schematic structural diagram of the cover body assembly according to the embodiments of the present disclosure.

In some embodiments of the present disclosure, as shown in FIG. 51 and FIG. 53, the outer peripheral face of the first insulation ring 480 may exceed the outer peripheral face of the piezoelectric assembly 4201 outwards to increase a radial insulating distance of the first insulation ring 480, such that the situation that the second end block 4208 and the oscillation rod 430 are energized caused by creepage in a radial direction of the first insulation ring 480 is prevented, the safety regulation requirements are more met, and the electric shock resistance effect is better.

Further, the ultrasonic oscillator 410 may further include a first insulation glue layer 4801, and the first insulation glue layer 4801 may be arranged at the outer peripheral face of the first insulation ring 480. The first insulation glue layer 4801 may extend in the radial direction of the first insulation ring 480 to form more rings with outside diameters exceeding the outer peripheral face of the piezoelectric assembly 4201 outwards with the first insulation ring 480, such that the insulating distance is further increased, and the creepage and electric shock resistance effects are improved. And, in the embodiments including the first insulation glue layer 4801, the radial size and the axial size of the first insulation ring 480 may be properly reduced, such that the safety regulation requirements are met, and the production cost of the first insulation ring 480 and the caloric value of the piezoelectric assembly 4201 may also be lowered.

In some specific embodiments, as shown in FIG. 51 and FIG. 53, an annular slot with an opening facing the first end block 4202 may be formed in the inner peripheral edge of the first insulation glue layer 4801, the inner peripheral face of the annular slot may cover the outer peripheral face of the first insulation ring 480, and the bottom slot surface of the annular slot may cover the outer edge of the axial end surface, away from the first end block 4202, of the first insulation ring 480. Thus, a connection area of the first insulation glue layer 4801 and the first insulation ring 480 may be increased, the creepage between the outer peripheral face of the first insulation ring 480 and the inner peripheral face of the annular slot is prevented at the same time.

According to some embodiments of the present disclosure, as shown in FIG. 51 and FIG. 53, the outer peripheral face of the second insulation ring 481 may also exceed the outer peripheral face of the piezoelectric assembly 4201 outwards to increase a radial insulating distance of the second insulation ring 481, such that the situation that the first end block 4208 is energized caused by creepage in a radial direction of the second insulation ring 481 is prevented, the safety regulation requirements are more met, and the electric shock resistance effect is better.

Further, as shown in FIG. 51 and FIG. 53, the ultrasonic oscillator 410 may further include a second insulation glue layer 4811, and the second insulation glue layer 4811 may be arranged at the outer peripheral face of the second insulation ring 481 to increase a distance, exceeding the outer peripheral face of the piezoelectric assembly 4201, of the second insulation ring 481, such that the insulating distance is further increased, and the creepage and electric shock resistance effects are improved. And, in the embodiments including the second insulation glue layer 4811, the radial size and the axial size of the second insulation ring 481 may be properly reduced, such that the safety regulation requirements are met, and the production cost of the second insulation ring 481 and the caloric value of the piezoelectric assembly 4201 may also be lowered.

Alternatively, in the present disclosure, the first insulation glue layer 4801 and the second insulation glue layer 4811 may be high-temperature glue, the high-temperature glue may be formed at the outer peripheral face of the first insulation ring 480 or the second insulation ring 481 in an integrally molding manner, such that connection of the high-temperature glue to the first insulation ring 480 or the second insulation ring 481 is firm without a seam, and the high temperature resistance effect and the electric shock resistance effect are good.

In the present disclosure, the numbers of the piezoelectric sheet 4206 and the electrode sheet 4207 may be adjusted according to the actual needs, such that the ultrasonic oscillator 410 may output ultrasonic waves with different intensities to meet different use demands. In a further embodiment, as shown in FIG. 47-51, there may be multiple electrode sheets 4207, the multiple electrode sheets 4207 may be spaced from each other by the piezoelectric sheets 4206 to form different electrodes or varying a voltage difference between the two end surfaces of the piezoelectric sheets 4206; yet or the multiple electrode sheets 4207 may form a parallel circuit or a series circuit, such that the ultrasonic oscillator 410 may output the ultrasonic waves with different intensities.

For example, in the specific embodiments as shown in FIG. 47-51, there are two piezoelectric sheets 4206 arranged in a stacking manner, three electrode sheets 4207 may be included and are a positive electrode sheet 4217, a first negative electrode sheet 4227 and a second negative electrode sheet 4237 respectively, where the positive electrode sheet 4217 may be sandwiched between two piezoelectric sheets 4206, the second negative electrode sheet 4237 may be sandwiched between the piezoelectric sheets 4206 and the first insulation ring 480, and the first negative electrode sheet 4227 may be sandwiched between the first end block 4202 and the piezoelectric sheets 4206; and in the embodiments including the second insulation ring 481, the first negative electrode sheet 4227 may be sandwiched between the second insulation ring 481 and the piezoelectric sheets 4206.

Figure 47:
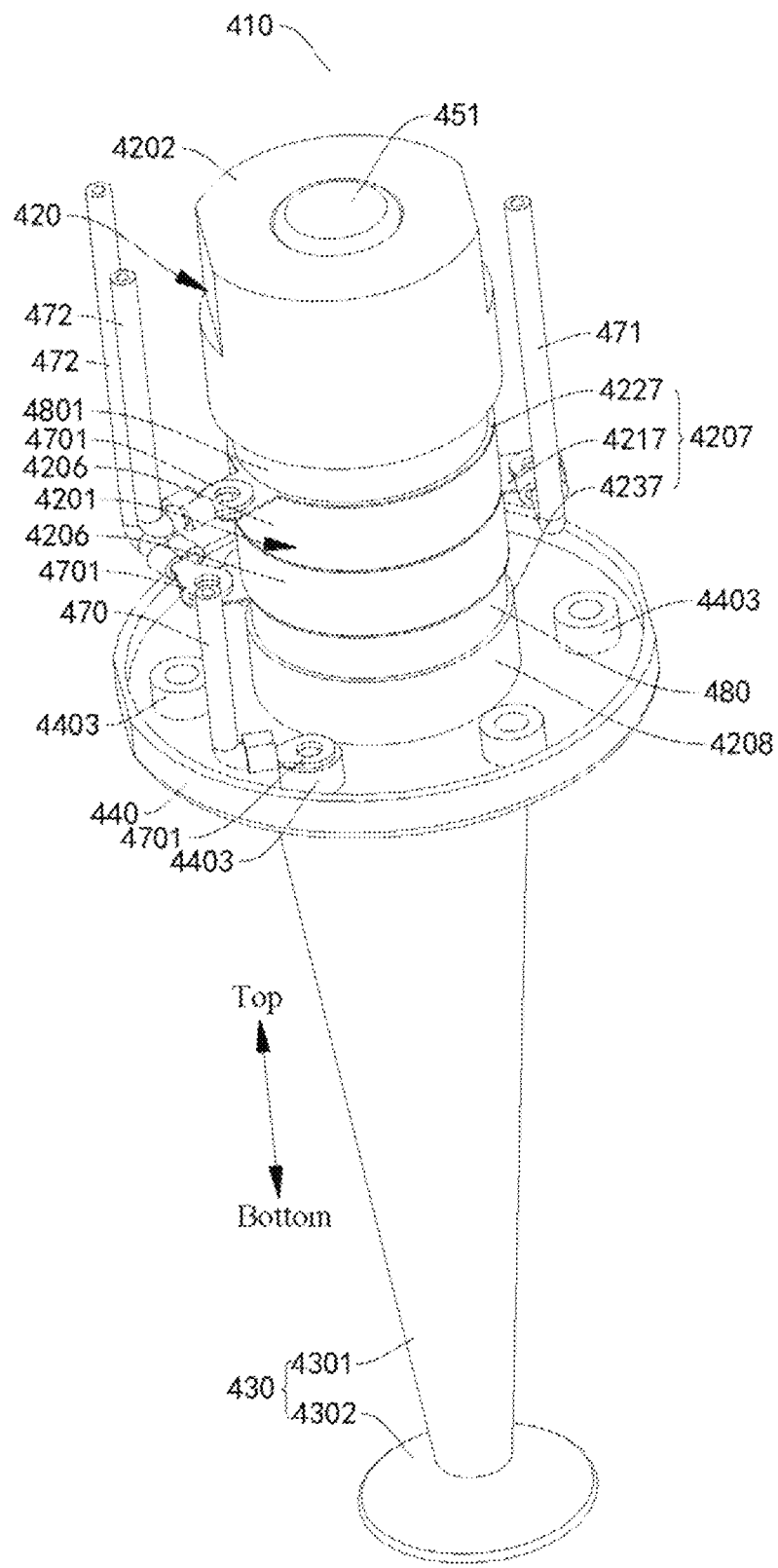
FIG. 47 is a schematic structural diagram of an ultrasonic oscillator according to one embodiment of the present disclosure.
Figure 48:
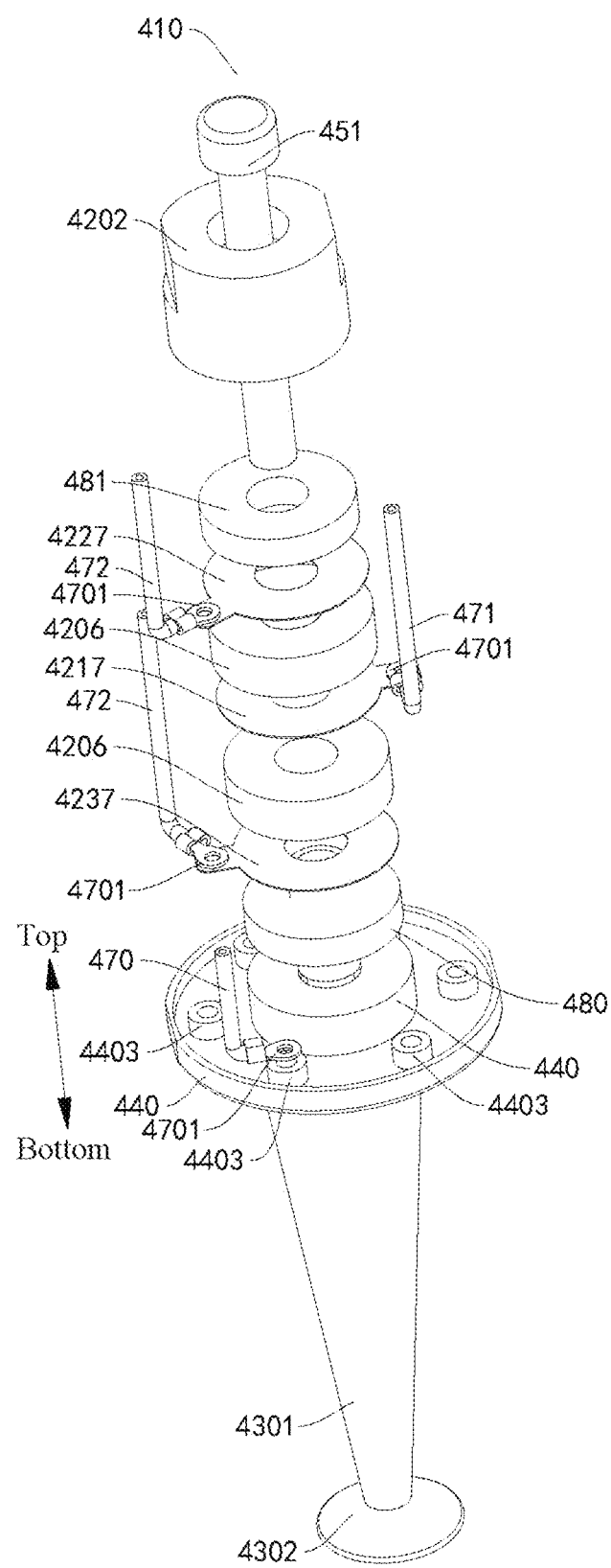
FIG. 48 is an exploded view of the ultrasonic oscillator according to one embodiment of the present disclosure.

As shown in FIG. 47 and FIG. 48, the positive electrode sheet 4217 may be electrically connected to a positive electrode line 471, and the first negative electrode sheet 422 and the second negative electrode sheet 4237 may be electrically connected to a negative electrode line 472, such that the piezoelectric sheets 4206 can form parallel connection through the negative electrode line 4217, the first negative electrode sheet 4227 and the second negative electrode sheet 4237 to increase a capacitance, and the ultrasonic oscillator 410 may meet more use demands.

According to some embodiments of the present disclosure, as shown in FIG. 47 and FIG. 48, the ultrasonic oscillator 410 may further include a ground line 470, the ground line 470 may be electrically connected to the oscillation rod 430 to realize grounding of the oscillation rod 430, and thus the oscillation rod 430 is prevented from transferring charges. As the oscillation rod 430 is exposed outsides when the ultrasonic oscillator 410 is mounted in the apparatuses such as the cooking utensil 300, a human body is liable to touch the oscillation rod 430. If the oscillation rod 430 is energized, the user is liable to generate the condition of the electric shock; and the user may be effectively avoided from getting the electric shock by grounding of the oscillation rod 430, such that potential safety hazards are completely eradicated.

Further, as shown in FIG. 47 and FIG. 48, the oscillation rod 430 and the second end block 4208 may integrally formed to simplify the structure of the ultrasonic oscillator 410, and thus the assembly procedures are reduced. The mounting member 440 protruding outwards may be arranged at the outer peripheral face of the upper part of the oscillation rod 430, a wiring ring 4701 may be arranged at one end of each ground line 470, each wiring ring 4701 and the mounting member 440 are connected through a connection fastener, and a connection structure is simple and firm. Alternatively, the wiring ring 4701 may be a wiring terminal.

Still further, continue to refer to FIG. 47 and FIG. 48, protruding fixation columns 4403 may be arranged at one surface, facing the first end block 4202, of the mounting member 440, the wiring rings 4701 may be connected to the fixation columns 4403 through the connection fasteners respectively, such that electric connection of the ground lines 470 to the oscillation rod 430 is realized; and furthermore, the wiring rings 4701 and the fixation columns 4403 are in face-to-face contact, such that connection resistance is smaller, and connection is more stable.

Furthermore, the ultrasonic oscillator 410 may be mounted at the apparatuses, such as the cooking utensil 300, through the mounting member 440, particularly, the connection fasteners may penetrate through the connection holes of the fixation columns 4403 and the apparatuses, such as the cooking utensil 300, that is the fixation columns 4403 may be used for fixing of the ground lines 470 and also mounting of the ultrasonic oscillator 410, such that the structure of the ultrasonic oscillator 410 may be simplified.

In some embodiments of the present disclosure, as shown in FIGS. 47-51, the oscillation rod 430 may include: an amplitude tuning rod body 4301 and an emission disk 4302, where the amplitude tuning rod body 4301 may vary amplitude of the ultrasonic waves, such that an oscillation-speed ratio is increased, and the energy transfer efficiency of the ultrasonic waves is improved. Alternatively, as shown in FIG. 49, the radial cross sectional area of the amplitude tuning rod body 4301 may vary, for example, the amplitude tuning rod body 4301 may be formed into a stepped pole, a conical pole and the like, such that processing and assembly are convenient, the processing accuracy is easily ensured, improvement on the working frequency accuracy and the ultrasonic effect is facilitated, and the transfer efficiency of the ultrasonic waves is improved by being capable of realizing concentration.

Furthermore, as shown in FIGS. 47-51, the emission disk 4302 may be arranged at one end, away from the piezoelectric assembly 4201, of the amplitude tuning rod body 4301, and the ultrasonic waves transferred from the second end block 4208 to the amplitude tuning rod body 4301 may be continuously transferred to the emission disk 4302 and then are emitted outwards by the emission disk 4302. The emission disk 4302 may protrude outwards from the outer peripheral face of one end, away from the piezoelectric assembly 4201, of the amplitude tuning rod body 4301, such that an area of emitting the ultrasonic waves outwards may be increased, and the ultrasonic oscillator 410 may be acted on the medium in a greater range to improve the ultrasonic effect.

It should be noted that the structure of the emission disk 4302 includes, but not limited to a horn head as shown in FIGS. 47-51; and in some other embodiments, the requirement that the emission disk 4302 protrudes outwards from the outer peripheral face of one end, away from the piezoelectric assembly 4201, of the amplitude tuning rod body 4301 needs to be met only.

A mounting assembly of the ultrasonic device according to the embodiment of the fourth aspect and the fifth aspect of the present disclosure is described with reference to the drawings below.

Refer to FIGS. 54-57, the mounting assembly of the ultrasonic device according to the embodiment of the fourth aspect of the present disclosure includes: a base 211 and the ultrasonic oscillator device 400 according to the embodiment of the second aspect of the present disclosure. The mounting assembly of the ultrasonic device according to the embodiment of the fourth aspect of the present disclosure includes: a base 211 and the ultrasonic oscillator device; and alternatively, the ultrasonic oscillator device may be the ultrasonic oscillator device 400 according to the embodiment of the second aspect of the present disclosure and also other ultrasonic oscillator devices.

Particularly, the mounting hole 2102 may be formed in the base 211, the mounting member 440 may be arranged at the outer peripheral face of the ultrasonic oscillator device 400, the upper end of the mounting member 440 may extend upwards into the mounting hole 2102 to enable the mounting member 440 to be located on the lower side of the periphery of the mounting hole 2102, and the mounting member 440 may also be connected to the periphery of the mounting hole 2102.

In some related arts, a soup is boiled by gas exhaust by an exhaust valve when being cooked by the cooking utensil to increase the strong degree of the soup. As the gas exhaust process is short, the pressure boosting process is relatively slow with gas exhaust for multiple times, the cooking process is complex and long, and the gas exhaust process is relatively weak in effect on the soup, the strong degree of the soup and the extraction effect of nutrient substances are not ideal, and a clear soup state of the soup usually occurs.

Whereas, in the present disclosure, when the ultrasonic device is mounted at the cover body assembly 200, the cooking utensil 300 or the heating apparatus through the mounting assembly, the ultrasonic oscillator device 400 may produce and release the ultrasonic waves, and the ultrasonic waves may perform ultrasonic treatment on food materials in the cooking utensil 300 or the heating apparatus. With the mechanical effect and the cavitation of the ultrasonic waves, the food materials may be pretreated to remove harmful substances, such as smudges, pesticides and flesh blood in the food materials when are not cooked and thus being more clean and safe; and furthermore, the extraction time of the nutrient substances in the food materials and the flavor impregnation time of the food materials may be shortened in the cooking process, such that the concentration, proteins and the solid content of the soup are increased, the nutrition is improved, and the taste of the food materials is better; and meanwhile, ultrasonic cleaning may also be performed at the cooking utensil 300 to enable fouling on a cavity wall to disperse, loosen and fall off from the cavity wall of a cooking cavity 350 after cooking is finished, such that self cleaning of the cooking utensil 300 is realized, and cleaning is easier and more clean.

Furthermore, when the ultrasonic oscillator device 400 penetrates through the mounting hole 2102 upwards to be mounted at the base 211, operation may be performed from the lower side of the base 211, such that an operation space is large, and interference is difficult to occur between the ultrasonic oscillator device 400 and other components of the base 211. According to the actual needs, the size of the space on the upper side of the base 211 may be reduced, and more compact structure of the base 211 is facilitated. And, the connection condition of the mounting member 440 and the periphery of the mounting hole 2102 is liable to observe, such that in-place mounting of the mounting member 440 is facilitated, the stability and the reliability of connection of the mounting member 440 are improved, and the situation that the sealing performance of the cooking utensil 300 is influenced due to unstable mounting of the mounting member 440 is prevented.

With the mounting assembly of the ultrasonic device according to the embodiments of the present disclosure, the ultrasonic oscillator device 400 may be mounted in the base 211 from bottom to top, such that a mounting structure is simple and compact; and assembly operation may be performed from the lower side of the base 211, such that operation is liable, connection is more firm and reliable, and improvement on the sealing performance and the cooking taste of the food materials is facilitated.

In the present disclosure, the connection mode of the mounting member 440 and the base 211 may be selected according to the actual needs; and alternatively, the mounting member 440 and the base 211 may be connected to each other in a welding manner, in a riveting manner, in the adhering manner or through structures such as the fastener.

For example, in the specific embodiments as shown in FIGS. 54-59, a first fixation hole 2103 may be formed in the base 211, a second fixation hole 4401 may be formed in the mounting member 440 and may be internally provided with a fastener 70, and the fastener 450 may penetrate through the first fixation hole 2103 to be connected to the base 211 to realize connection of the ultrasonic oscillator device 400 and the base 211, such that the connection structure is simple and firm; and sealing is realized through pre-tightening of the fastener 450. Alternatively, the fastener 450 may be a screw, a bolt and the like.

It should be noted that in the present disclosure, the numbers of the first fixation holes 2103 and the second fixation holes 4401 may be adjusted according to the actual needs. For example, in some embodiments, there are on first fixation hole 2103 and one second fixation hole 4401, the positions of which correspond to each other; for another example, in some other embodiments, the mounting member 440 may be an annular flange arranged at the ultrasonic oscillator device 400, the numbers of the first fixation holes 2103 and the second fixation holes 4401 may be two, three, four or more, the multiple first fixation holes 2103 may be distributed along the periphery of the mounting hole 2102 spaced from each other, the multiple second fixation holes 4401 may be distributed along the circumference of the annular flange spaced from each other, and the multiple first fixation holes 2103 and the multiple second fixation holes 4401 are arranged in one-to-one correspondence to enable the multiple second fixation holes 4401 to be located on the outer periphery of the mounting hole 2102. In the embodiment that the multiple first fixation holes 2103 are uniformly distributed along the periphery of the mounting hole 2102 spaced from each other, when the mounting member 440 is connected to the base 211, circumferential stress is more uniform, fixing is more stable, and improvement on the connection sealing performance and the working stability is facilitated.

Figure 56:
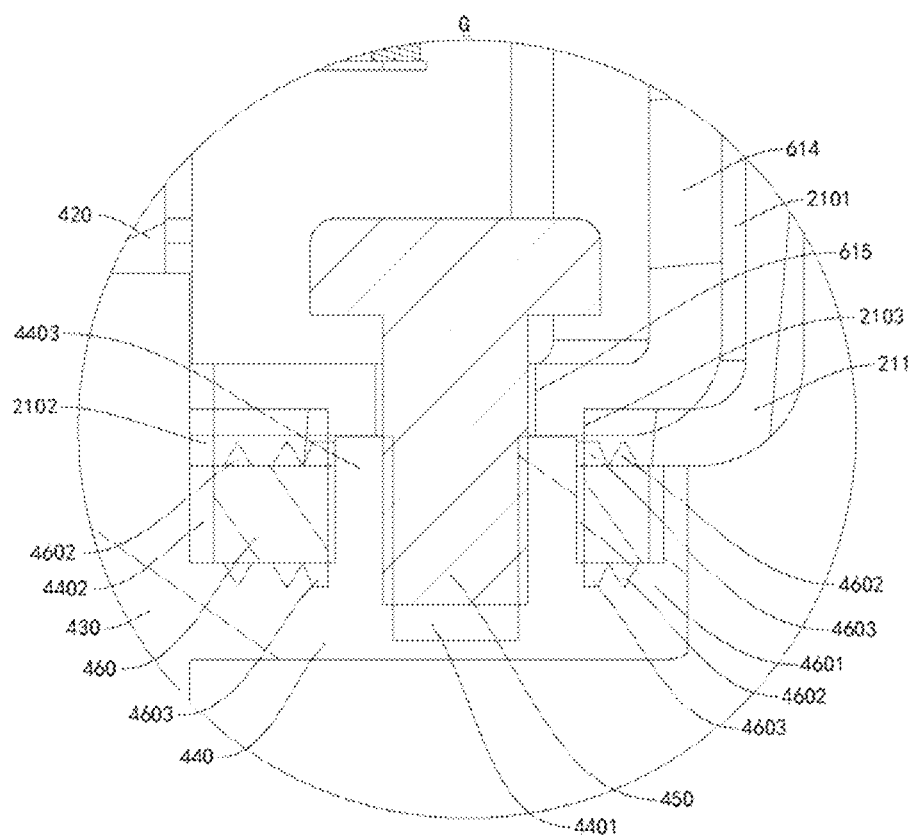
FIG. 56 is a schematic enlarged structural diagram at G shown in FIG. 55.
Figure 57:
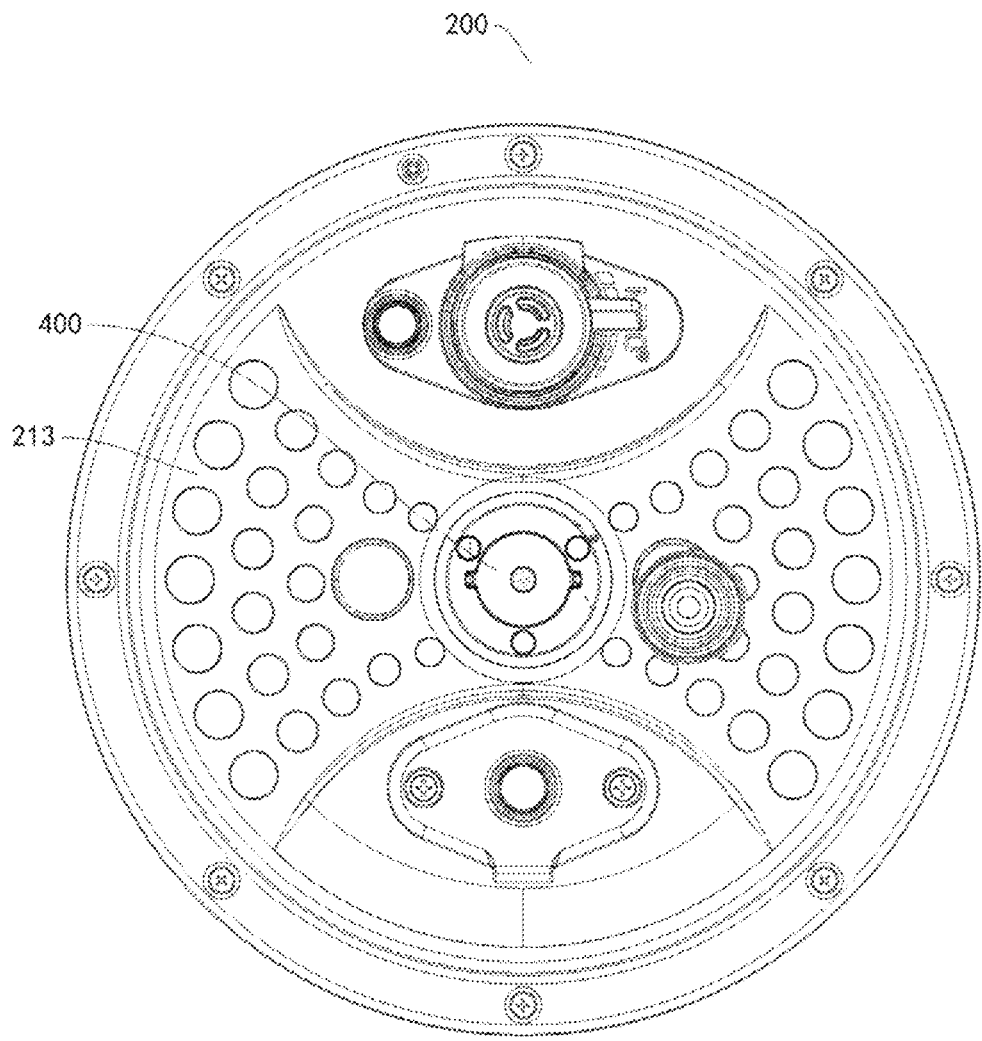
FIG. 57 is a top view of the cover body assembly according to the embodiments of the present disclosure.
Figure 59:
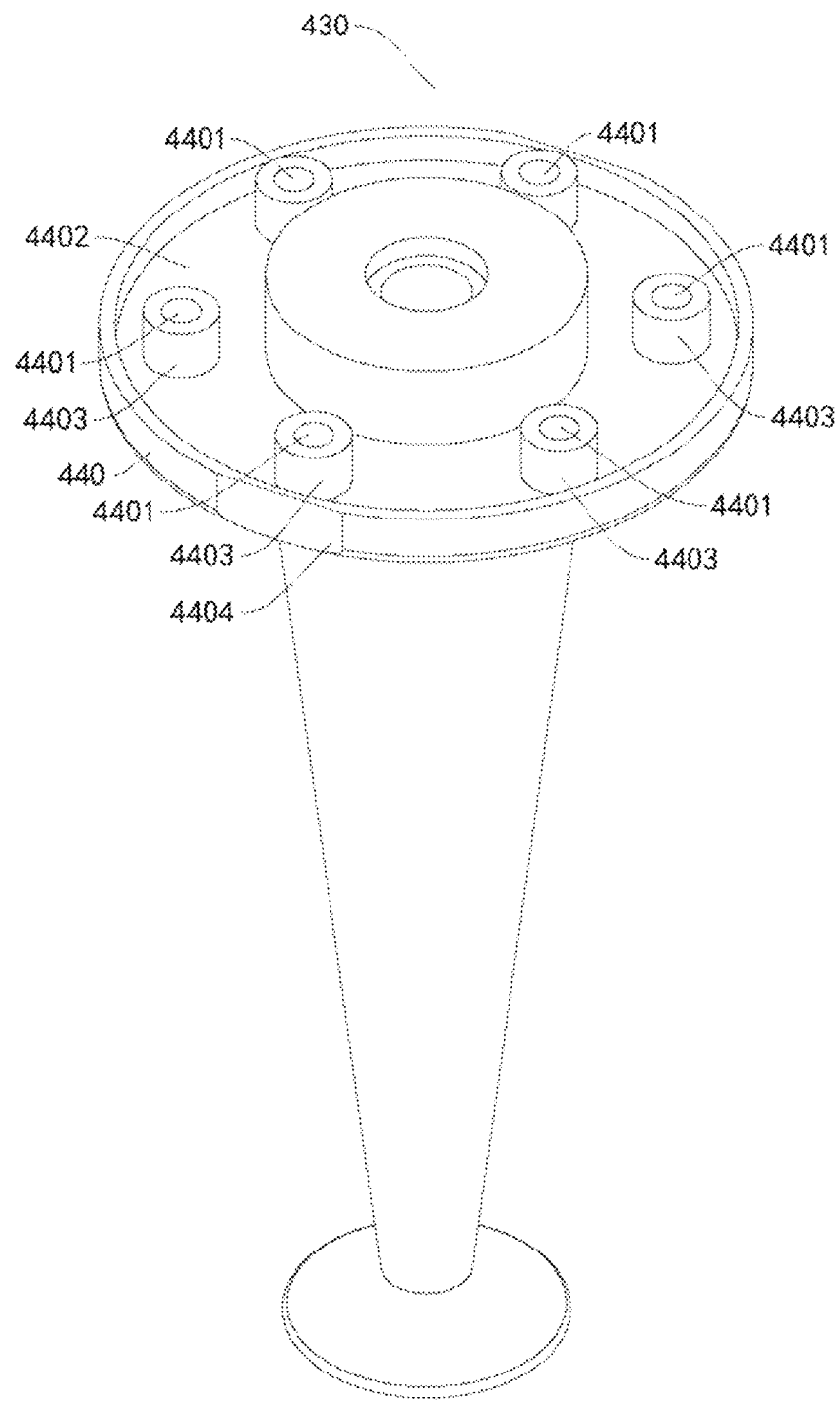
FIG. 59 is a schematic structural diagram of an oscillation rod of the ultrasonic oscillator device according to the embodiments of the present disclosure.

Further, as shown in FIG. 56 and FIG. 59, each second fixation hole 4401 may be a blind hole with an opened upper end, and the fasteners 450 may sequentially penetrate into the first fixation holes 2103 and the second fixation holes 4401 from top to bottom. That is, the lower ends of the fasteners 450 penetrate out of the lower surface of the mounting member 440 downwards from the corresponding second fixation holes 4401, such that improvement on connection sealing performance of the fasteners 450 is facilitated, the sealing performance of the mounting assembly with the ultrasonic device is then improved, the lower surface of the mounting member 440 is also flat at the same time, and the structure of the mounting assembly of the ultrasonic device is more concise and beautiful.

Figure 60:
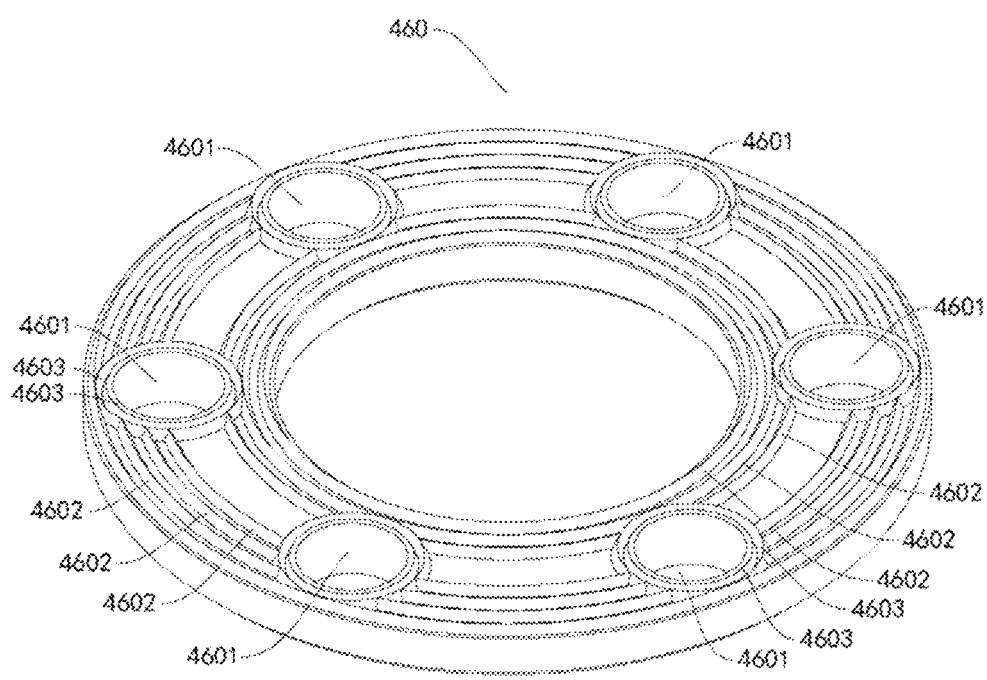
FIG. 60 is a schematic structural diagram of a sealing gasket of the ultrasonic oscillator device according to the embodiments of the present disclosure.

In some embodiments of the present disclosure, as shown in FIG. 55, FIG. 56 and FIG. 60, the mounting assembly of the ultrasonic device may further include sealing gaskets 460, the sealing gaskets 460 may be arranged between the mounting member 440 and the base 211 and may be provided with sealing through holes 4601 respectively, and the fasteners 450 may penetrate through the corresponding sealing through holes 4601 to axially compress the mounting member 440, the sealing gaskets 460 and the base 211, such that the sealing gaskets 460 may seal gaps between the mounting member 440 and the base 211, and the connection sealing performance is further improved.

Figure 58:
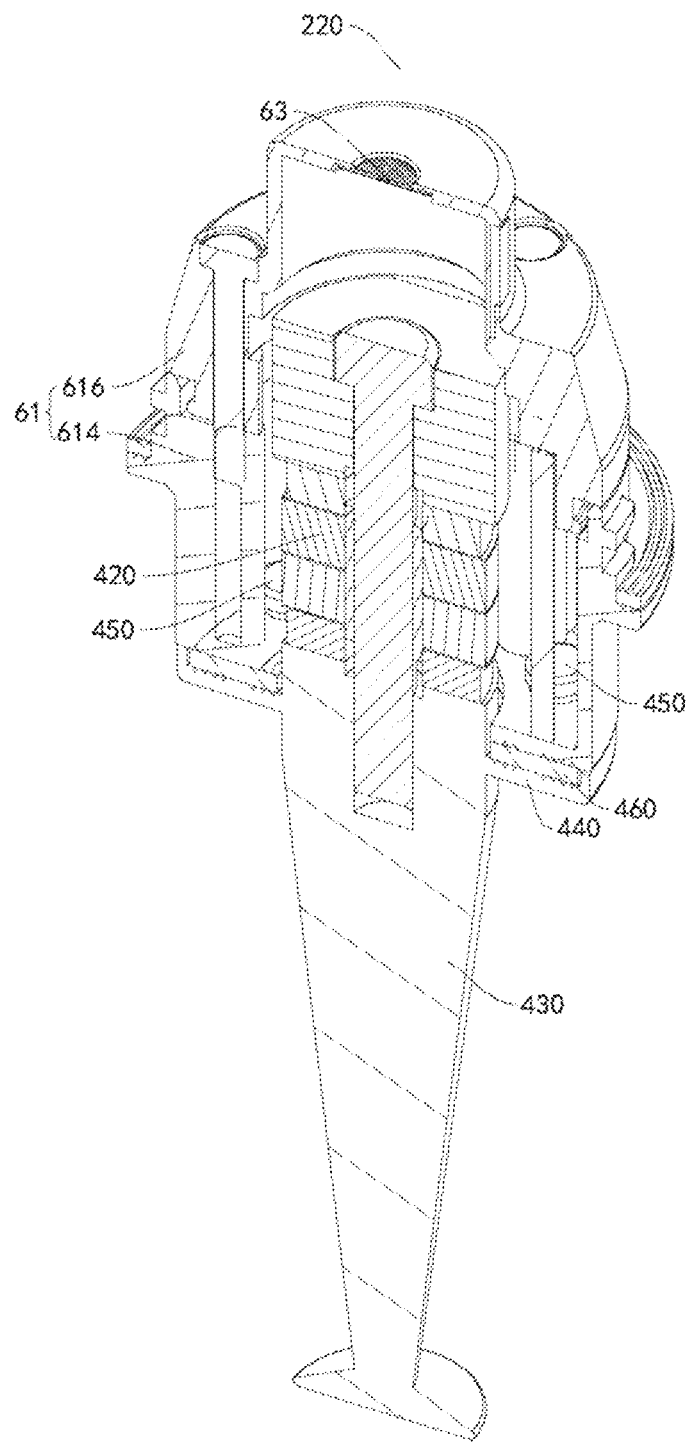
FIG. 58 is a cross-sectional view of an ultrasonic oscillator device according to the embodiments of the present disclosure.

Further, as shown in FIGS. 58-59, a sealing slot 4402 may be formed in the upper part of the mounting member 440, and fixation columns 4403 protruding upwards may be arranged at the bottom wall face of the sealing slot 4402. As shown in FIG. 56, the sealing gasket 460 may be arranged in the sealing slot 4402 to prevent exposure and easiness in loss of the structure of the sealing gasket 460, and thus the appearance is more beautiful. The sealing gasket 460 may abut against the lower surface of the base 211, the fixation columns 4403 may be inserted into the corresponding sealing through holes 4601, and the second fixation holes 4401 may be formed in the corresponding fixation columns 4403 to enable the sealing through holes 4601 of the sealing gasket 460 to be aligned to the second fixation holes 4401 of the mounting member 440 respectively, such that the fasteners 450 are more liable to mount. And, the connection area of each second fixation hole 4401 and the corresponding fastener 450 may be increased by the corresponding fixation column 4403, such that connection is more firm and reliable.

It should be noted that in the embodiments that the ground lines 470 are connected to the mounting member 440, the fixation column 4403 used for fixing the corresponding ground lines 470 and the fixation column 4403 used for matching with the sealing gasket 460 may be one cylinder, that is the fixation column 4403 on the mounting member 440 may be used for fixing the corresponding ground lines 470, also limiting the sealing gasket 460 and further arranging the second fixation holes 4401 to be connected to the ultrasonic oscillator device 400 and the base 211.

Alternatively, as shown in FIG. 56, the fixation column 4403 may be inserted into the corresponding first fixation holes 2103, such that the mounting member 440 is fixed relative to the circumference of the base 211, insertion of the fasteners 450 into the corresponding first fixation holes 2103 and the corresponding second fixation holes 4401 is easier with more accurate alignment, and the situation that normal work and the connection sealing performance are influenced by rotation of the ultrasonic oscillator device 400 around the axis is prevented at the same time.

According to a further embodiment of the present disclosure, as shown in FIG. 56 and FIG. 60, sealing ridges 4602 may be formed at at least one of the upper surface or the lower surface of the sealing gasket 460 and may extend in a circumferential direction of the sealing gasket 460, and the sealing gasket 460 may be compressed when the fastener 450 is connected to the mounting member 440 and the base 211, such that the sealing ridge 4602 is tightly attached to the mounting member 440 and the base 211, and the sealing effect is better.

Furthermore, as shown in FIG. 56 and FIG. 60, at least two sealing ridges 4602 which are spaced from each other are arranged in an arbitrary radial direction of the sealing gasket 460, that is the sealing ridges 4602 may be sealed from multiple sites in the radial direction of the sealing gasket 460, and thus the sealing effect is further improved.

As shown in FIG. 60, multiple sealing convex rings 4603 which are concentrically arranged may further be arranged at at least one of the upper peripheral edge or the lower peripheral edge of each sealing through hole 4601 and may seal the peripheral edge of each sealing through hole 4601 to improve the air tightness; and in addition, the sealing convex ring 4603 at the outermost side may be connected with the sealing ridges 4602, such that the sealing convex rings 4603 and the sealing ridges 4602 may be seamlessly sealed, and processing formation is also facilitated.

According to some embodiments of the present disclosure, as shown in FIG. 47 and FIG. 59, positioning chipped edges 4404 may be arranged at the outer peripheral wall of the mounting member 440; and when the ultrasonic device is mounted through the mounting assembly and the ultrasonic device is assembled, clamping and positioning may be performed through the positioning chipped edges 4404, such that mounting is more convenient and is liable to operate.

According to some embodiments of the present disclosure, as shown in FIG. 55 and FIG. 58, a cavity 2101 communicating with the mounting hole 2102 may be formed in the base 211; the ultrasonic oscillator device 400 may include: the ultrasonic oscillator 410 and the power coupler 100 electrically connected to the ultrasonic oscillator 410; and the ultrasonic oscillator 410 may include: an ultrasonic transducer 420 and the oscillation rod 430, where a portion of the ultrasonic transducer 420 and the power coupler 100 may be located in the cavity 2101 to protect the structures of the ultrasonic transducer 420 and the power coupler 100. The oscillation rod 430 may be connected to the ultrasonic transducer 420 and is located at the lower end of the ultrasonic transducer 420 to transfer and emit outwards the ultrasonic waves provided by the ultrasonic transducer 420. The mounting member 440 may be arranged at the outer peripheral face of the upper part of the oscillation rod 430, such that when the mounting member 440 is connected to the base 211, the lower part of the oscillation rod 430 may be located on the lower side of the base 211 so as to transfer and emit the ultrasonic waves.

Figure 61:
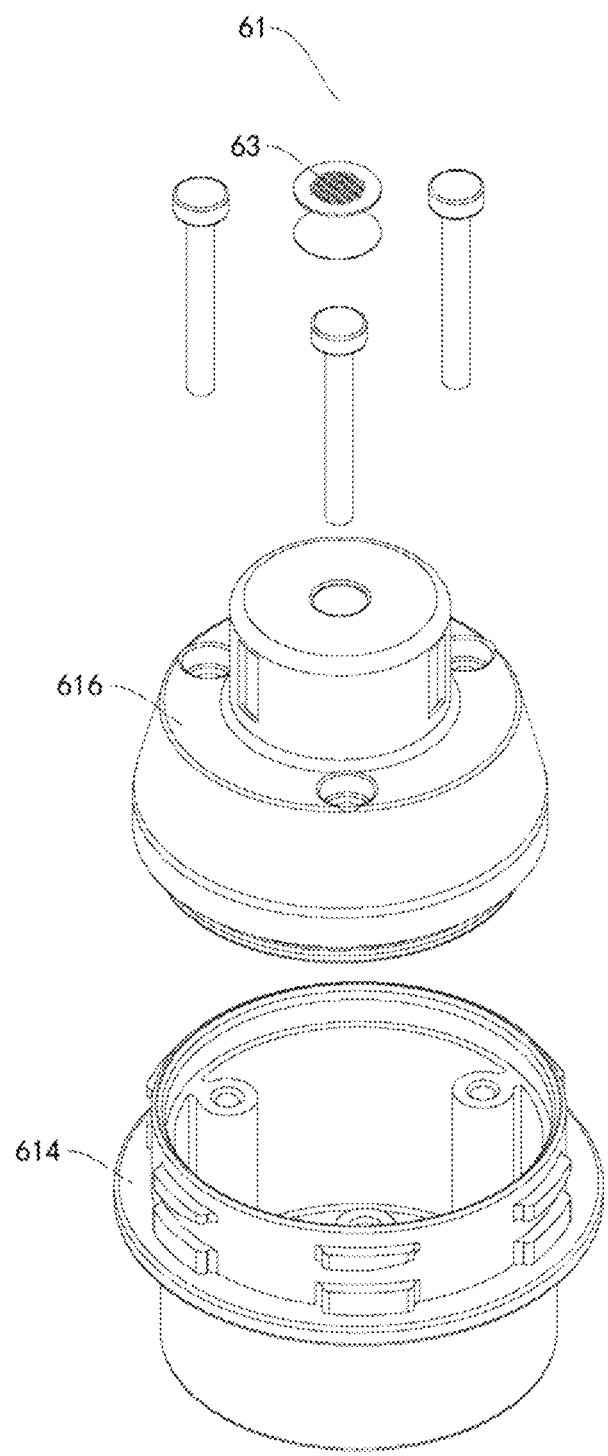
FIG. 61 is an exploded view of the output end base of the ultrasonic oscillator device according to the embodiments of the present disclosure.

As shown in FIG. 58 and FIG. 61, in the embodiments that the output end assembly 60 includes the output end base 61, the output end base 61 may protect the structure of the ultrasonic transducer 420 and shield the ultrasonic transducer 420 at the same time to prevent the ultrasonic transducer 420 from being damaged by water ingress. The output end base 61 may include a lower housing 614 and an upper housing 616 which are connected to each other.

Alternatively, the lower housing 614 and the upper housing 616 may be detachably connected; when the lower housing 614 is separated from the upper housing 616, the ultrasonic transducer 420 and other components may be mounted in the lower housing 614; and the fasteners 450 may penetrate through the third fixation holes 615, the first fixation holes 2103 and the second fixation holes 4401 from top to bottom, then the upper housing 616 is connected to the lower housing 614, and mounting of the ultrasonic transducer 420 and the fasteners 450 is convenient. Alternatively, a space between the upper housing 616 and the lower housing 614 may be sealed by a first sealing ring 617, and thus water is prevented from entering the input end base 61.

As shown in FIG. 56, a third fixation hole 615 may be formed in the bottom wall of the lower housing 614, the fastener 450 may further penetrate into the third fixation hole 615 to fix the output end base 61 to the base 211, and then the ultrasonic transducer 420 is fixed on the base 211, such that fixing of the ultrasonic transducer 420 is firm. The sealing gasket 460 and the ultrasonic transducer 420 are fixed on the base 211 by one fastener 450, such that a fixing structure is simple, and reduction in production cost and improvement on assembly efficiency are facilitated.

Figure 65:
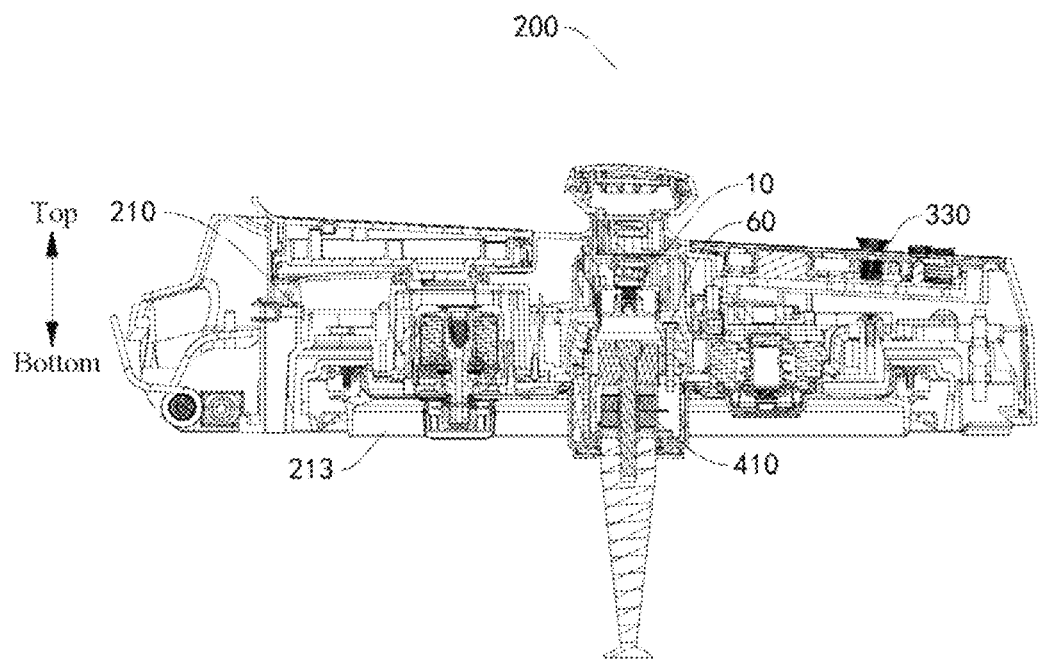
FIG. 65 is a schematic structural diagram of the cover body assembly of the cooking utensil according to some other embodiments of the present disclosure, where the power coupler is the power coupler according to the second embodiment of the present disclosure.
Figure 66:
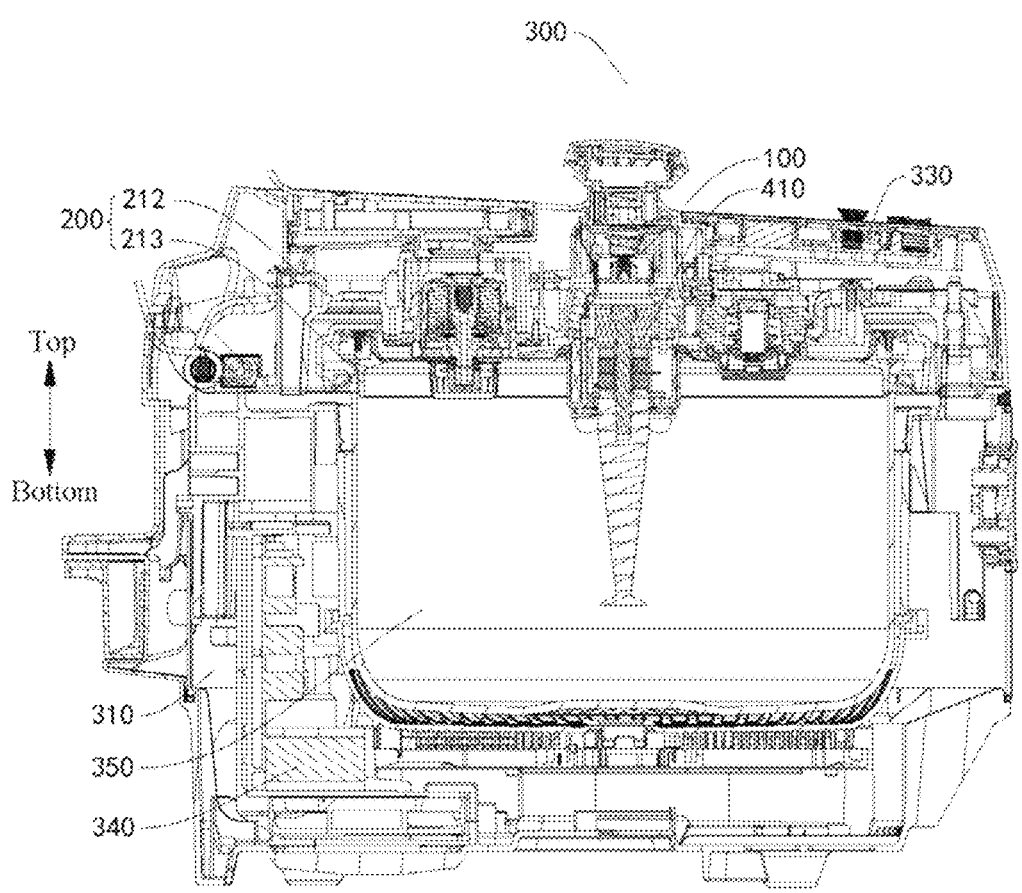
FIG. 66 is a schematic structural diagram of the cooking utensil according to some other embodiments of the present disclosure, where the power coupler is the power coupler according to the second embodiment of the present disclosure.
Figure 67:
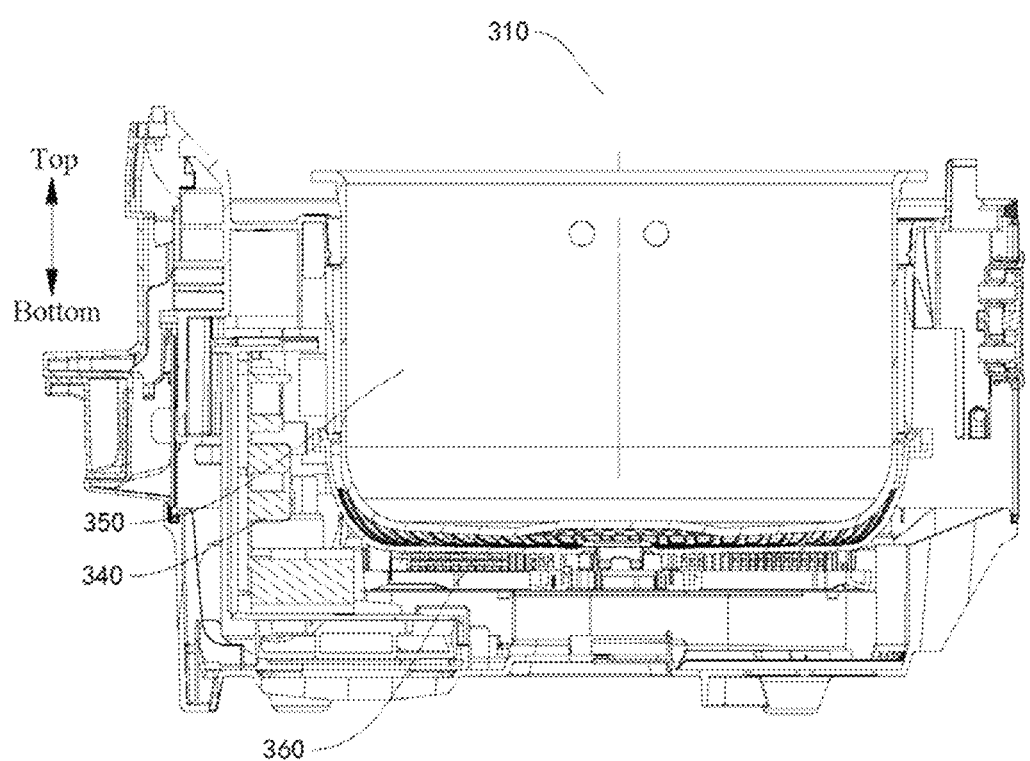
FIG. 67 is a schematic structural diagram of a boiler body of the cooking utensil according to the embodiments of the present disclosure.
Figure 68:
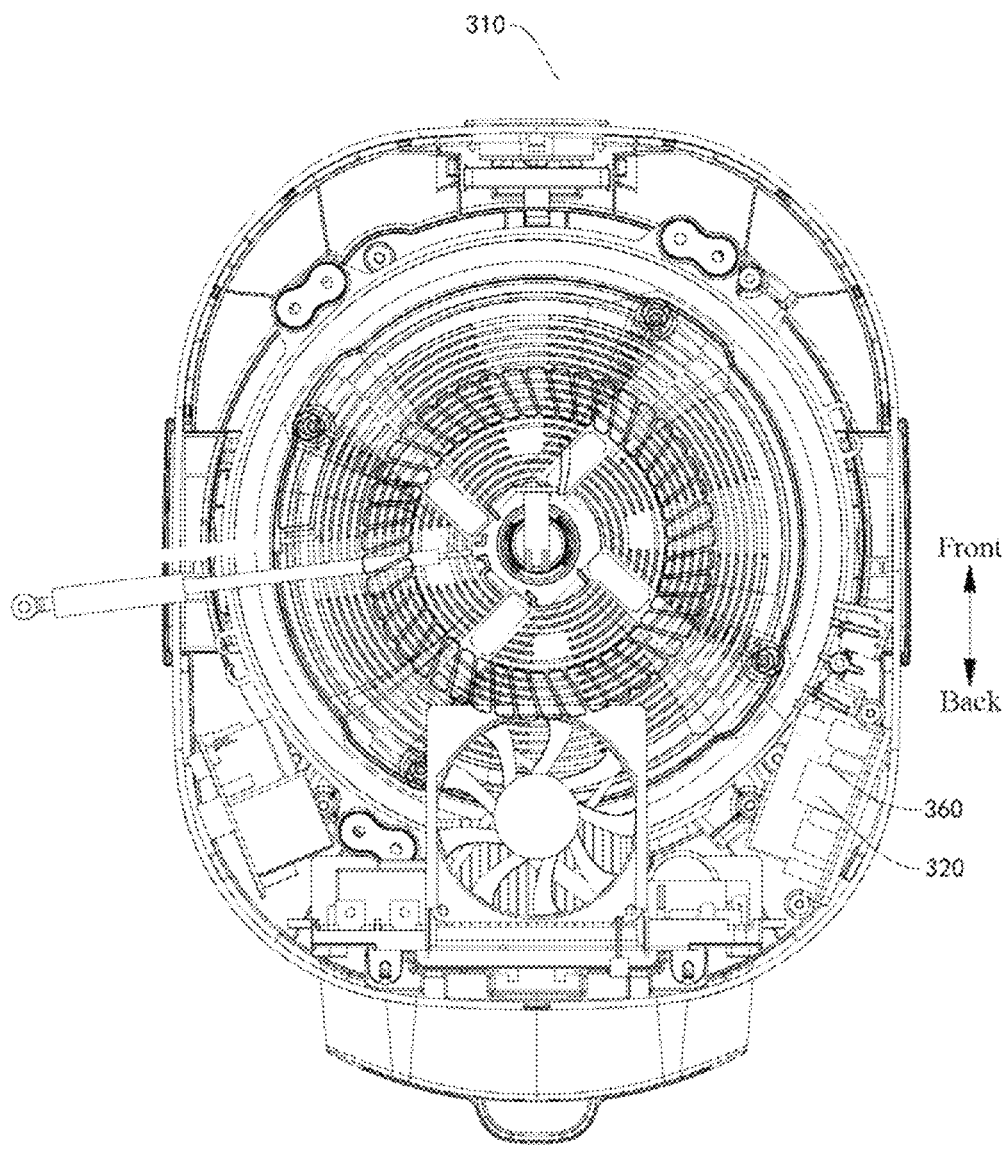
FIG. 68 is a bottom view of the boiler body of the cooking utensil according to the embodiments of the present disclosure.

Refer to FIG. 62 and FIG. 65, a cover body assembly 200 according to the embodiment of the sixth aspect of the present disclosure may include a cover body 210 and the ultrasonic oscillator device 400 according to the embodiment of the second aspect of the present disclosure or may include the cover body 210 and the mounting assembly of the ultrasonic device according to the embodiment of the fifth aspect of the present disclosure. In some embodiments, the base 211 may integrally formed at a cover plate 213 or an inner cover of the cover body 210, or may be connected to the cover plate 213 or the inner cover of the cover body 210 to form a whole body.

Further, as shown in FIGS. 54-57 and FIG. 62, the cover body 210 may include an upper cover 212 and the cover plate 213, and the cover plate 213 is detachably connected to the upper cover 212 to be beneficial to cleaning of the cover plate 213. The input end assembly 10 may be arranged at the upper cover 212, and the output end assembly 60 and the ultrasonic oscillator 410 may be connected to the cover plate 213. Thus, when the cover plate 213 is removed, the output end assembly 60 is separated from the input end assembly 10, water difficultly enters the input end assembly 10 connected to the external power supply, and thus the user difficultly gets the electric shock. Whereas, when the cover plate 213 is assembled on the upper cover 212, the output end assembly 60 may be in coupling connection to the input end assembly 10 to realize power transfer.

The cooking utensil 300 according to the embodiment of the seventh aspect of the present disclosure includes the ultrasonic oscillator 410 according to the embodiment of the third aspect of the present disclosure or the cover body assembly 200 according to the embodiment of the sixth aspect of the present disclosure. As the ultrasonic oscillator 410 according to the embodiment of the third aspect of the present disclosure and the cover body assembly 200 according to the embodiment of the sixth aspect of the present disclosure have the above beneficial technical effects, the cooking utensil 300 according to the embodiments of the present disclosure realizes self locking of the input end assembly 10 when the input end assembly 10 is separated from the output end assembly 60, the risk of electric shock of the user is effectively lowered, and the user is safer.

Alternatively, in the present disclosure, the cooking utensil 300 may be a soymilk maker, a high speed blender, an electric pressure cooker (for example, an IH electric pressure cooker), an electric cooker, an electric kettle, a food cooking machine and the like.

Further, as shown in FIGS. 62-68, a pedestal of the boiler body 310 of the cooking utensil 300 may be provided with an ultrasonic control panel 320 and a power panel 340, and the cover body assembly 200 of the cooking utensil 300 may be provided with a transducer 420. The ultrasonic control panel 320 may be electrically connected to the input end assembly 10 arranged at the cover body assembly 200 to control the transducer 420, and the power panel 340 may be connected to the ultrasonic control panel 320 to supply power to the ultrasonic control panel 320.

Furthermore, as shown in FIG. 62-68, the cooking utensil 300 may include a coil disk assembly 360, the coil disk assembly 360 is arranged at the lower part of an inner boiler of the cooking utensil 300, and the power panel 340 and the ultrasonic control panel 320 may be arranged in one plane along the periphery of the coil disk assembly 360, that is, the power panel 340 and the ultrasonic control panel 320 are located on the outer side of the coil disk assembly 360 and are not axially arranged, such that the coil disk assembly 360 may be prevented from generating electromagnetic interference with the power panel 340 and the ultrasonic control panel 320.

Further, as shown in FIGS. 62-68, the cover body assembly 200 of the cooking utensil 300 may be provided with a control panel 330, and the control panel 330 may be connected with the ultrasonic control panel 320, such that the user may control the ultrasonic control panel 320 through the control panel 330 and then may control a working state of the transducer 420, for example, may control opening and closing of the transducer 420, the intensity of the ultrasonic waves or the like.

A heating apparatus according to the embodiment of the eighth aspect of the present disclosure includes the mounting assembly of the ultrasonic device according to the embodiment of the fifth aspect of the present disclosure. As the mounting assembly of the ultrasonic device according to the embodiment of the fifth aspect of the present disclosure has the technical beneficial effects, the ultrasonic oscillator device 400 of the heating apparatus according to the embodiment of the eighth aspect of the present disclosure may be mounted in the base 211 from bottom to top, such that a mounting structure is simple and compact; and assembly operation may be performed from the lower side of the base 211, such that operation is liable, connection is more firm and reliable, and improvement on the sealing performance and the cooking taste of the food materials is facilitated.

Other configurations and operation of the power coupler 100, the cover body assembly 200, the ultrasonic oscillator device 400, the ultrasonic oscillator 410, the mounting assembly of the ultrasonic device, the cooking utensil 300 and the heating apparatus according to the embodiments of the present disclosure are well-known to those of ordinary skill in the art and therefore not described in detail herein. In descriptions of the present disclosure, it should be noted that unless clearly specified or limited otherwise, terms "mounting," "connecting" and "connection" should be broadly understood here, for example, may be fixed connection, detachable connection or integral connection, mechanical connection and electric connection, direction connection, indirect connection through an intermediate and communication of two elements insides. To those of ordinary skill in the art, the specific meanings of the terms in the present disclosure may be understood based on the specific condition.

In the description of the specification, descriptions of reference terms "embodiment," "specific embodiment," "example" and the like mean that a specific feature, structure, material or characteristic described in connection with the embodiment or example is included in at least one embodiment or example of the present disclosure. In the present specification, the schematic representation of the above terms does not necessarily mean the same embodiment or example. Furthermore, the described specific feature, structure, material or characteristic may all be mutually combined in a suitable manner in one or more embodiments or examples under the condition without interference and contradiction.

What is claimed is:

1. A power coupler comprising:
an input end assembly including:
an input end base including a slot;
a sealing cover arranged at the input end base and movable between:
a closing position at which the sealing cover covers a slot port of the slot, and
an opening position at which the sealing cover does not cover at least a portion of the slot port;
an input conductive member arranged at the input end base and connected to an external power supply; and
a self-locking structure switchable between:
a locked state under which the self-locking structure limits the sealing cover from moving towards the opening position, and
an unlocked state under which the self-locking structure does not limit the sealing cover from moving towards the opening position; and
an output end assembly separably coupled to the input end assembly and including an output conductive member; wherein:
when the input end assembly is coupled to the output end assembly, the self-locking structure is in the unlocked state, the sealing cover is at the opening position, and the output conductive member extends into the slot and is connected to the input conductive member; and
when the input end assembly is separated from the output end assembly, the output conductive member is out of the slot, the sealing cover is located at the closing position, and the self-locking structure is in the locked state.

2. The power coupler according to claim 1, wherein the self-locking structure includes:
a stopper connected to the input end base or the sealing cover, and movable between:
a first position at which the stopper stops the sealing cover from moving towards the opening position, the stopper normally staying at the first position, and
a second position at which the stopper does not stop the sealing cover from moving towards the opening position; and
a driver connected to the input end base or arranged at the output end assembly, and configured to drive the stopper to move to the second position in response to the output end assembly being inserted into the input end assembly.

3. The power coupler according to claim 2, wherein:
the sealing cover includes a limiting mesa arranged at an outer peripheral face of the sealing cover; and
the stopper is configured to:
when being at the first position, interfere with the limiting mesa to stop the sealing cover from moving towards the opening position; when being at the first position and
move outwards to the second position to avoid the limiting mesa.

4. The power coupler according to claim 3, wherein the stopper includes a limiting convex rib configured to, when the sealing cover is not mounted at the input end base, abut against the input end base to limit an angle of the stopper rotating inwards.

5. The power coupler according to claim 2, wherein:
the driver is rotatably connected to the input end base;
the self-locking structure further includes a drive reset member connected to the input end base and configured to restore the driver to an initial position; and
the output end assembly is configured to overcome a reset force of the drive reset member to enable the driver to rotate.

6. The power coupler according to claim 5, wherein:
the input end base includes a limiting member; and
the driver includes:
a drive connection member rotatably connected to the input end base;
a drive member connected to the drive connection member and configured to drive the stopper to rotate; and
a limiting matching member connected to the drive member, and configured to abut against the limiting member to limit the driver under the reset force of the drive reset member while the output end assembly is being separated from the input end assembly.

7. The power coupler according to claim 6, wherein:
the input end base includes a shaft slot;
the limiting matching member includes a limiting slot;
the drive connection member includes a shaft rod rotatably arranged in the shaft slot; and
the drive reset member includes a torsional spring, a coil of the torsional spring being sleeved at the shaft rod, one end of the torsional spring being connected to the input end base, and another end of the torsional spring being arranged in the limiting slot.

8. The power coupler according to claim 7, wherein:
the input end base includes a mounting hole at a bottom wall of the input end base, a mounting seat being arranged at an edge of the mounting hole;
the driver is arranged at the mounting hole;
the shaft slot is formed at the mounting seat; and
the limiting member includes a buckle connected to the mounting seat and extending inwards.

9. The power coupler according to claim 7, wherein the shaft rod includes a retaining rib configured to limit the torsional spring in an axial direction of the shaft rod.

10. The power coupler according to claim 7, wherein:
the drive member is connected to a middle part of the shaft rod; and
the shaft rod includes a check rib arranged at the middle part and configured to abut against a bottom wall face of the input end base to limit the driver.

11. The power coupler according to claim 2, wherein:
the stopper includes a magnetic member; and
the driver includes a magnetic driver arranged at the output end assembly and configured to be magnetically matched with the magnetic member to enable the stopper to move between the first position and the second position.

12. The power coupler according to claim 11, wherein:
a stopping slot is arranged at an inner circumferential surface of the slot; and
the stopper is arranged at the sealing cover and configured to translationally move in a radial direction of the sealing cover, the stopper being configured to extend into the stopping slot at the first position and be out of the stopping slot at the second position.

13. The power coupler according to claim 12, wherein:
the sealing cover includes:
a sealing plate; and
a side wall connected to an outer peripheral edge of the sealing plate and arranged at one side of the sealing plate, the side wall and the sealing plate forming a sealing cover slot, and a through hole being formed at the side wall;
the stopper is arranged at the sealing cover slot, an outer end of the stopper being configured to penetrate through the through hole to extend into the stopping slot; and
the self-locking structure further includes a stopping reset member connected to the input end base and arranged at the sealing cover slots, the stopping reset member being configured to apply an action force to the stopper to cause the stopper to move towards the first position.

14. The power coupler according to claim 13, wherein:
the sealing plate includes a sealing plate bulge located in the sealing cover slot;
the stopper includes an outer budge arranged at an outer peripheral face of the stopper; and
the stopping reset member includes a helical spring sleeved at the stopper, one end of the helical spring abutting against the sealing plate bulge and another end of the helical spring abutting against the outer bulge.

15. The power coupler according to claim 14, wherein:
the sealing plate bulge is internally provided with a limiting slot extending in the radial direction of the sealing cover; and
an inner end of the stopper translationally penetrates through the limiting slot.

16. The power coupler according to claim 15, wherein:
two ends of the limiting slot in the radial direction of the sealing cover are both opened;
the sealing plate further includes a stopping convex rib located in the sealing cover slot; and
the inner end of stopper abuts against the stopping convex rib when the stopper is at the second position.

17. The power coupler according to claim 1, wherein:
the output end assembly includes an output end base including:
a base main body; and
a convex member protruding from one side of the base main body and configured to extend into the slot and drive the self-locking structure to move; and
the output conductive member is exposed from an outer peripheral face of the convex member and is connected to the output end base.

18. The power coupler according to claim 17, wherein the convex member includes a convex rib arranged at the outer peripheral face of the convex member and extending in an axial direction of the convex member, and the convex rib being configured to drive the self-locking structure to move.

19. The power coupler according to claim 18, wherein:
the convex rib extends beyond an end surface of the convex member that is away from the base main body, and a distance of the convex rib exceeding the end surface is greater than 1 mm and equals or is smaller than 6 mm; and
a height of the convex rib protruding from the outer peripheral face of the convex member is greater than 0 mm and equals or is smaller than 3 mm.

20. An ultrasonic oscillator device comprising:
an ultrasonic oscillator; and
a power coupler including
an input end assembly including:
an input end base including a slot;
a sealing cover arranged at the input end base and movable between:
a closing position at which the sealing cover covers a slot port of the slot, and
an opening position at which the sealing cover does not cover at least a portion of the slot port;
an input conductive member arranged at the input end base and connected to an external power supply; and
a self-locking structure switchable between:
a locked state under which the self-locking structure limits the sealing cover from moving towards the opening position, and
an unlocked state under which the self-locking structure does not limit the sealing cover from moving towards the opening position; and
an output end assembly including an output conductive member, one end of the output end assembly being separably coupled to the input end assembly, and another end of the output end assembly being electrically connected to the ultrasonic oscillator; wherein:
when the input end assembly is coupled to the output end assembly, the self-locking structure is in the unlocked state, the sealing cover is at the opening position, and the output conductive member extends into the slot and is connected to the input conductive member; and
when the input end assembly is separated from the output end assembly, the output conductive member is out of the slot, the sealing cover is located at the closing position, and the self-locking structure is in the locked state.

* * * * *